US012652285B2

(12) United States Patent
Castellanos Zamora et al.

(10) Patent No.: US 12,652,285 B2
(45) Date of Patent: Jun. 9, 2026

(54) METHODS, ENTITIES AND COMPUTER READABLE MEDIA FOR NON-3GPP ACCESS AUTHENTICATION

(71) Applicant: Telefonaktiebolaget LM Ericsson (publ), Stockholm (SE)

(72) Inventors: David Castellanos Zamora, Madrid (ES); Daniel Nilsson, Älvängen (SE); Stefan Rommer, Västra Frölunda (SE); Cheng Wang, Shanghai (CN); Chunbo Wang, Shanghai (CN)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 0 days.

(21) Appl. No.: 18/265,443

(22) PCT Filed: Dec. 14, 2021

(86) PCT No.: PCT/CN2021/137968
§ 371 (c)(1),
(2) Date: Jun. 6, 2023

(87) PCT Pub. No.: WO2022/127791
PCT Pub. Date: Jun. 23, 2022

(65) Prior Publication Data
US 2024/0056446 A1 Feb. 15, 2024

(30) Foreign Application Priority Data
Dec. 15, 2020 (WO) ............... PCT/CN2020/136618

(51) Int. Cl.
*H04W 12/06* (2021.01)
*H04L 9/40* (2022.01)
(Continued)

(52) U.S. Cl.
CPC .......... *H04L 63/0892* (2013.01); *H04L 69/08* (2013.01); *H04W 8/18* (2013.01); *H04W 12/06* (2013.01)

(58) Field of Classification Search
CPC ...... H04L 63/0892; H04L 69/08; H04W 8/18; H04W 12/06; H04W 92/02
See application file for complete search history.

(56) References Cited

U.S. PATENT DOCUMENTS

| | | | | |
|---|---|---|---|---|
| 8,224,330 B2 * | 7/2012 | Ahmed | ............... | H04W 12/068 |
| | | | | 455/445 |
| 10,581,813 B2 * | 3/2020 | Watfa | ................. | H04L 63/0485 |

(Continued)

FOREIGN PATENT DOCUMENTS

| | | |
|---|---|---|
| EP | 2276281 B1 | 2/2019 |
| WO | 2018065052 A1 | 4/2018 |

(Continued)

OTHER PUBLICATIONS

3GPP TS 24.502, Access to the 3GPP 5G Core Network (5GCN) via Non-3GPP Access Networks (N3AN), Sep. 2020.*

(Continued)

*Primary Examiner* — David Garcia Cervetti
(74) *Attorney, Agent, or Firm* — Rothwell, Figg, Ernst & Manbeck, P.C.

(57) ABSTRACT

The present disclosure provides methods, entities, and computer readable media for non-3GPP access authentication. The method (1600) at a protocol translation entity includes: receiving (S1601), from a Non-3GPP access point, an authentication request message of a first protocol type for a UE that includes an identity of the UE; translating (S1603) the authentication request message of the first protocol type to a corresponding authentication request message of a second protocol type; and transmitting (S1605), to an entity for authentication, the corresponding authentication request (Continued)

message of a second protocol type that includes the identity of the UE.

7 Claims, 23 Drawing Sheets

(51) Int. Cl.
  *H04L 69/08*          (2022.01)
  *H04W 8/18*          (2009.01)

(56)                    References Cited

U.S. PATENT DOCUMENTS

| | | | | |
|---|---|---|---|---|
| 10,631,224 | B2 * | 4/2020 | Buckley | H04W 8/06 |
| 10,833,892 | B2 * | 11/2020 | Lepp | H04W 16/14 |
| 11,032,706 | B2 * | 6/2021 | Mohamed | H04L 63/0892 |
| 11,297,111 | B2 * | 4/2022 | Buckley | H04M 15/57 |
| 11,683,847 | B2 * | 6/2023 | Salkintzis | H04W 88/16 |
| | | | | 455/411 |
| 11,950,198 | B2 * | 4/2024 | Wang | H04W 60/005 |
| 2011/0119492 | A1 * | 5/2011 | Palanigounder | H04W 12/126 |
| | | | | 713/171 |
| 2012/0134286 | A1 * | 5/2012 | Bhalla | H04W 8/18 |
| | | | | 370/252 |
| 2013/0267203 | A1 * | 10/2013 | Qiang | H04W 48/18 |
| | | | | 455/437 |
| 2013/0290722 | A1 * | 10/2013 | Kall | H04L 63/0876 |
| | | | | 713/171 |
| 2015/0358900 | A1 * | 12/2015 | Duan | H04W 48/16 |
| | | | | 370/338 |
| 2017/0295529 | A1 * | 10/2017 | Kang | H04L 12/66 |
| 2018/0103363 | A1 * | 4/2018 | Faccin | H04W 8/005 |
| 2018/0167983 | A1 * | 6/2018 | Salkintzis | H04W 76/14 |
| 2019/0036924 | A1 * | 1/2019 | Wang | H04W 76/10 |
| 2019/0215691 | A1 * | 7/2019 | Salkintzis | H04W 12/069 |
| 2019/0215731 | A1 * | 7/2019 | Qiao | H04W 24/06 |
| 2019/0261178 | A1 * | 8/2019 | Rajadurai | H04W 12/069 |
| 2019/0335330 | A1 * | 10/2019 | Salkintzis | H04W 12/72 |
| 2019/0335373 | A1 * | 10/2019 | Kang | H04W 12/037 |
| 2020/0008167 | A1 * | 1/2020 | Venkataraman | H04W 76/16 |
| 2020/0015079 | A1 * | 1/2020 | Li | H04W 8/08 |
| 2020/0178076 | A1 * | 6/2020 | Ben Henda | H04W 12/0471 |
| 2020/0196375 | A1 * | 6/2020 | Ryu | H04W 76/30 |
| 2020/0275279 | A1 * | 8/2020 | Tangudu | H04W 12/06 |
| 2020/0280849 | A1 * | 9/2020 | Ito | H04W 12/06 |
| 2021/0022024 | A1 * | 1/2021 | Yao | H04W 24/08 |
| 2021/0051468 | A1 * | 2/2021 | Baskaran | H04W 48/16 |
| 2021/0127271 | A1 * | 4/2021 | Wu | H04W 12/0471 |
| 2021/0144548 | A1 * | 5/2021 | Ben Henda | H04W 12/106 |
| 2021/0144618 | A1 * | 5/2021 | Chun | H04W 48/02 |
| 2021/0258787 | A1 * | 8/2021 | Bernsen | H04L 63/18 |
| 2021/0306849 | A1 * | 9/2021 | Liu | H04W 12/06 |
| 2021/0306855 | A1 * | 9/2021 | You | H04W 12/72 |
| 2021/0321258 | A1 * | 10/2021 | Salkintzis | H04W 12/06 |
| 2021/0329461 | A1 * | 10/2021 | Bernsen | H04W 12/06 |
| 2021/0409214 | A1 * | 12/2021 | Nix | H04L 9/085 |
| 2021/0409942 | A1 * | 12/2021 | De Kievit | H04W 8/18 |
| 2021/0410107 | A1 * | 12/2021 | Park | H04W 68/02 |
| 2022/0007280 | A1 * | 1/2022 | Stojanovski | H04W 8/20 |
| 2022/0030538 | A1 * | 1/2022 | Tiwari | H04W 60/005 |
| 2022/0039178 | A1 * | 2/2022 | Salkintzis | H04W 12/041 |
| 2022/0078692 | A1 * | 3/2022 | Stojanovski | H04W 60/00 |
| 2022/0279348 | A1 * | 9/2022 | Youn | H04W 12/06 |
| 2023/0030177 | A1 * | 2/2023 | Cui | H04L 5/001 |
| 2023/0067830 | A1 * | 3/2023 | Tiwari | H04W 12/06 |
| 2023/0080836 | A1 * | 3/2023 | Vahidi Mazinani | H04W 60/06 |
| | | | | 455/435.1 |

| | | | | |
|---|---|---|---|---|
| 2023/0094211 | A1 * | 3/2023 | Kim | H04W 36/00698 |
| | | | | 370/331 |
| 2023/0105597 | A1 * | 4/2023 | Baskaran | H04L 9/0866 |
| | | | | 726/4 |
| 2023/0112312 | A1 * | 4/2023 | Kim | H04W 36/0016 |
| | | | | 370/331 |
| 2023/0142675 | A1 * | 5/2023 | Cui | H04W 48/10 |
| | | | | 370/328 |
| 2023/0164653 | A1 * | 5/2023 | Tomici | H04W 12/08 |
| 2023/0224704 | A1 * | 7/2023 | Atarius | H04W 12/12 |
| | | | | 726/6 |
| 2023/0231720 | A1 * | 7/2023 | Kunz | H04W 12/0431 |
| | | | | 713/155 |
| 2023/0231851 | A1 * | 7/2023 | Kunz | H04W 60/06 |
| | | | | 455/411 |
| 2023/0247423 | A1 * | 8/2023 | Kunz | H04W 12/06 |
| | | | | 455/410 |
| 2023/0262455 | A1 * | 8/2023 | Salkintzis | H04L 63/08 |
| | | | | 726/6 |
| 2023/0262463 | A1 * | 8/2023 | Kunz | H04L 63/1475 |
| | | | | 455/410 |
| 2023/0328596 | A1 * | 10/2023 | Qiao | H04W 36/0011 |
| | | | | 370/330 |
| 2024/0196205 | A1 * | 6/2024 | Baskaran | H04W 12/72 |

FOREIGN PATENT DOCUMENTS

| | | | | |
|---|---|---|---|---|
| WO | 2019105695 | A1 | 6/2019 | |
| WO | WO-2020006515 | A1 * | 1/2020 | .......... H04L 63/0892 |
| WO | 2020030851 | A1 | 2/2020 | |
| WO | WO-2020064107 | A1 * | 4/2020 | .......... H04L 12/4633 |

OTHER PUBLICATIONS

A. Kunz and X. Zhang, "New 3GPP Security Features in 5G Phase 1," 2018 IEEE Conference on Standards for Communications and Networking (CSCN), Paris, France, 2018, pp. 1-6.*

Choudhury H. Enhanced anonymity: customized for roaming and non-roaming IoT-devices in 5G mobile network. In2020 Third ISEA conference on security and privacy (ISEA-ISAP) Feb. 27, 2020 (pp. 55-62). IEEE.*

Ouaissa M, Ouaissa M. An improved privacy authentication protocol for 5G mobile networks. In2020 International Conference on Advances in Computing, Communication & Materials (ICACCM) Aug. 21, 2020 (pp. 136-143). IEEE.*

Kunz A, Salkintzis A. Non-3GPP access security in 5G. Journal of ICT Standardization. 2020;8(1):41-56.*

Yang J, Johansson T. An overview of cryptographic primitives for possible use in 5G and beyond. Science China Information Sciences. Dec. 2020;63(12):220301.*

3GPP TS 23.402 V16.0.0, 3rd Generation Partnership Project; Technical Specification Group Services and System Aspects; Architecture enhancements for non-3GPP accesses (Release 16):, 3GPP TS 23.402 V16.0.0, Jun. 2019.

3GPP TS 23.501 V16.6.0 "3rd Generation Partnership Project, Technical Specification Group Services and System Aspects;System architecture for the 5G System (5GS)";Stage 2 (Release 16), Sep. 2020.

3GPP TS 24.502 V17.0.0, "3rd Generation Partnership Project; Technical Specification Group Core Network and Terminals; Access to the 3GPP 5G Core Network (5GCN) via Non-3GPP Access Networks (N3AN); Stage 3 (Release 17)", 3GPP TS 24.502 V17. 0.0, Sep. 2020.

Huawei et al. "Access authentication discussion for N3GPP", 3GPP TSG SA WG2 Meeting #124, S2-178828, Nov. 27-Dec. 1, 2017, Reno, US.

* cited by examiner

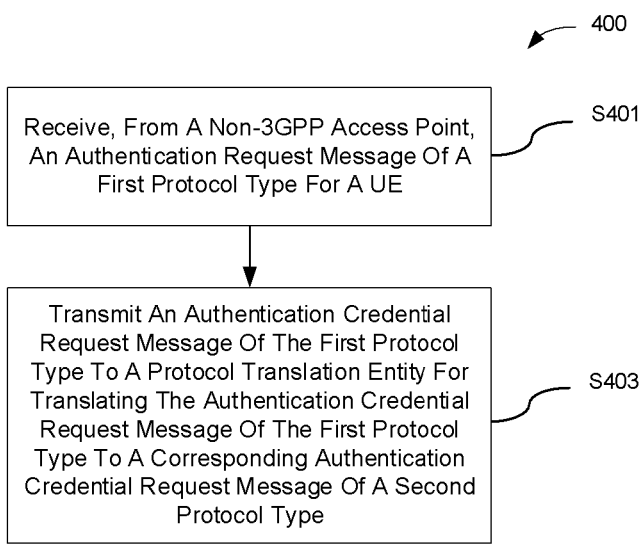

400

| S401 |
| Receive, From A Non-3GPP Access Point, An Authentication Request Message Of A First Protocol Type For A UE |

| S403 |
| Transmit An Authentication Credential Request Message Of The First Protocol Type To A Protocol Translation Entity For Translating The Authentication Credential Request Message Of The First Protocol Type To A Corresponding Authentication Credential Request Message Of A Second Protocol Type |

FIG. 4

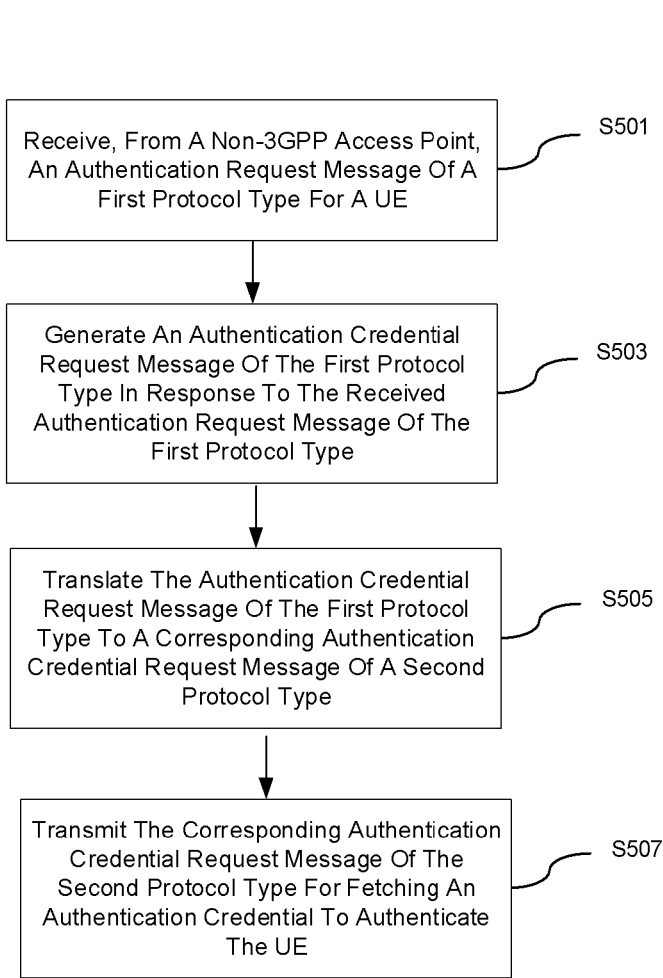

500

| S501 |
| Receive, From A Non-3GPP Access Point, An Authentication Request Message Of A First Protocol Type For A UE |

| S503 |
| Generate An Authentication Credential Request Message Of The First Protocol Type In Response To The Received Authentication Request Message Of The First Protocol Type |

| S505 |
| Translate The Authentication Credential Request Message Of The First Protocol Type To A Corresponding Authentication Credential Request Message Of A Second Protocol Type |

| S507 |
| Transmit The Corresponding Authentication Credential Request Message Of The Second Protocol Type For Fetching An Authentication Credential To Authenticate The UE |

FIG. 5

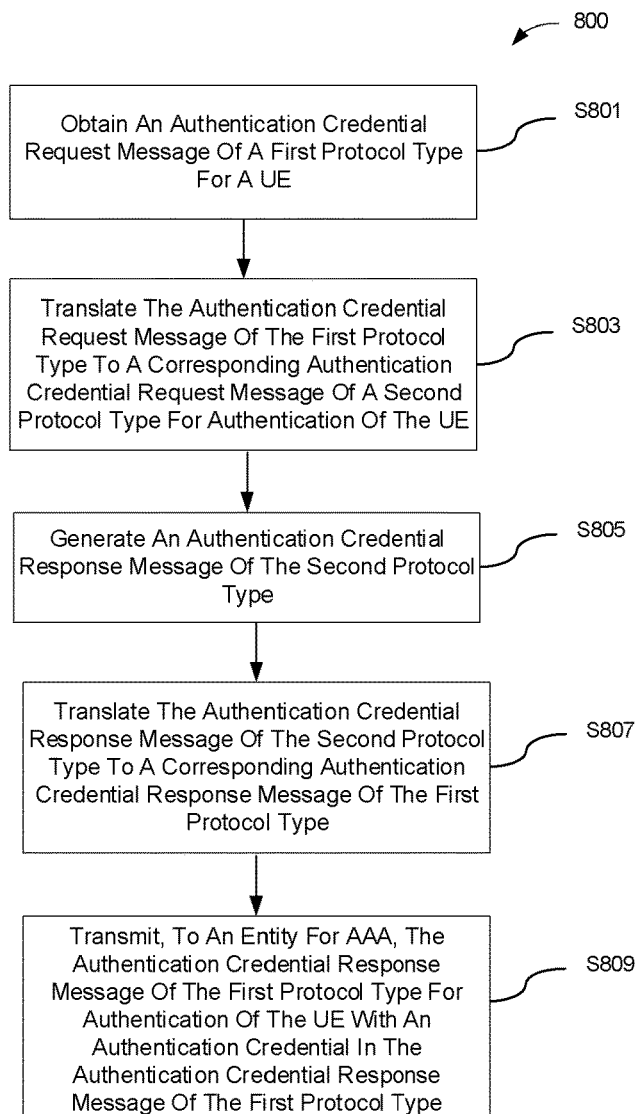

800

Obtain An Authentication Credential Request Message Of A First Protocol Type For A UE — S801

Translate The Authentication Credential Request Message Of The First Protocol Type To A Corresponding Authentication Credential Request Message Of A Second Protocol Type For Authentication Of The UE — S803

Generate An Authentication Credential Response Message Of The Second Protocol Type — S805

Translate The Authentication Credential Response Message Of The Second Protocol Type To A Corresponding Authentication Credential Response Message Of The First Protocol Type — S807

Transmit, To An Entity For AAA, The Authentication Credential Response Message Of The First Protocol Type For Authentication Of The UE With An Authentication Credential In The Authentication Credential Response Message Of The First Protocol Type — S809

FIG. 8

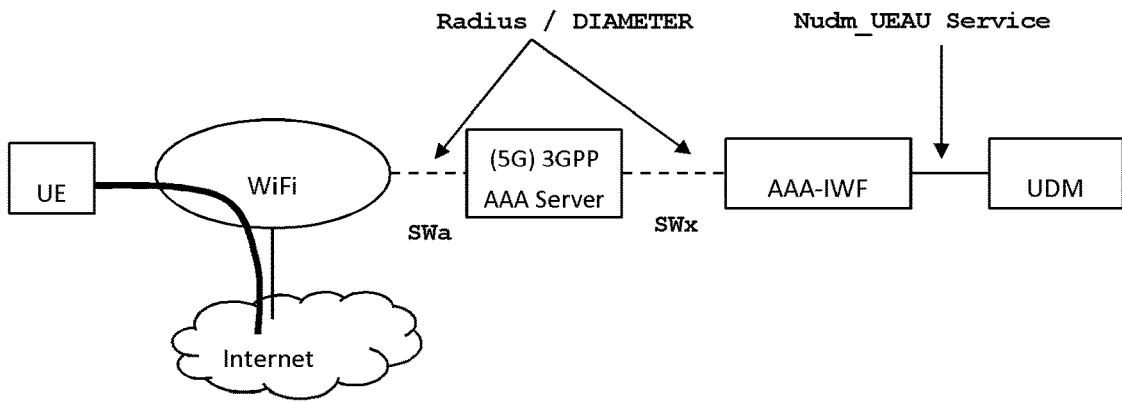

Radius / DIAMETER          Nudm_UEAU Service

UE — WiFi — (5G) 3GPP AAA Server — AAA-IWF — UDM

SWa          SWx

Internet

FIG. 9

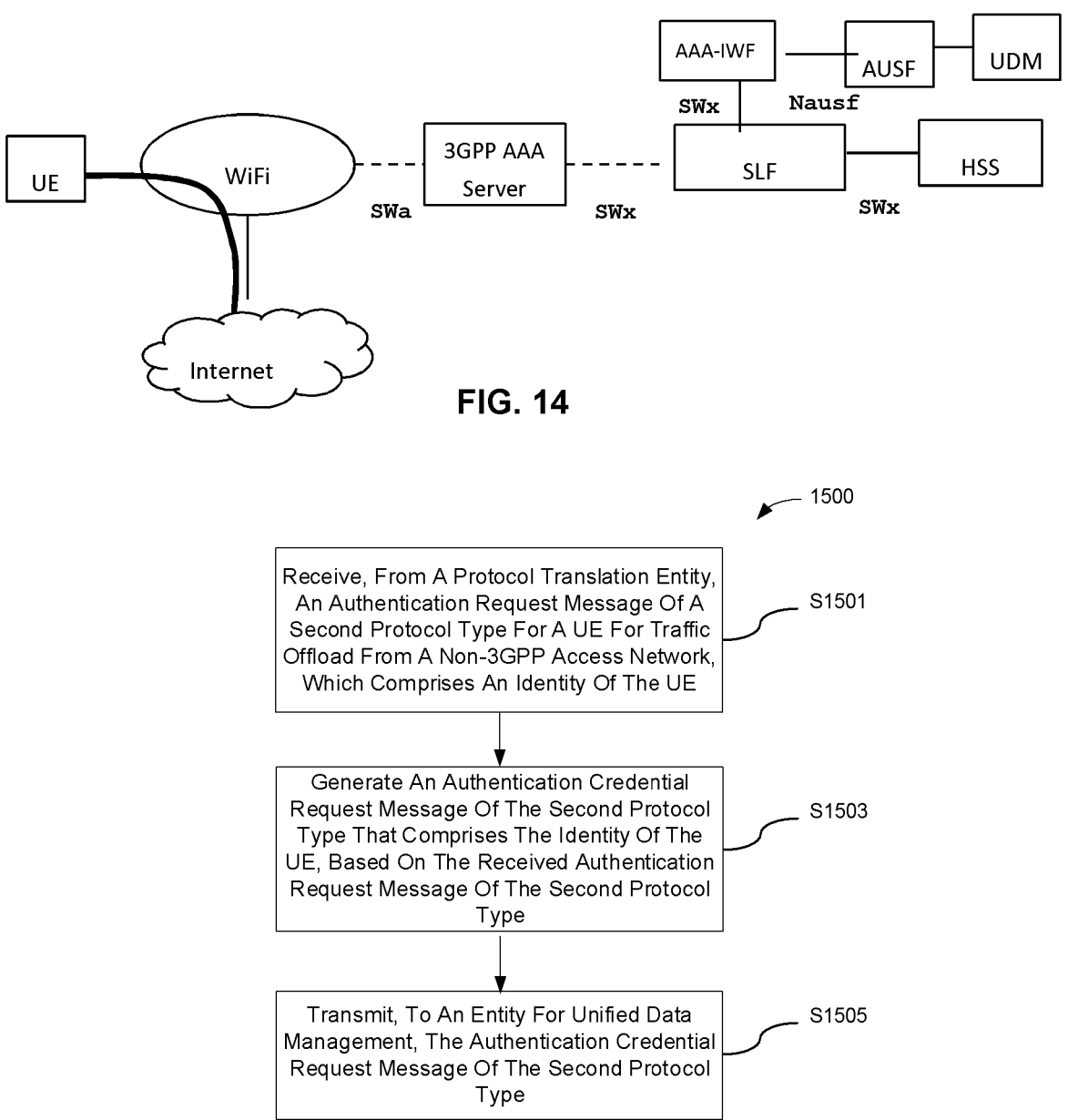

Receive, From A Protocol Translation Entity, An Authentication Request Message Of A Second Protocol Type For A UE For Traffic Offload From A Non-3GPP Access Network, Which Comprises An Identity Of The UE    S1501

Generate An Authentication Credential Request Message Of The Second Protocol Type That Comprises The Identity Of The UE, Based On The Received Authentication Request Message Of The Second Protocol Type    S1503

Transmit, To An Entity For Unified Data Management, The Authentication Credential Request Message Of The Second Protocol Type    S1505

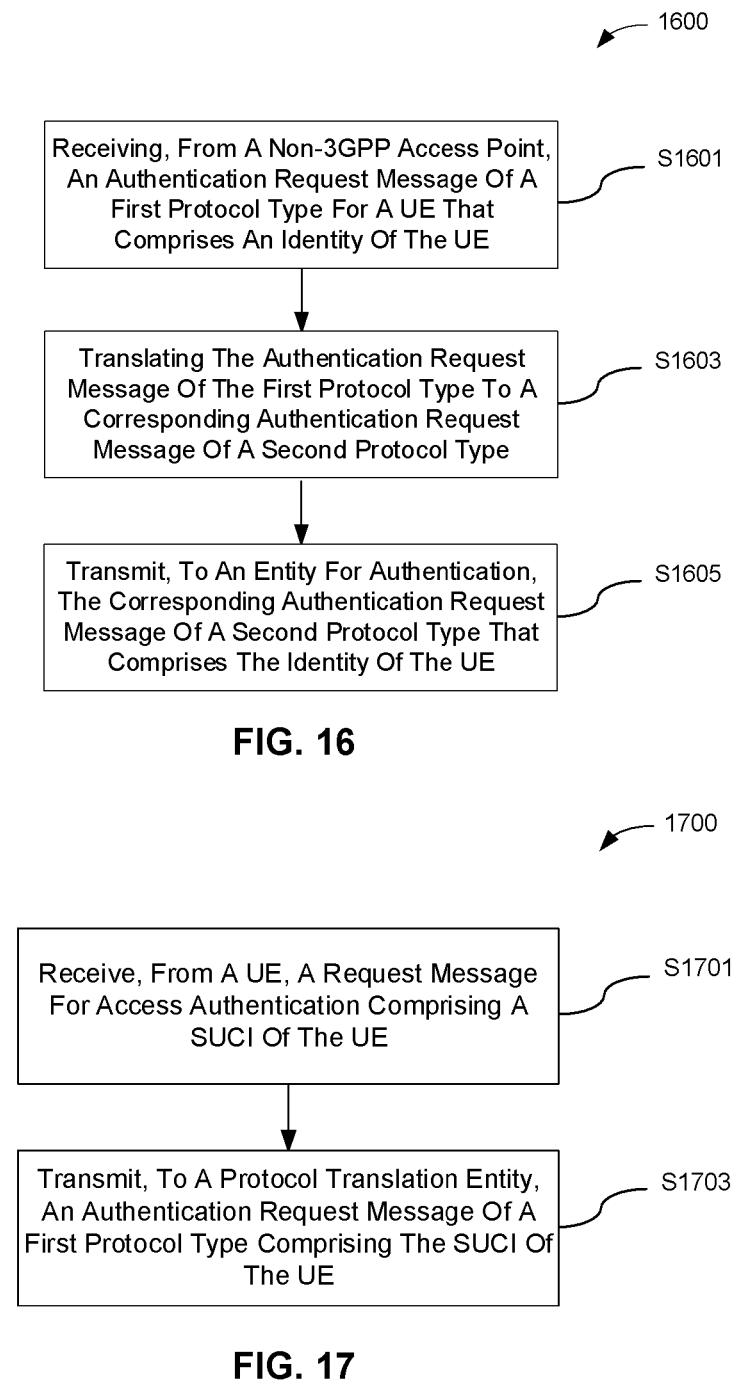

Receiving, From A Non-3GPP Access Point, An Authentication Request Message Of A First Protocol Type For A UE That Comprises An Identity Of The UE — S1601

Translating The Authentication Request Message Of The First Protocol Type To A Corresponding Authentication Request Message Of A Second Protocol Type — S1603

Transmit, To An Entity For Authentication, The Corresponding Authentication Request Message Of A Second Protocol Type That Comprises The Identity Of The UE — S1605

Receive, From A UE, A Request Message For Access Authentication Comprising A SUCI Of The UE — S1701

Transmit, To A Protocol Translation Entity, An Authentication Request Message Of A First Protocol Type Comprising The SUCI Of The UE — S1703

FIG. 17

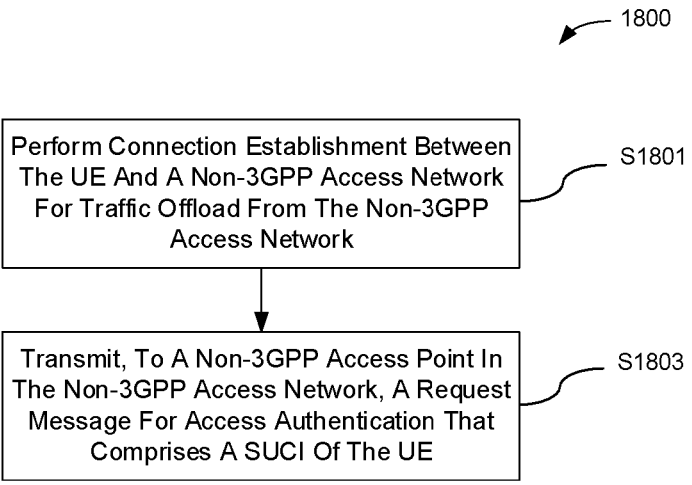

1800

Perform Connection Establishment Between
The UE And A Non-3GPP Access Network
For Traffic Offload From The Non-3GPP
Access Network — S1801

Transmit, To A Non-3GPP Access Point In
The Non-3GPP Access Network, A Request
Message For Access Authentication That
Comprises A SUCI Of The UE — S1803

FIG. 18

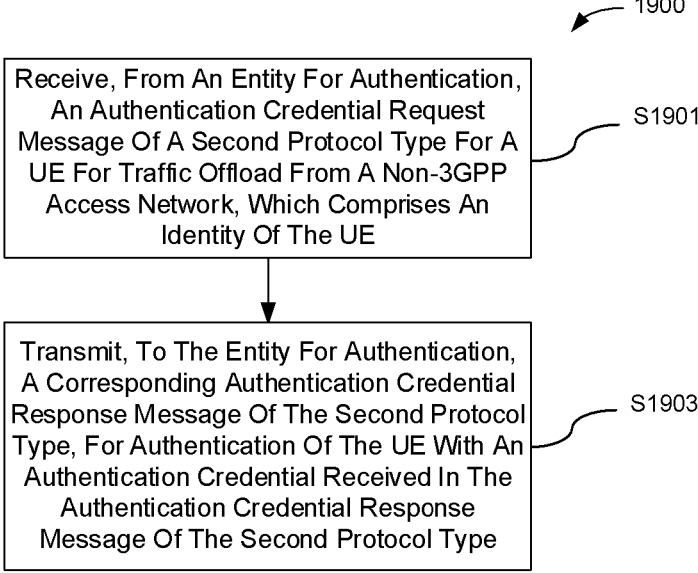

1900

Receive, From An Entity For Authentication,
An Authentication Credential Request
Message Of A Second Protocol Type For A
UE For Traffic Offload From A Non-3GPP
Access Network, Which Comprises An
Identity Of The UE — S1901

Transmit, To The Entity For Authentication,
A Corresponding Authentication Credential
Response Message Of The Second Protocol
Type, For Authentication Of The UE With An
Authentication Credential Received In The
Authentication Credential Response
Message Of The Second Protocol Type — S1903

FIG. 19

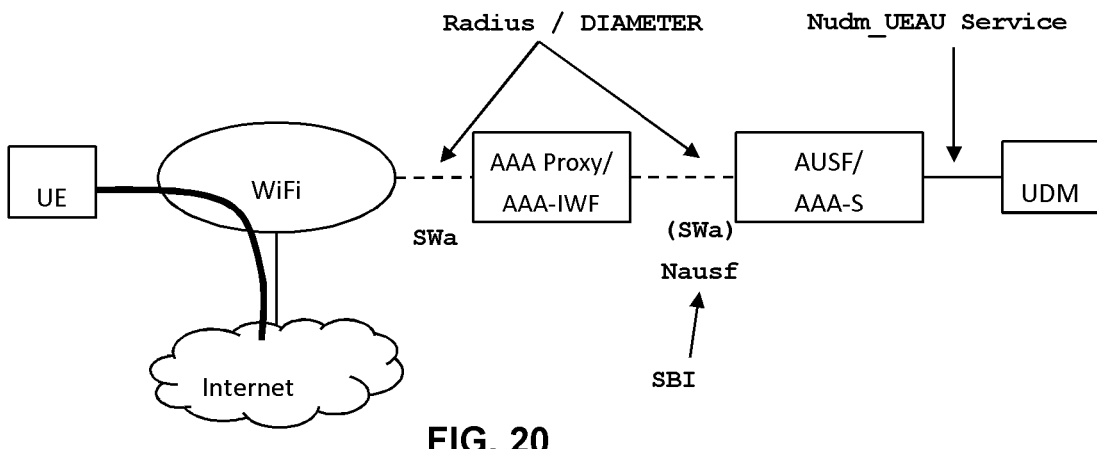

Receiving, From A First Non-3GPP Access Point In The Non-3GPP Access Network, A Notification Of Traffic Offload From The Non-3GPP Access Network For A UE That Is Authenticated — S2501

Performing The Traffic Offload From The Non-3GPP Access Network — S2503

Authentication via NAS

AUSF   UDM

UE   WiFi network   TWIF*   N1/N2   AMF

SMF

UPF

Internet

User plane directly offloaded or via

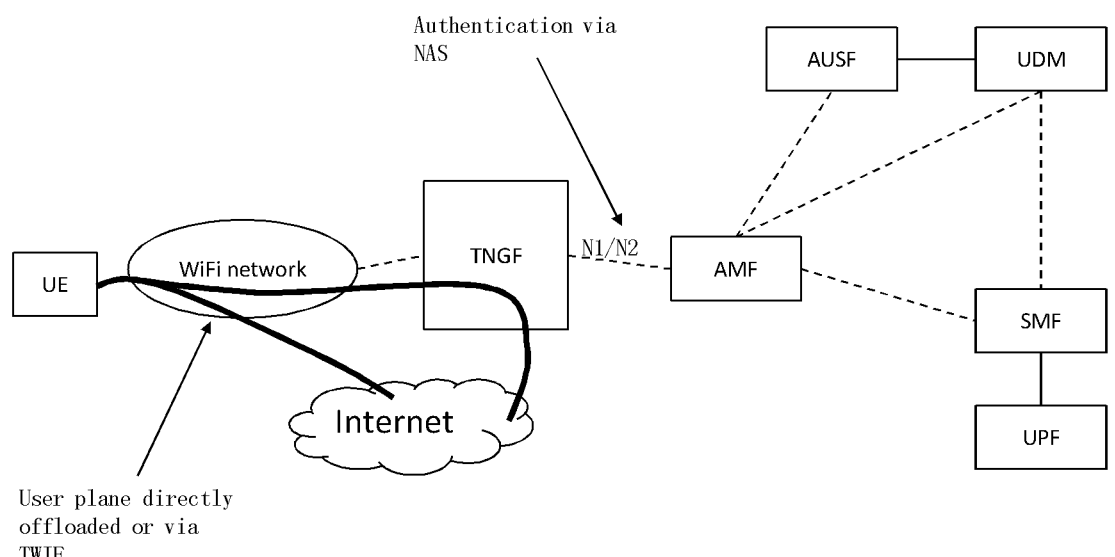
Fig. 28
Entity For AAA <u>2900</u>
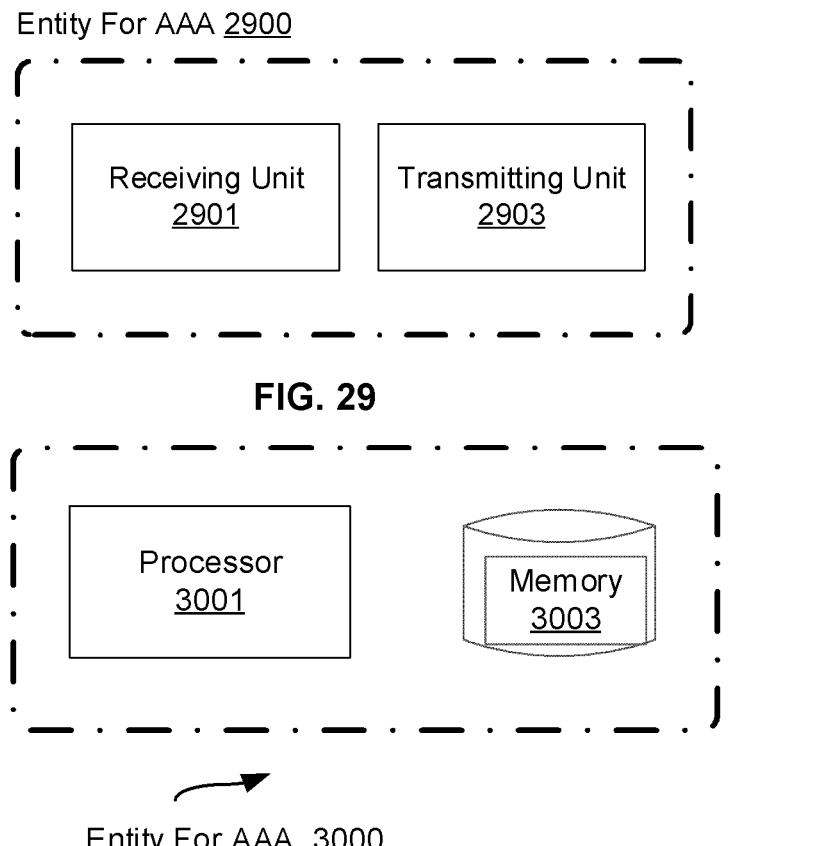
FIG. 29
FIG. 30

Entity For AAA 3100

Entity For AAA 3200

Protocol Translation Entity 3300

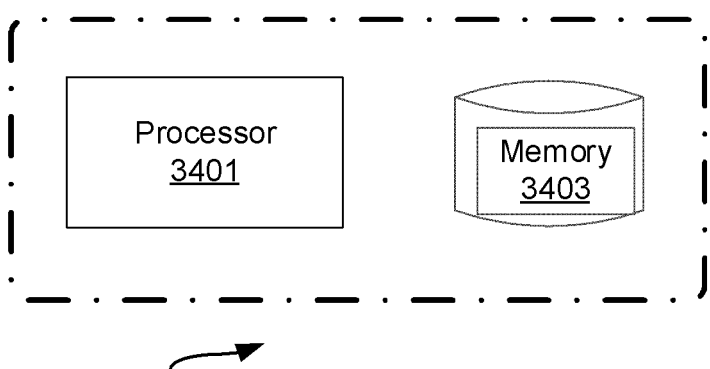
Protocol Translation Entity  3400
FIG. 34
Message Routing Entity 3500
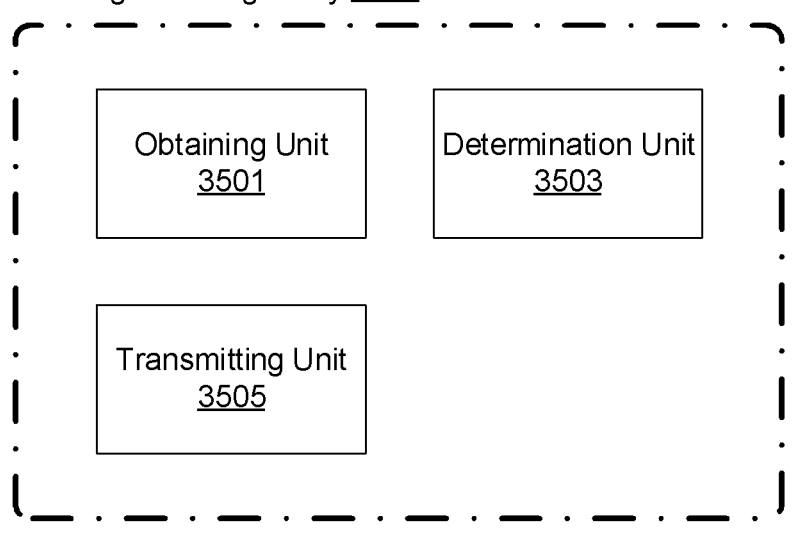
FIG. 35
Message Routing Entity  3600
FIG. 36

Entity For Authentication <u>3700</u>

Entity For Authentication <u>3800</u>

Entity For Authentication <u>3900</u>

| Receiving Unit <br> <u>3901</u> | Generation Unit <br> <u>3903</u> |
|---|---|
| Transmitting Unit <br> <u>3905</u> | |

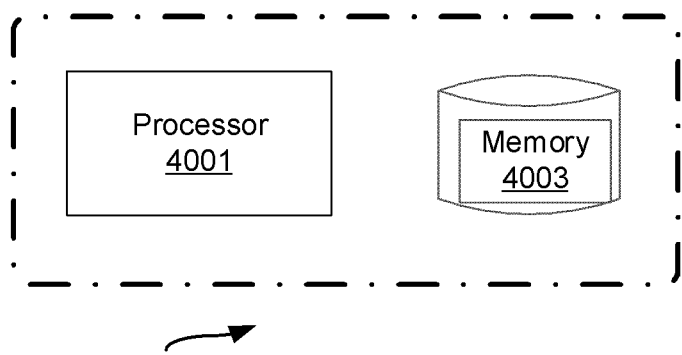
Entity For Authentication  4000
FIG. 40
Protocol Translation Entity 4100
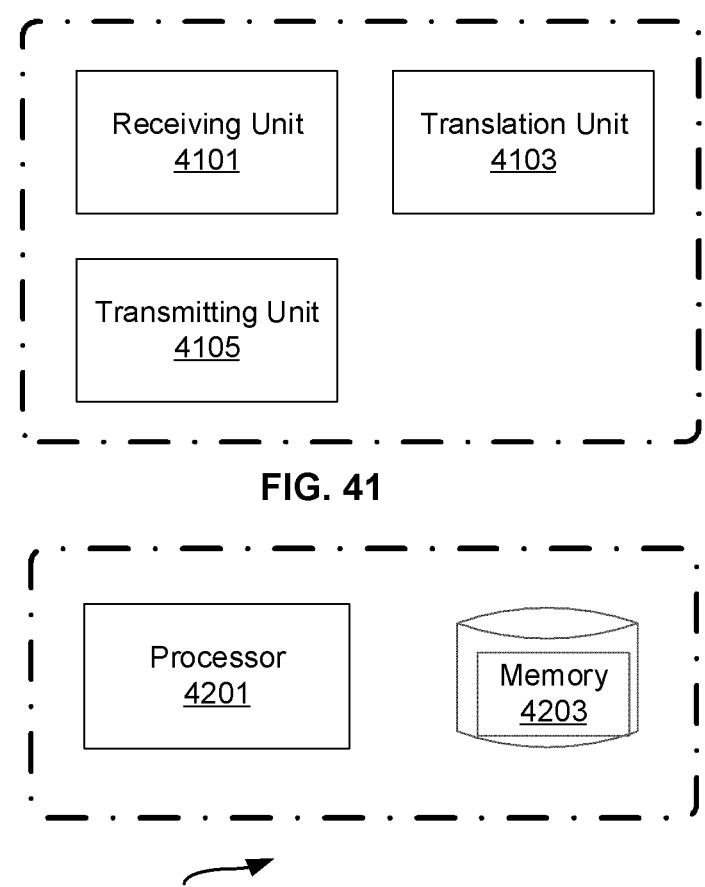
FIG. 41
Protocol Translation Entity  4200
FIG. 42

Non-3GPP Access Point 4300

Non-3GPP Access Point 4400

UE 4500

UE 4600

Entity For Unified Data Management 4700

Entity For Unified Data Management 4800

First Non-3GPP Access Point 4900

First Non-3GPP Access Point 5000

Entity For Mobility Management 5100
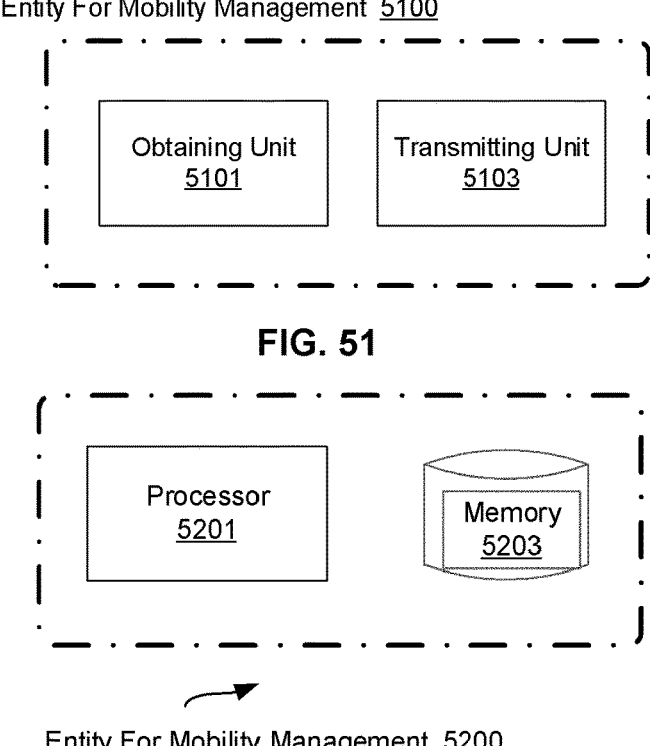
FIG. 51
Entity For Mobility Management 5200
FIG. 52
Second Non-3GPP Access Point 5300
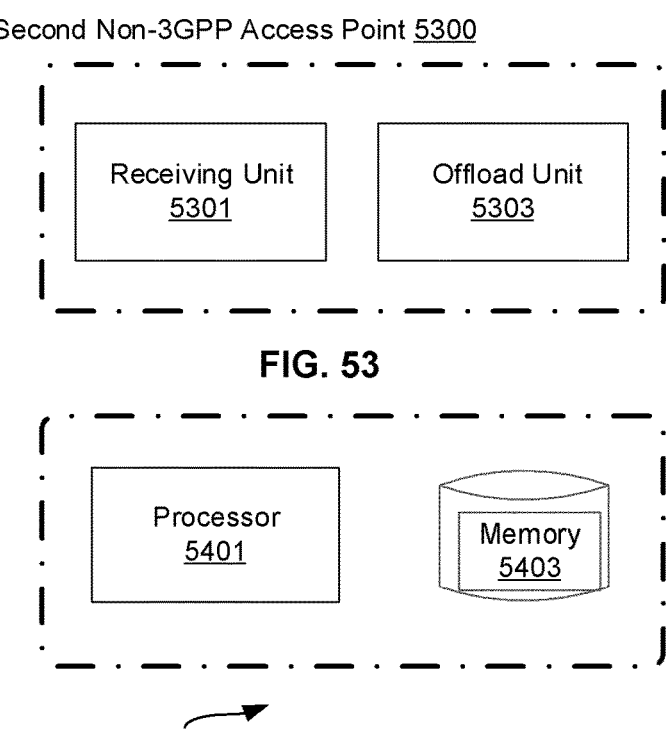
FIG. 53
Second Non-3GPP Access Point 5400
FIG. 54

METHODS, ENTITIES AND COMPUTER READABLE MEDIA FOR NON-3GPP ACCESS AUTHENTICATION

PRIORITY CLAIM

This application is a national stage application of International Patent Application No. PCT/CN2021/137968, filed Dec. 14, 2021, which claims priority to International Patent Application No. PCT/CN2020/136618, filed Dec. 15, 2020, the disclosure disclosures of which are hereby incorporated in their entirety by reference.

TECHNICAL FIELD

The present disclosure generally relates to the technical field of communication technologies, and particularly to methods, entities, and computer readable media for Non-$3^{rd}$ Generation Partnership Project (Non-3GPP) access authentication.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In Evolved Packet System (EPS), besides the native $3^{rd}$ Generation Partnership Project (3GPP)-access technologies, such as Long Term Evolution (LTE), there is also support for access to data communication services and/or Internet services via non-3GPP access, including in particular access through a home network, such as a Home Public Land Mobile Network (HPLMN) via non-3GPP access methods/technologies/networks/standards, e.g. World Interoperability for Microwave Access (WiMAX) according to the standard IEEE 802.16, a Wireless Local Area Network (WLAN), e.g. according to the standard IEEE 802.11g/n, etc.

There are similar deployments in 5G System (5GS).

However, there are some problems in the conventional technical solutions for Non-3GPP access authentication.

SUMMARY

In order to solve or at least alleviate the above problems in the conventional technical solutions, the present disclosure provides different architectural options to support interactions with non-3GPP access for the purpose of non-3GPP access authentication using UE credentials defined in the 5GC e.g. using EAP-AKA or EAP-AKA'.

According to a first aspect of the present disclosure, a method performed by a protocol translation entity is provided. The method includes: receiving, from a Non-3GPP access point, an authentication request message of a first protocol type for a UE that includes an identity of the UE; translating the authentication request message of the first protocol type to a corresponding authentication request message of a second protocol type; and transmitting, to an entity for authentication, the corresponding authentication request message of a second protocol type that includes the identity of the UE.

In an exemplary embodiment, the identity of the UE is a SUbscription Concealed Identifier (SUCI) of the UE.

In an exemplary embodiment, the authentication request message of the second protocol type is transmitted to the entity for authentication for traffic offload from a Non-3GPP access network.

In an exemplary embodiment, the method further includes: receiving, from the entity for authentication, an authentication response message of the second protocol type; translating the authentication response message of the second protocol type to a corresponding authentication response message of the first protocol type; and transmitting, to the Non-3GPP access point, the corresponding authentication response message of the first protocol type.

In an exemplary embodiment, the protocol translation entity is arranged at an Authentication, Authorization and Accounting 'AAA' proxy.

In an exemplary embodiment, the first protocol type refers to an Evolved Packet Core (EPC) protocol, and the second protocol type refers to a 5G Core (5GC) protocol.

In an exemplary embodiment, the authentication request message of the first protocol type includes a Diameter based authentication request message over an SWa/STa interface; the authentication request message of the second protocol type includes an authentication request message over an SBI interface with the entity for authentication; the authentication response message of the first protocol type includes a Diameter based authentication response message over an SWa/STa interface; and the authentication response message of the second protocol type includes an authentication response message over the SBI interface with the entity for authentication.

In an exemplary embodiment, the protocol translation entity includes an AAA-Interworking Function (IWF), and the entity for authentication includes an Authentication Server Function (AUSF) or an AAA arranged at an AUSF.

According to a second aspect of the present disclosure, a protocol translation entity is provided. The protocol translation entity includes: at least one processor, and at least one memory, storing instructions which, when executed on the at least one processor, cause the protocol translation entity to perform the first aspect of the present disclosure.

According to a third aspect of the present disclosure, a method performed by a Non-3GPP access point is provided. The method includes: receiving, from a UE, a request message for access authentication including a SUCI of the UE; and transmitting, to a protocol translation entity, an authentication request message of a first protocol type including the SUCI of the UE.

In an exemplary embodiment, the method further includes: receiving, from the protocol translation entity, an authentication response message of the first protocol type.

In an exemplary embodiment, the first protocol type refers to an EPC protocol.

In an exemplary embodiment, the authentication request message of the first protocol type includes a Diameter based authentication request message over an SWa/STa interface; and the authentication response message of the first protocol type includes a Diameter based authentication response message over an SWa/STa interface.

In an exemplary embodiment, the protocol translation entity includes an AAA-IWF.

According to a fourth aspect of the present disclosure, a Non-3GPP access point is provided. The Non-3GPP access point includes: at least one processor, and at least one memory, storing instructions which, when executed on the at least one processor, cause the Non-3GPP access point to perform the third aspect of the present disclosure.

According to a fifth aspect of the present disclosure, a method performed by a UE is provided. The method includes: performing connection establishment between the UE and a Non-3GPP access network for traffic offload from the Non-3GPP access network; and transmitting, to a Non-3GPP access point in the Non-3GPP access network, a request message for access authentication that includes a SUCI of the UE.

In an exemplary embodiment, the method further includes: receiving, from the Non-3GPP access point, a response message for access authentication.

According to a sixth aspect of the present disclosure, a UE is provided. The UE includes: at least one processor, and at least one memory, storing instructions which, when executed on the at least one processor, cause the UE to perform the sixth aspect of the present disclosure.

According to a seventh aspect of the present disclosure, a method performed by an entity for authentication is provided. The method includes: receiving, from a protocol translation entity, an authentication request message of a second protocol type for a UE for traffic offload from a Non-3GPP access network, which includes an identity of the UE; generating an authentication credential request message of the second protocol type based on the received authentication request message of the second protocol type; and transmitting, to an entity for unified data management, the authentication credential request message of the second protocol type that includes the identity of the UE.

In an exemplary embodiment, the identity of the UE is a SUCI of the UE.

In an exemplary embodiment, the authentication credential request message of the second protocol type is transmitted to the entity for unified data management for traffic offload from a Non-3GPP access network.

In an exemplary embodiment, the method includes: receiving, from the entity for unified data management, a corresponding authentication credential response message of the second protocol type, for authentication of the UE with an authentication credential received in the authentication credential response message of the second protocol type; and generating an authentication response message of the second protocol type based on the received authentication credential response message of the second protocol type; and transmitting, to the protocol translation entity, the authentication response message of the second protocol type.

In an exemplary embodiment, the authentication request message of the second protocol type includes an authentication request message over an SBI interface with the protocol translation entity; the authentication credential request message of the second protocol type includes an authentication credential request message over an SBI interface with the entity for unified data management; the authentication credential response message of the second protocol type includes an authentication credential response message over an SBI interface with the entity for unified data management; and the authentication response message of the second protocol type includes an authentication response message over the SBI interface with the protocol translation entity.

In an exemplary embodiment, the entity for authentication includes an AAA, and is arranged at an AUSF.

In an exemplary embodiment, the entity for authentication includes an AUSF.

In an exemplary embodiment, the entity for unified data management includes a Unified Data Management (UDM), and the protocol translation entity includes an AAA-IWF.

In an exemplary embodiment, the second protocol type refers to a 5GC protocol.

According to an eighth aspect of the present disclosure, an entity for authentication is provided. The entity for authentication includes: at least one processor, and at least one memory, storing instructions which, when executed on the at least one processor, cause the entity for authentication to perform the seventh aspect of the present disclosure.

According to a ninth aspect of the present disclosure, a method performed by an entity for unified data management is provided. The method includes: receiving, from an entity for authentication, an authentication credential request message of a second protocol type for a UE for traffic offload from a Non-3GPP access network, which includes an identity of the UE; and transmitting, to the entity for authentication, a corresponding authentication credential response message of the second protocol type, for authentication of the UE with an authentication credential received in the authentication credential response message of the second protocol type.

In an exemplary embodiment, the identity of the UE is a SUCI of the UE.

In an exemplary embodiment, the authentication credential request message of the second protocol type is received from the entity for authentication for traffic offload from a Non-3GPP access network.

In an exemplary embodiment, the authentication credential request message of the second protocol type includes an authentication credential request message over an SBI interface with the entity for authentication; and the authentication credential response message of the second protocol type includes an authentication credential response message over an SBI interface with the entity for authentication.

In an exemplary embodiment, the entity for authentication includes an AAA, and is arranged at an AUSF.

In an exemplary embodiment, the entity for authentication includes an AUSF.

In an exemplary embodiment, the entity for unified data management includes a UDM, and the protocol translation entity includes an AAA-IWF.

In an exemplary embodiment, the second protocol type refers to a 5GC protocol.

According to a tenth aspect of the present disclosure, an entity for unified data management is provided. The entity for unified data management includes: at least one processor, and at least one memory, storing instructions which, when executed on the at least one processor, cause the entity for unified data management to perform the ninth aspect of the present disclosure.

According to an eleventh aspect of the present disclosure, a computer readable storage medium is provided. The computer readable storage medium has computer program instructions stored thereon, the computer program instructions, when executed by at least one processor, causing the at least one processor to perform the method according to any of the first, third, fifth, seventh and ninth aspects of the present disclosure.

The technical solutions of the present disclosure may achieve at least benefits of enabling Non-3GPP access authentication with minimum/no impact on the existing Wi-Fi access network and the 5GC.

BRIEF DESCRIPTION OF THE DRAWINGS

The objects, advantages and characteristics of the present disclosure will be more apparent, according to descriptions of preferred embodiments in connection with the drawings, in which:

FIG. 4 schematically shows an exemplary method at an entity for AAA for non-3GPP access authentication according to a first exemplary embodiment of the present disclosure;

FIG. 5 schematically shows another exemplary method at an entity for AAA for non-3GPP access authentication according to the first exemplary embodiment of the present disclosure;

FIG. 8 schematically shows an exemplary method at an entity for authentication for non-3GPP access authentication according to the first exemplary embodiment of the present disclosure;

FIG. 9 schematically shows an exemplary architecture for non-3GPP access authentication, in which the methods of FIGS. 4~8 according to the first exemplary embodiment of the present disclosure are applied;

FIG. 14 schematically shows another exemplary architecture for non-3GPP access authentication, in which the methods of FIGS. 4~8 according to the first exemplary embodiment of the present disclosure are applied;

FIG. 15 schematically shows an exemplary method at an entity for authentication for non-3GPP access authentication according to a second exemplary embodiment of the present disclosure;

FIG. 16 schematically shows an exemplary method at a protocol translation entity for non-3GPP access authentication according to the second exemplary embodiment of the present disclosure;

FIG. 17 schematically shows an exemplary method at a non-3GPP access point according to the second exemplary embodiment of the present disclosure;

FIG. 18 schematically shows an exemplary method at a UE according to the second exemplary embodiment of the present disclosure;

FIG. 19 schematically shows an exemplary method at an entity for unified data management according to the second exemplary embodiment of the present disclosure;

FIG. 20 schematically shows an exemplary architecture for non-3GPP access authentication, in which the methods of FIGS. 15~19 according to the second exemplary embodiment of the present disclosure are applied;

FIG. 28 schematically shows another exemplary architecture for non-3GPP access authentication, in which the methods of FIGS. 23~25 according to the third exemplary embodiment of the present disclosure are applied;

FIG. 29 schematically shows an exemplary structural block diagram of an entity for AAA according to the first exemplary embodiment of the present disclosure;

FIG. 30 schematically shows another exemplary structural block diagram of an entity for AAA according to the first exemplary embodiment of the present disclosure;

FIG. 34 schematically shows another exemplary structural block diagram of a protocol translation entity according to the first exemplary embodiment of the present disclosure;

FIG. 35 schematically shows an exemplary structural block diagram of a message routing entity according to the first exemplary embodiment of the present disclosure;

FIG. 36 schematically shows another exemplary structural block diagram of a message routing entity according to the first exemplary embodiment of the present disclosure;

FIG. 40 schematically shows another exemplary structural block diagram of an entity for authentication according to the second exemplary embodiment of the present disclosure;

FIG. 41 schematically shows an exemplary structural block diagram of a protocol translation entity according to the second exemplary embodiment of the present disclosure;

FIG. 42 schematically shows another exemplary structural block diagram of a protocol translation entity according to the second exemplary embodiment of the present disclosure;

FIG. 51 schematically shows an exemplary structural block diagram of an entity for mobility management according to the third exemplary embodiment of the present disclosure;

FIG. 52 schematically shows another exemplary structural block diagram of a first Non-3GPP access point according to the third exemplary embodiment of the present disclosure;

FIG. 53 schematically shows an exemplary structural block diagram of a second Non-3GPP access point according to the third exemplary embodiment of the present disclosure; and FIG. 54 schematically shows another exemplary structural block diagram of a second Non-3GPP access point according to the third exemplary embodiment of the present disclosure.

Figure 1:
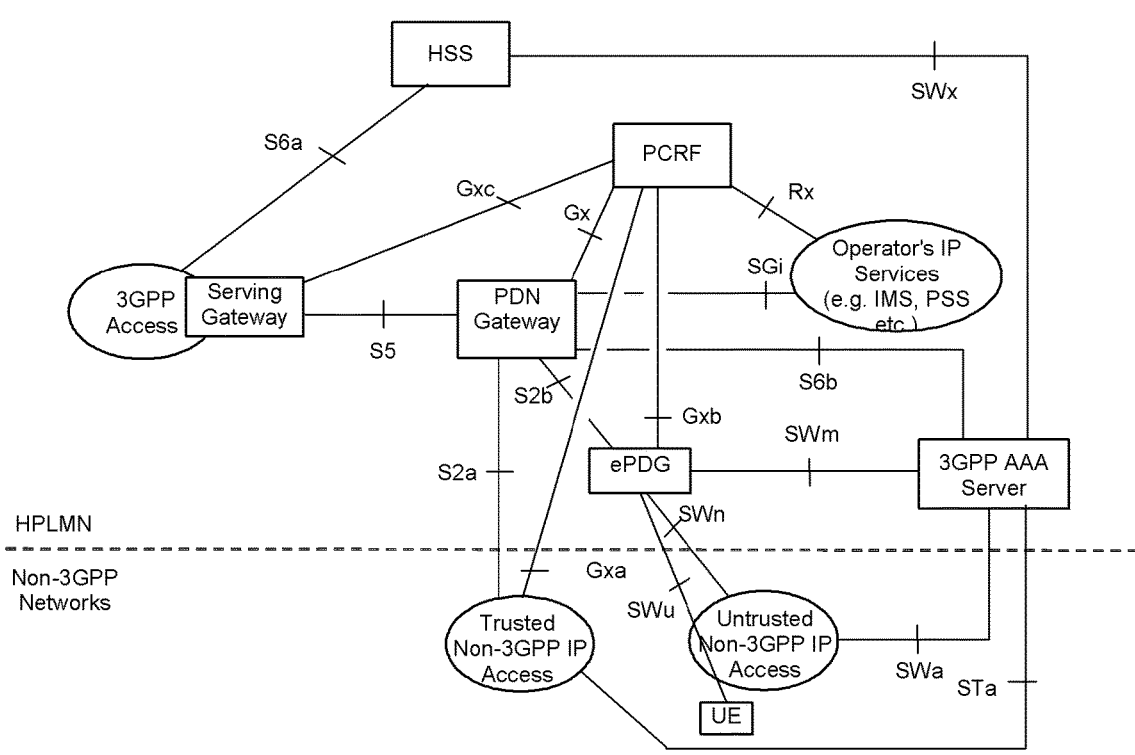
FIG. 1 schematically shows an exemplary non-roaming architecture within EPS supporting for 3GPP access and non-3GPP access.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

Hereinafter, the principle and spirit of the present disclosure will be described with reference to illustrative embodiments. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Those skilled in the art will appreciate that the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be liming of exemplary embodiments. As used herein, the singular forms "a", "an" and "the" are intended to include the plural forms as well, unless the context clearly indicates otherwise. It will be further understood that the terms "comprises", "comprising", "has", "having", "includes"

and/or "including", when used herein, specify the presence of stated features, elements, and/or components etc., but do not preclude the presence or addition of one or more other features, elements, components and/or combinations thereof.

As used herein, the term "and/or" includes any and all combinations of one or more of the associated listed terms.

In the following description and claims, unless defined otherwise, all technical and scientific terms used herein have the same meaning as commonly understood by one of ordinary skills in the art to which this disclosure belongs.

As used herein, the term "network" refers to a network following any suitable (wireless or wired) communication standards. For example, the wireless communication standards may include new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably.

Furthermore, the communications between two devices in the network may be performed according to any suitable communication protocols, including, but not limited to, the wireless communication protocols as defined by a standard organization such as 3GPP or the wired communication protocols. For example, the wireless communication protocols may include the first generation (1G), 2G, 3G, 4G, 4.5G, 5G communication protocols, and/or any other protocols either currently known or to be developed in the future.

The term "entity" or "network entity" used herein refers to a network device or network node or network function in a communication network, and may also refer to a virtualized entity that may be implemented on cloud. For example, in a wireless communication network such as a 3GPP-type cellular network, a core network device may offer numerous services to customers who are interconnected by an access network device. Each access network device is connectable to the core network device over a wired or wireless connection.

The term "CN entity" refers to any suitable function which can be implemented in a network entity (physical or virtual) of a communication network. For example, a network entity can be implemented either as a network element on a dedicated hardware, as a software instance running on a dedicated hardware, or as a virtualized function instantiated on an appropriate platform, e.g. on a cloud infrastructure. For example, the 5G Core Network system (5GC) may include a plurality of functions such as AMF, SMF, UDM (Unified Data Management), PCF (Policy Control Function), UPF (User plane Function), NRF (Network Repository Function), etc. For example, the 4G Core Network system (such as EPC) may include MME, HSS (home subscriber server), P-GW, BM-SC, etc. In other embodiments, the CN entity may include different types of functions for example depending on the specific network.

As previously described, in EPS, besides the native 3GPP-access technologies, such as LTE, there is also support for access to data communication services and/or Internet services via Non-3GPP access, including in particular access through a home network, such as a HPLMN via Non-3GPP access methods/technologies/networks/standards, e.g. WiMAX according to the standard IEEE 802.16, a WLAN, e.g. according to the standard IEEE 802.11g/n, etc.

There are two categories of non-3GPP access: trusted non-3GPP access and non-trusted non-3GPP access (also called "untrusted" non-3GPP access herein). It may be understood that the trusted and untrusted non-3GPP access means access using an access technology whose specification is outside the scope of 3GPP.

FIG. 1 schematically shows an exemplary non-roaming architecture within EPS supporting for not only the 3GPP access but also the non-3GPP access as defined in 3GPP TS 23.402 v16.0.0, "Architecture enhancement for non-3GPP accesses", which is incorporated herein in its entirety by reference.

For the 3GPP access, the 3GPP access point (the "3GPP Access" in FIG. 1) authenticates with the Home Subscriber Server (HSS) for the User Equipment (UE) via the S6a reference point (also called "interface" herein). After the authentication is successful, the 3GPP access point establishes an IP connection for the UE over the EPC, i.e., connected via the S5 and SGi reference points to the Operator's IP Services.

For the trusted non-3GPP access, the trusted non-3GPP access point (the "Trusted Non-3GPP IP Access" in FIG. 1) authenticates with the HSS for the UE by means of a 3GPP Authentication, Authorization and Accounting (AAA) server, i.e., via the STa and the SWx reference points. After the authentication is successful, the trusted non-3GPP access point establishes an IP connection over the EPC, i.e., connected via the S2a and SGi reference points to the Operator's IP Services.

For the untrusted non-3GPP access, the untrusted non-3GPP access point (the "Untrusted Non-3GPP IP Access" in FIG. 1) is connected to the Evolved Packet Core (EPC) via the 3GPP AAA server over an evolved Packet Data Gateway (ePDG). For the untrusted access, the UE shall perform mutual authentication during the Internet Protocol Security (IPsec) tunnel establishment between the UE and the ePDG over the SWu reference point. The UE is connected to the ePDG via the SWu reference point, and the ePDG authenticates with the HSS for the UE by means of the 3GPP AAA server, i.e., via the SWm and SWx reference points. After the authentication is successful, the ePDG establishes an IP connection over the EPC, i.e., via the S2b and SGi reference points to the Operator's IP Services.

What the above three types of access have in common is that the authentication related information (e.g. Authentication and Key Agreement (AKA) Authentication Vectors (AVs) for Extensible Authentication Protocol (EAP)-AKA or EAP-AKA') is fetched from the HSS in EPC for authentication of the UE; after the authentication is successful, an IP connection is established for the UE over the EPC, and the Operator's IP Services may be connected via the SGi reference point, no matter the previous reference point is S5 (for the 3GPP access), S2a (for the trusted non-3GPP access) or S2b (for the untrusted non-3GPP access).

In addition, the non-3GPP access network may also provide an "offload" function, i.e., directly connected to e.g., the Internet via the non-3GPP access network without establishing a data connection over the EPC, e.g., Wi-Fi Offload. In the example of FIG. 1, for the purpose of offload from the untrusted non-3GPP access network, before the IPsec tunnel establishment between the UE and the ePDG can be performed, the UE needs to obtain IP connectivity across the access network, which may require additional access authentication. The additional access authentication is independent of the EAP-AKA authentication running in conjunction with the IPsec tunnel establishment over the ePDG, and may be required for the security of the untrusted non-3GPP access network and achieved over the SWa reference point.

The SWa reference point transports access authentication, authorization and charging-related information in a secure manner. The 3GPP AAA server fetches authentication related information (e.g. AKA Authentication Vectors (AVs) for EAP-AKA or EAP-AKA), subscription and Packet Data Network (PDN) connection data from the HSS in EPC via the SWx reference point.

After the authentication of the UE via the SWa and SWx reference points is successful, the UE will not establish data connection over the EPC, but connects to e.g. the Internet via the untrusted non-3GPP access network, i.e., offload from the untrusted non-3GPP access network.

A typical use of this additional access authentication is for Wi-Fi access authentication e.g. in stadia, hotels, coffee shops etc. This is, only SWa with the 3GPP AAA server is used, but mobility and PDN connectivity services are not required from the EPC (i.e. ePDG/SWm is not required).

Support for access in 5G System (5GS) is different from that in EPS as previously described. A unified access architecture is utilized in 5G Core (5GC) where the Access and Mobility Management Function (AMF) is used as an entry point in 5GC, regardless of whether the UE connects via the 3GPP access or the non-3GPP access (trusted and untrusted). And the same primary authentication architecture with the Authentication Server Function (AUSF) and the Unified Data Management (UDM) in the 5GC is also utilized for both the 3GPP access and the non-3GPP access (trusted and untrusted).

Figure 2A:
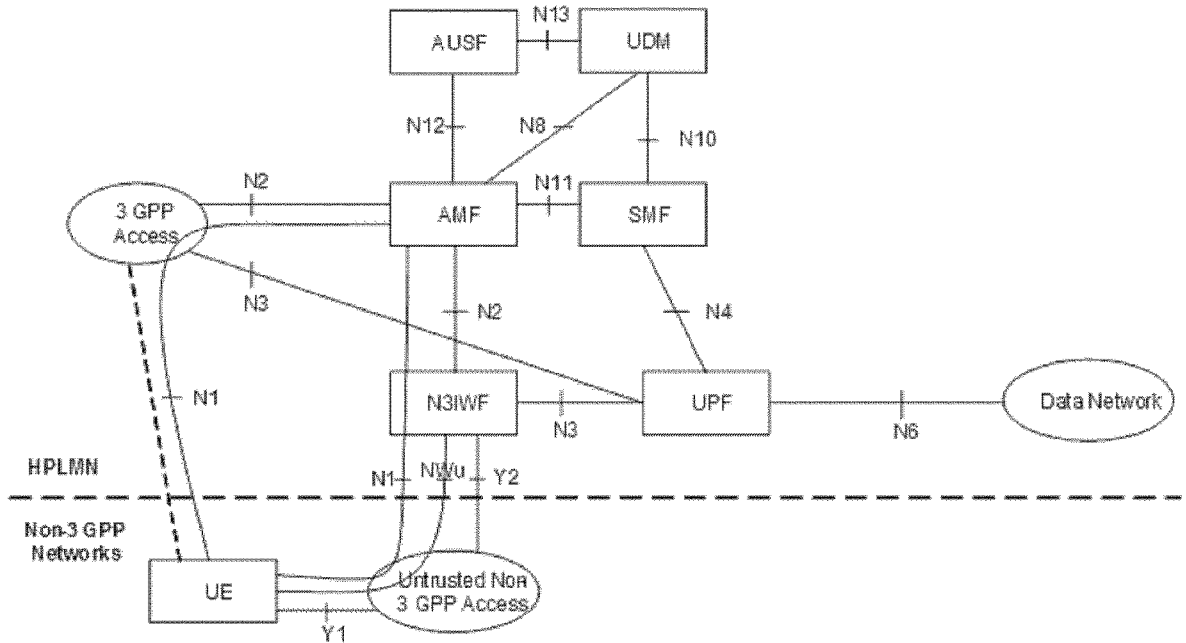
FIG. 2A schematically shows an exemplary non-roaming architecture for 5GC supporting for 3GPP access and untrusted non-3GPP access.

3GPP TS 23.501 v16.6.0 defines support for untrusted non-3GPP access in 5GC, which is incorporated herein in its entirety by reference. FIG. 2A schematically shows an exemplary non-roaming architecture for 5GC supporting for not only the 3GPP access but also the untrusted non-3GPP access.

As shown in FIG. 2A, for the 3GPP access, the UE connects to the AMF via the N1 and N2 reference points, and the AMF authenticates with the AUSF and the UDM for the UE via the N12 and N13 reference points. After the authentication is successful, an IP connection is established for the UE over the 5GC, i.e., connected via the N3 and N6 reference points to the data network.

For the untrusted non-3GPP access, the untrusted non-3GPP access network is connected to the 5GC via a Non-3GPP InterWorking Function (N3IWF). Similar with the 3GPP access, the UE connects to the AMF via the N1 and N2 reference points, and the AMF authenticates with the AUSF and the UDM for the UE via the N12 and N13 reference points. After the authentication is successful, an IP connection is established for the UE over the 5GC, i.e., connected via the N3 and N6 reference points to the data network.

Figure 2B:
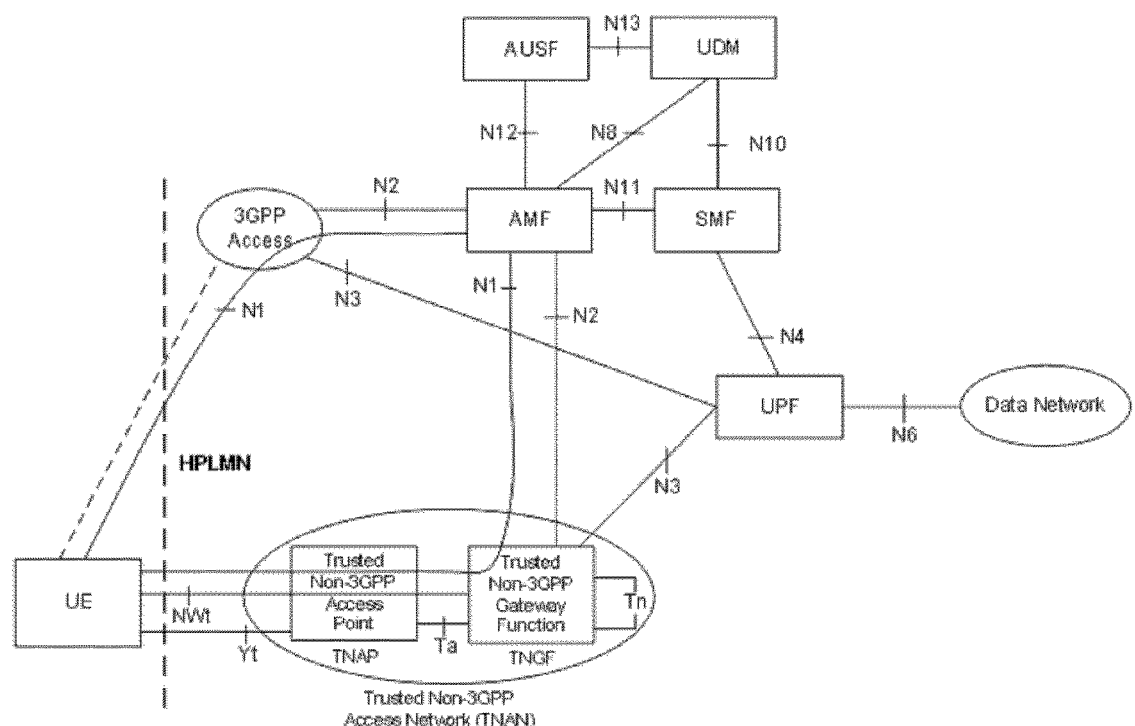
FIG. 2B schematically shows an exemplary non-roaming architecture for 5GC supporting for 3GPP access and trusted non-3GPP access.

FIG. 2B schematically shows an exemplary non-roaming architecture for 5GC supporting for not only the 3GPP access but also the trusted non-3GPP access.

As shown in FIG. 2B, for the trusted non-3GPP access, the trusted non-3GPP access network is connected to the 5GC via a Trusted Non-3GPP Gateway Function (TNGF). Similar with the 3GPP access, the UE connects to the AMF via the N1 and N2 reference points, and the AMF authenticates with the AUSF and the UDM for the UE via the N12 and N13 reference points. After the authentication is successful, an IP connection is established for the UE over the 5GC, i.e., connected via the N3 and N6 reference points to the data network.

3GPP TS 23.501 v16.6.0 also defines 5GC architectural enhancements that enable devices that do not support 5GC Non-Access Stratum (NAS) signaling over WLAN access ("Non-5G-Capable over WLAN", N5CW devices) to access 5GC via trusted WLAN access networks.

Figure 3:
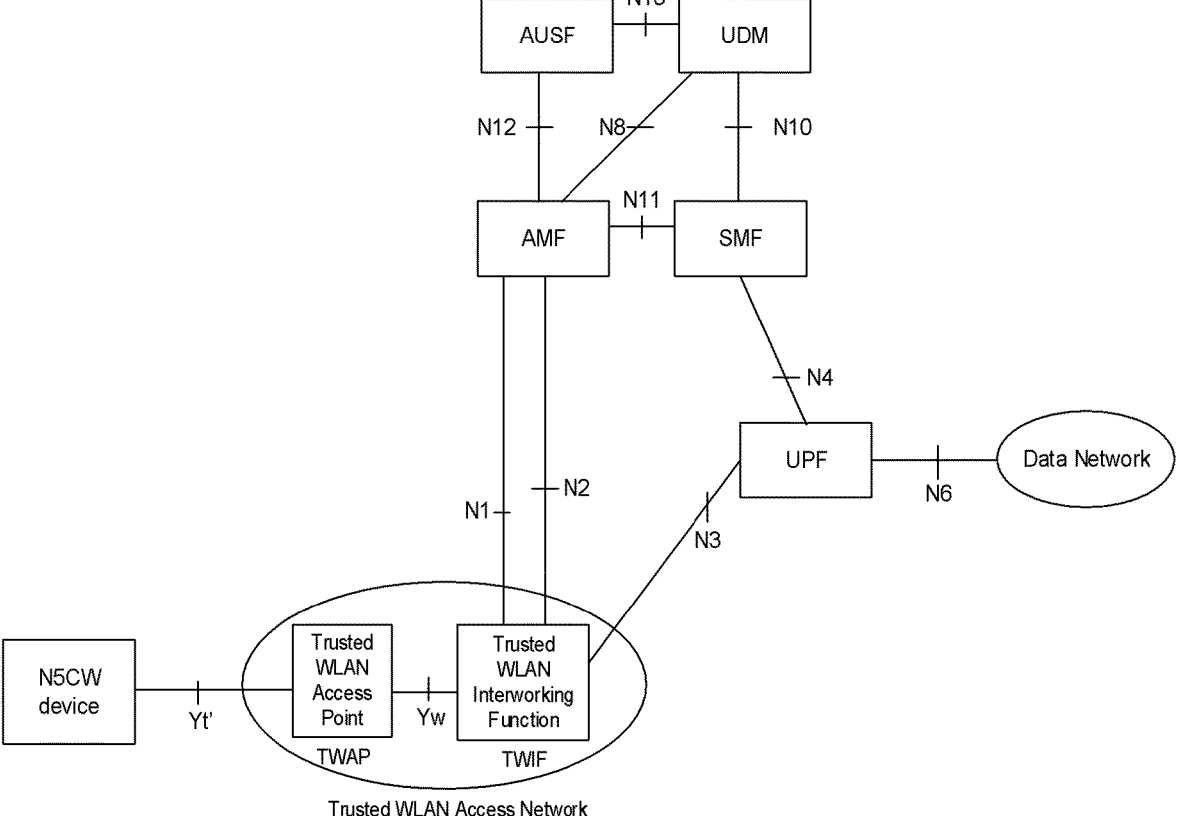
FIG. 3 schematically shows an exemplary non-roaming and LBO roaming architecture for supporting 5GC access from N5CW devices.

FIG. 3 schematically shows an exemplary non-roaming and Local Breakout (LBO) roaming architecture for supporting 5GC access from N5CW devices. As shown in FIG. 3, to support the 5GC access from the N5CW devices, a trusted WLAN access network must support a Trusted WLAN Interworking Function (TWIF). The 5GC registration, including NAS protocol, is performed by the TWIF in the trusted WLAN access network via the N1 and N2 reference points, on behalf of the N5CW device interacting with the AMF in the 5GC. During the registration procedure, the N5CW device performs the EAP authentication procedure with the AUSF/UDM.

After registration/authentication of the N5CW device is successful, the TWIF initiates PDU Session Establishment to set up a user plane connection via the 5GC, i.e., via the N3 and N6 reference points. In this way, the N5CW device may be authenticated and registered in the 5GC and be provided with a user plane connection that goes via User Plane Function (UPF) in 5GC.

Therefore, currently, there is no architectural option to use the 5GC for a non-3GPP (e.g., Wi-Fi) access authentication, i.e., for offload data traffic via local IP service facility in the access network, e.g. in stadia, hotels, coffee shops etc. similar with the use of SWa and SWx in the EPC integrated untrusted non-3GPP IP access architecture for offload as shown in FIG. 1.

Operators that deploy 5GC supporting tight interworking with EPC can keep on using the existing interactions between the 3GPP AAA Server and the HSS in the EPC (i.e. over SWa/SWx) for users which are both 4G and 5G capable to support Wi-Fi access authentication scenario, e.g. for Wi-Fi offload.

However, for users that are only 5G capable or for 5GC deployments that do not require tight interworking with EPC (i.e. there is neither an EPC nor an HSS), the interactions between the 3GPP AAA Server and the HSS are not possible.

In addition, as shown in FIGS. 2A-2B and 3, the integration of non-3GPP access in 5GC is always realized via the AMF, which implies the support/use of mobility and PDN session services via the AMF and the Session Management Function (SMF) in the 5GC. However, these procedures are not needed for the non-3GPP (e.g., Wi-Fi) access authentication scenario as previously discussed.

The basic ideas of the present disclosure mainly consist in that different architectural options are proposed to support the interactions with a non-3GPP (e.g., Wi-Fi) access for the purpose of non-3GPP (e.g., Wi-Fi) access authentication using UE credentials defined in the 5GC (e.g. using EAP-AKA or EAP-AKA').

In some embodiments, the proposed architectural options reuse the existing procedures over SWa/STa reference point (also called SWa/STa interface) currently in use by the non-3GPP (e.g., Wi-Fi) access towards an AAA Server/Proxy, i.e. the non-3GPP (e.g., Wi-Fi) access network may not be changed.

In some other embodiments, the proposed architectural options suggest that the non-3GPP (e.g., Wi-Fi) access network performs authentication using the regular Registration procedure in 5GC instead of going through the AAA Server/Proxy, i.e. the non-3GPP (e.g., Wi-Fi) access network may be changed.

First Exemplary Embodiment

In the first exemplary embodiment, the non-3GPP access network keeps on using the SWa/STa interface towards an entity for AAA (e.g., 3GPP AAA server uplifted from the network of the first protocol type (e.g., EPC) that interacts with an entity for authentication in the network of the second protocol type (e.g., 5GC) by means of a protocol translation entity (e.g., an AAA-IWF).

The protocol translation entity in the first exemplary embodiment translates between the authentication credential request/response message of the first protocol type (e.g. EPC, i.e., over SWx) and the authentication credential request/response message of the second protocol type (e.g. 5GC, i.e., over SBI).

Figure 11:
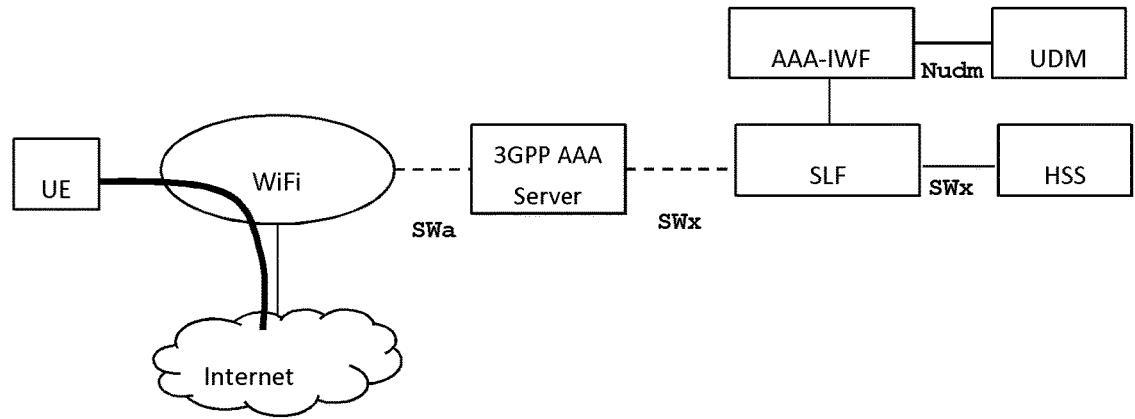
FIG. 11 schematically shows another exemplary architecture for non-3GPP access authentication, in which the methods of FIGS. 4~8 according to the first exemplary embodiment of the present disclosure are applied.

In the first exemplary implementation of the first exemplary embodiment, the entity for authentication may be an entity for unified data management (e.g., UDM). In this implementation, the entity for AAA interacts directly with the entity for unified data management via the protocol translation entity (e.g., AAA-IWF) as shown in FIG. 9, and optionally via a message routing entity (e.g., SLF/DRA) as shown in FIG. 11. The protocol translation entity translates between authentication messages of the first protocol type (e.g., diameter based authentication request/response messages over the SWx interface) and authentication credential message of the second protocol type (e.g., authentication credential request/response message over the SBI interface with the UDM). In this case, the entity for AAA fetches an authentication credential e.g. AKA authentication vectors CK and IK, or CK' and IK' directly from the entity for unified data management (e.g., UDM) without via the entity for authentication serving (e.g., AUSF), and uses the authentication credential for authentication (i.e., non-3GPP access authentication) of the UE.

Figure 12:
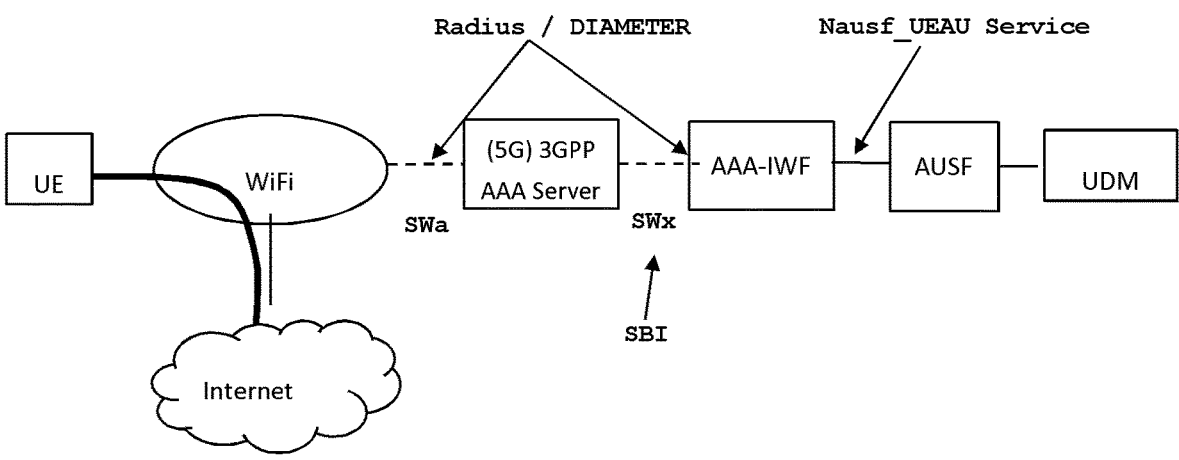
FIG. 12 schematically shows another exemplary architecture for non-3GPP access authentication, in which the methods of FIGS. 4~8 according to the first exemplary embodiment of the present disclosure are applied.

In the second exemplary implementation of the first exemplary embodiment, the entity for authentication may be an entity for authentication serving (e.g., AUSF). In this implementation, the entity for AAA interacts with the entity for unified data management (e.g., UDM) via the protocol translation entity (e.g., AAA-IWF) and the entity for authentication serving (e.g., AUSF) as shown in FIG. 12, and optionally via a message routing entity (e.g., SLF/DRA) as shown in FIG. 14. The protocol translation entity translates between authentication messages of the first protocol type (e.g., diameter based authentication request/response messages over the SWx interface) and authentication credential message of the second protocol type (e.g., authentication credential request/response message over the SBI interface with the AUSF). In this case, the entity for unified data management (e.g., UDM) transmits an original authentication credential e.g. AKA authentication vectors CK and IK, or CK' and IK' to the entity for authentication serving (e.g., AUSF), the entity for authentication serving (e.g., AUSF) converts it into an authentication credential (e.g., Kausf, Kseaf as specified in 3GPP TS 33.501 v16.4.0 (clause 6.2.1), which is incorporated herein in its entirety by reference) associated with the network using the second protocol type (e.g. 5GC), and transmits the authentication credential (e.g., Kausf, Kseaf) in the authentication credential response message of the second protocol type to the protocol translation entity. It should be noted that the protocol translation entity only translate the authentication credential response message of the second protocol type to an authentication credential response message of the first protocol type, i.e., performs the message body translation, but does not translate the message content, e.g., the authentication credential (e.g., Kausf, Kseaf). Therefore, when the entity for AAA receives the authentication credential (e.g., Kausf, Kseaf) in the authentication credential response message of the first protocol type from the protocol translation entity, the entity for AAA needs to convert the authentication credential (e.g., Kausf, Kseaf) associated with the network using the second protocol type (e.g. 5GC) into an authentication credential (e.g., CK and IK, or CK' and IK' as specified in 3GPP TS 33.402 v16.0.0, which is incorporated herein in its entirety by reference) associated with the network using the first protocol type (e.g., EPC) for authentication of the UE.

Hereinafter, a method 400 at an entity for AAA for non-3GPP access authentication according to the first exemplary embodiment of the present disclosure will be described with reference to FIG. 4. It should be understood that the entity for AAA may be a 3GPP AAA server (or called "AAA" for simplicity), or any other entity that can be configured to perform the method 400 as described below, including a virtualized entity that may be implemented on cloud. It should be understood that the method 400 may be appropriately applied in a 5GC deployment, a 5GC deployment with support for interworking with EPC, or other appropriate future developments.

As shown in FIG. 4, in step S401, the entity for AAA may receive, from a Non-3GPP (e.g., Wi-Fi) access point, an authentication request message of a first protocol type (e.g., a diameter based authentication request message over the SWa/STa interface from the non-3GPP access point to the entity for AAA) for a UE.

Then, the entity for AAA may generate a corresponding authentication credential request message of the first protocol type (e.g., a diameter based authentication request message over the SWx interface with the entity for AAA), and may transmit, in step S403, the authentication credential request message of the first protocol type to a protocol translation entity (e.g., an AAA-IWF) for translating the authentication credential request message of the first protocol type to a corresponding authentication credential request message of a second protocol type (e.g., an authentication credential request message over the SBI interface with the entity for authentication).

Alternatively, the entity for AAA may determine whether an identity of the UE received in the authentication request message of the first protocol type is associated with a network using the first protocol type (e.g., EPC) or a network with the second protocol type (e.g., 5GC).

If it is determined that the identity of the UE is associated with the network using the second protocol type, the entity for AAA may transmit, in step S403, the authentication credential request message of the first protocol type to the protocol translation entity.

If it is determined that the identity of the UE is associated with the network using the first protocol type, the entity for AAA may transmit the authentication credential request message of the first protocol type to the entity for authentication in the network using the first protocol type (e.g., HSS in EPC).

Alternatively, the request message routing based on the identity format of the UE as described above may also be implemented in a separate message routing entity, e.g., SLF/DRA, which may be arranged in the entity for AAA (i.e. collocated with the entity for AAA), or separately from the entity for AAA.

After the authentication credential request message of the first protocol type is transmitted, the entity for AAA may receive, from the protocol translation entity, an authentication credential response message of the first protocol type (e.g., a diameter based authentication credential response message over the SWx interface) that is translated by the protocol translation entity from a corresponding authentication credential response message of the second protocol type (e.g., an authentication credential response message over the SBI interface with the entity for authentication) transmitted by an entity for authentication, for authentication (i.e., non-3GPP access authentication) of the UE with an authentication credential received in the authentication credential response message of the first protocol type.

As previously described, in the first implementation of the first exemplary embodiment, the entity for authentication may include an entity for unified data management (e.g., UDM). In this embodiment, the entity for AAA interacts directly with the entity for unified data management via the protocol translation entity (e.g., AAA-IWF) as shown in FIG. 9, and optionally via a message routing entity (e.g., SLF/DRA) as shown in FIG. 11. The received authentication credential may be associated with the network using the first protocol type (e.g., EPC), or may be associated with the network using the second protocol type (e.g., 5GC). For example, the authentication credential associated with EPC may be AKA authentication vectors CK and IK, or CK' and IK' as specified in 3GPP TS 33.402 v16.0.0, which is incorporated herein in its entirety by reference; and the authentication credential associated with 5GC may be AKA authentication vectors CK' and IK' or Kausf as specified in 3GPP TS 33.501 v16.4.0 (clause 6.2.1), which is incorporated herein in its entirety by reference. In this case, the entity for AAA may authenticate the UE directly with the received authentication credential.

In the second implementation of the first exemplary embodiment, the entity for authentication may include an entity for authentication serving (e.g., AUSF). In this embodiment, the entity for AAA interacts with the entity for unified data management (e.g., UDM) via the protocol translation entity (e.g., AAA-IWF) and the entity for authentication serving (e.g., AUSF) as shown in FIG. 12, and optionally via a message routing entity (e.g., SLF/DRA) as shown in FIG. 14. The received authentication credential may be associated with the network using the first protocol type (e.g., EPC), or may be associated with the network using the second protocol type (e.g., 5GC). For example, the authentication credential associated with EPC may be AKA authentication vectors CK and IK, or CK' and IK' as specified in 3GPP TS 33.402 v16.0.0, which is incorporated herein in its entirety by reference; and the authentication credential associated with 5GC may be Kausf, Kseaf as specified in 3GPP TS 33.501 v16.4.0 (clause 6.2.1), which is incorporated herein in its entirety by reference. Therefore in this case, if the received authentication credential is associated with the network using the second protocol type (e.g., 5GC), the entity for AAA needs to convert the authentication credential to be associated with the network using the first protocol type (e.g., EPC) for authentication of the UE.

Additionally or alternatively, the entity for AAA may transmit, to the protocol translation entity, a location management related message of the first protocol type for translating between the location management related message of the first protocol type and a corresponding location management related message of the second protocol type, e.g., translating between the "Location Management Procedures" as defined in 3GPP TS 23.402 v16.0.0 and SBI interaction with the UDM/AUSF, e.g. the corresponding UDM service operations defined in 3GPP TS 23.502 v16.6.0, 3GPP TS 23.632 v16.4.0.

Additionally or alternatively, the entity for AAA may transmit, to the protocol translation entity, a subscriber profile management related message of the first protocol type for translating between the subscriber profile management related message of the first protocol type and a corresponding subscriber profile management related message of the second protocol type, e.g., translating between the "Subscriber Profile Management Procedures" as defined in 3GPP TS 23.402 v16.0.0 and SBI interaction with the UDM, e.g. the corresponding UDM service operations defined in 3GPP TS 23.502 v16.6.0, 3GPP TS 23.632 v16.4.0.

In an exemplary embodiment, the protocol translation entity as described above may be arranged at the entity for authentication, i.e., collocated with the entity for authentication, which will be described in conjunction with FIG. 5.

FIG. 5 schematically shows another exemplary method 500 at an entity for AAA collocated with a protocol translation entity for non-3GPP access authentication according to the first exemplary embodiment of the present disclosure. It should be understood that the entity for AAA may be a 3GPP AAA server, or any other entity that can be configured to perform the method 500 as described below, including a virtualized entity that may be implemented on cloud. It should be understood that the method 500 may be appropriately applied in a 5GC deployment, a 5GC deployment with support for interworking with EPC, or other appropriate future developments.

It should be understood that the method 500 at the entity for AAA at least partly corresponds to the method 400 at the entity for AAA. Thus, some description of the method 500 may refer to that of method 400 as previously described, and thus will be omitted here for simplicity.

As shown in FIG. 5, in step S501, the entity for AAA may receive, from a Non-3GPP (e.g., Wi-Fi) access point, an authentication request message of a first protocol type (e.g., a diameter based authentication request message over the SWa/STa interface from the non-3GPP access point to the entity for AAA) for a UE.

In step S503, the entity for AAA may generate an authentication credential request message of the first protocol type (e.g., a diameter based authentication request message over the SWx interface with the entity for AAA) in response to the received authentication request message of the first protocol type.

In step S505, the entity for AAA may translate the authentication credential request message of the first protocol type to a corresponding authentication credential request message of a second protocol type (e.g., an authentication credential request message over the SBI interface with the entity for authentication).

In step S507, the entity for AAA may transmit the corresponding authentication credential request message of the second protocol type for fetching an authentication credential to authenticate the UE.

The entity for AAA may determine, before step S505, whether an identity of the UE received in the authentication request message of the first protocol type is associated with a network using the second protocol type (e.g., 5GC) or a network using the first protocol type (e.g., EPC).

If it is determined that the identity of the UE received in the authentication request message of the first protocol type is associated with the network using the second protocol type, the entity for AAA may translate, in step S505, the authentication credential request message of the first protocol type to the corresponding authentication credential request message of a second protocol type; and transmit, in step S507, the authentication credential request message of the second protocol type to the entity for authentication (e.g., UDM or AUSF).

If it is determined that the identity of the UE received in the authentication request message of the first protocol type is associated with the network using the first protocol type, the entity for AAA may transmit the authentication credential request message of the first protocol type to the entity for authentication in the network using the first protocol type (e.g., HSS in EPC).

Alternatively, the entity for AAA may determine, after step S505, whether an identity of the UE received in the translated authentication credential request message of the second protocol type is associated with a network using the second protocol type (e.g., 5GC) or a network using the first protocol type (e.g., EPC).

If it is determined that the identity of the UE received in the translated authentication credential request message of the second protocol type is associated with the network using the second protocol type, the entity for AAA may transmit, in step S507, the authentication credential request message of the second protocol type to the entity for authentication.

If it is determined that the identity of the UE received in the translated authentication credential request message of the second protocol type is associated with the network using the first protocol type, the entity for AAA may transmit the authentication request message of the first protocol type to the entity for authentication in the network using the first protocol type (e.g., HSS in EPC).

Alternatively, the request message routing based on the identity format of the UE as described above may also be implemented in a separate message routing entity, e.g., SLF/DRA, which may be arranged in the entity for AAA (i.e. collocated with the entity for AAA), or separately from the entity for AAA.

In an embodiment in which the message routing entity is arranged separately form the entity for AAA collocated with the protocol translation entity, in step S507, the entity for AAA may transmit the corresponding authentication credential request message of the second protocol type to the message routing entity for routing to the entity for authentication.

After the authentication credential request message of the second protocol type is transmitted, the entity for AAA may receive, from the entity for authentication, an authentication credential response message of the second protocol type (e.g., an authentication credential response message over the SBI interface with the entity for authentication); and may translate the authentication credential response message of the second protocol type to a corresponding authentication credential response message of the first protocol type (e.g., a diameter based authentication credential response message over the SWx interface) for authentication of the UE with the authentication credential received in the authentication credential response message of the first protocol type.

As previously described, in the first implementation of the first exemplary embodiment, the entity for authentication may include an entity for unified data management (e.g., UDM). In this embodiment, the entity for AAA interacts directly with the entity for unified data management via an internally arranged (i.e., collocated) protocol translation entity (e.g., AAA-IWF), and optionally via a collocated or separately arranged message routing entity (e.g., SLF/DRA). The received authentication credential may be associated with the network using the first protocol type (e.g., EPC), or may be associated with the network using the second protocol type (e.g., 5GC). For example, the authentication credential associated with EPC may be AKA authentication vector Ck and IK, or CK' and IK' as specified in 3GPP TS 33.402 v16.0.0, which is incorporated herein in its entirety by reference; and the authentication credential associated with 5GC may be AKA authentication vectors CK' and IK' or Kausf as specified in 3GPP TS 33.501 v16.4.0 (clause 6.2.1), which is incorporated herein in its entirety by reference. In this case, the entity for AAA may authenticate the UE with the received authentication credential.

In the second implementation of the first exemplary embodiment, the entity for authentication may include an entity for authentication serving (e.g., AUSF). In this embodiment, the entity for AAA interacts with the entity for unified data management (e.g., UDM) via a protocol translation entity (e.g., AAA-IWF) internally arranged at (i.e., collocated with) the entity for AAA, and the entity for authentication serving (e.g., AUSF), and optionally via a collocated or separately arranged message routing entity (e.g., SLF/DRA). The received authentication credential may be associated with the network using the first protocol type (e.g., EPC), or may be associated with the network using the second protocol type (e.g., 5GC). For example, the authentication credential associated with EPC may be AKA authentication vectors CK and IK, or CK' and IK' as specified in 3GPP TS 33.402 v16.0.0, which is incorporated herein in its entirety by reference; and the authentication credential associated with 5GC may be Kausf, Kseaf as specified in 3GPP TS 33.501 v16.4.0 (clause 6.2.1), which is incorporated herein in its entirety by reference. Therefore in this case, if the received authentication credential is associated with the network using the second protocol type (e.g., 5GC), the entity for AAA need to convert the authentication credential to be associated with the network using the first protocol type (e.g., EPC) for authentication of the UE.

Additionally or alternatively, the entity for AAA may translate a location management related message of the first protocol type to a corresponding location management related message of the second protocol type, and may transmit the corresponding location management related message of the second protocol type to an entity for authentication. Accordingly, the entity for AAA may receive a location management related message of the second protocol type from the entity for authentication, and translate the received location management related message of the second protocol type to a corresponding location management related message of the first protocol type, e.g., translating between the "Location Management Procedures" as defined in 3GPP TS 23.402 v16.0.0 and SBI interaction with the UDM, e.g. the corresponding UDM service operations defined in 3GPP TS 23.502 v16.6.0, 3GPP TS 23.632 v16.4.0.

Additionally or alternatively, the entity for AAA may translate a subscriber profile management related message of the first protocol type to a corresponding subscriber profile management related message of the second protocol type, and may transmit the corresponding subscriber profile management related message of the second protocol type to the entity for authentication. Accordingly, the entity for AAA may receive a subscriber profile management related message of the second protocol type from the entity for authentication, and translate the received subscriber profile management related message of the second protocol type to a corresponding subscriber profile management related message of the first protocol type, e.g., translating between the "Subscriber Profile Management Procedures" as defined in 3GPP TS 23.402 v16.0.0 and SBI interaction with the UDM, e.g. the corresponding UDM service operations defined in 3GPP TS 23.502 v16.6.0, 3GPP TS 23.632 v16.4.0.

Hereinafter, a method 600 at a protocol translation entity for non-3GPP access authentication according to the first exemplary embodiment of the present disclosure will be described with reference to FIG. 6. It should be understood that the protocol translation entity may be an AA-IWF, or any other entity that can be configured to perform the method 600 as described below, including a virtualized entity that may be implemented on cloud. It should be understood that the method 600 may be appropriately applied in a 5GC deployment, a 5GC deployment with support for interworking with EPC, or other appropriate future developments.

It should be understood that the method 600 at the protocol translation entity at least partly corresponds to the methods 400 and 500 at the entity for AAA. Thus, some description of the method 600 may refer to those of methods 400 and 500 as previously described, and thus will be omitted here for simplicity.

Figure 6:
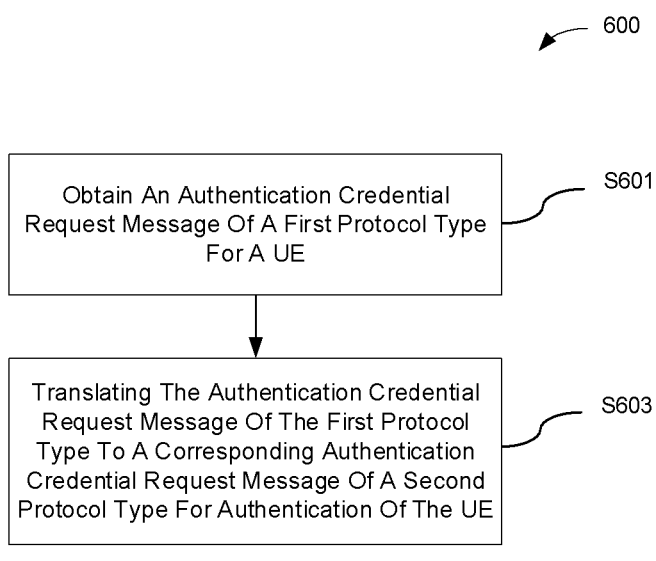
FIG. 6 schematically shows an exemplary method at a protocol translation entity for non-3GPP access authentication according to the first exemplary embodiment of the present disclosure.

As shown in FIG. 6, in step S601, the protocol translation entity may obtain an authentication credential request message of a first protocol type (e.g., a diameter based authentication request message over the SWx interface with the entity for AAA) for a UE.

In step S603, the protocol translation entity may translate the authentication credential request message of the first protocol type to a corresponding authentication credential request message of a second protocol type (e.g., an authentication credential request message over the SBI interface with the entity for authentication) for authentication (i.e., non-3GPP access authentication) of the UE.

Accordingly, the protocol translation entity may obtain an authentication credential response message of the second protocol type (e.g., an authentication credential response message over the SBI interface with the entity for authentication); and may translate the authentication credential response message of the second protocol type to a corresponding authentication credential response message of the first protocol type (a diameter based authentication credential response message over the SWx interface) for an entity for AAA to authenticate the UE with an authentication credential in the authentication credential response message of the first protocol type.

Additionally or alternatively, the protocol translation entity may translate a location management related message of the first protocol type to a corresponding location management related message of the second protocol type.

Additionally or alternatively, the protocol translation entity may translate a subscriber profile management related message of the first protocol type to a corresponding subscriber profile management related message of the second protocol type.

As previously described, the protocol translation entity may be arranged as a separate entity. In this case, the authentication credential request message of the first protocol type is obtained in step S601 by being received from the entity for AAA, and the authentication credential response message of the second protocol type is obtained by being received from the entity for authentication.

Accordingly, the protocol translation entity may receive, from the entity for AAA, the location management related message of the first protocol type; translate the location management related message of the first protocol type to a corresponding location management related message of the second protocol type; and transmit, to the entity for authentication, the corresponding location management related message of the second protocol type. Additionally or alternatively, the protocol translation entity may receive, from the entity for AAA, the subscriber profile management related message of the first protocol type; translate the subscriber profile management related message of the first protocol type to a corresponding subscriber profile management related message of the second protocol type; and transmit, to the entity for authentication, the corresponding subscriber profile management related message of the second protocol type.

In another implementation, the protocol translation entity may be arranged at the entity for AAA, i.e., collocated with the entity for AAA. In this case, the authentication credential request message of the first protocol type is obtained in step S601 by being generated by the entity for AAA in response to an authentication request message of the first protocol type received from the Non-3GPP access point, and the authentication credential response message of the second protocol type is obtained by being received from the entity for authentication.

Accordingly, the protocol translation entity may obtain the location management related message of the first protocol type; translate the location management related message of the first protocol type to a corresponding location management related message of the second protocol type; and transmit, to the entity for authentication, the corresponding location management related message of the second protocol type. Additionally or alternatively, the protocol translation entity may obtain the subscriber profile management related message of the first protocol type; translate the subscriber profile management related message of the first protocol type to a corresponding subscriber profile management related message of the second protocol type; and transmit, to the entity for authentication, the corresponding subscriber profile management related message of the second protocol type.

In another implementation, the protocol translation entity may be arranged at the entity for authentication (e.g., UDM or AUSF), i.e., collocated with the entity for AAA. In this case, the authentication credential request message of the first protocol type is obtained in step S601 by being received from the entity for AAA, and the authentication credential response message of the second protocol type is obtained by being generated by the entity for authentication in response to the authentication credential request message of the second protocol type.

Accordingly, the protocol translation entity may receive, from the entity for AAA, the location management related message of the first protocol type; and translate the location management related message of the first protocol type to a corresponding location management related message of the second protocol type. Additionally or alternatively, the protocol translation entity may receive, from the entity for AAA, the subscriber profile management related message of the first protocol type; and translate the subscriber profile management related message of the first protocol type to a corresponding subscriber profile management related message of the second protocol type.

Hereinafter, a method 700 at a message routing entity for non-3GPP access authentication according to the first exemplary embodiment of the present disclosure will be described with reference to FIG. 7. It should be understood that the message routing entity may be an SLF/DRA, or any other entity that can be configured to perform the method 700 as described below, including a virtualized entity that may be implemented on cloud. It should be understood that the method 700 may be appropriately applied in a 5GC deployment, a 5GC deployment with support for interworking with EPC, or other appropriate future developments.

It should be understood that the method 700 at the message routing entity at least partly corresponds to the methods 400 and 500 at the entity for AAA, and the method 600 at the protocol translation entity. Thus, some description of the method 700 may refer to those of methods 400~600 as previously described, and thus will be omitted here for simplicity.

Figure 7:
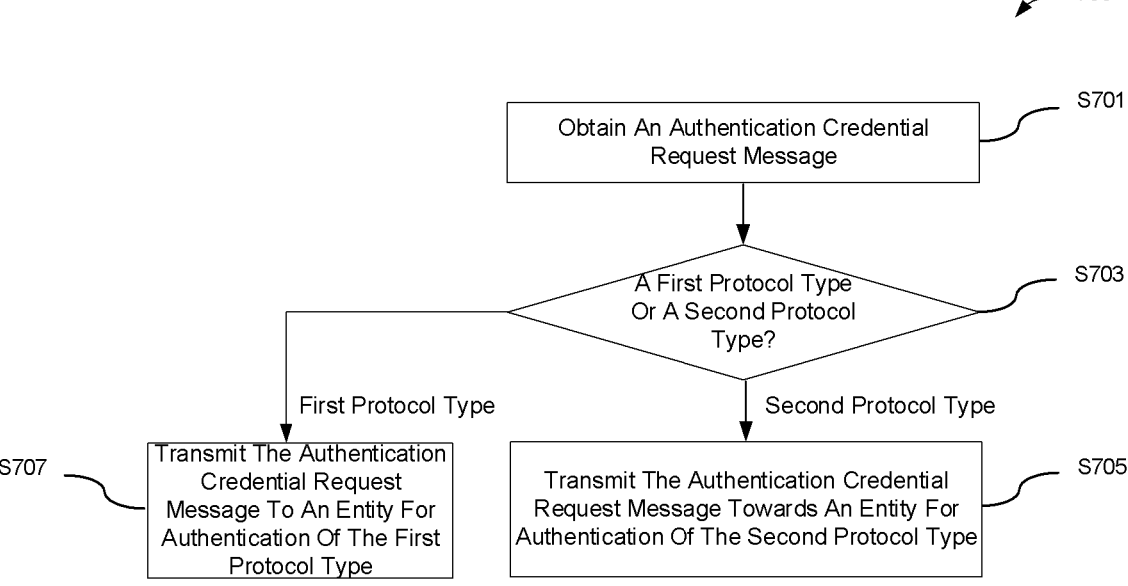
FIG. 7 schematically shows an exemplary method at a message routing entity for non-3GPP access authentication according to the first exemplary embodiment of the present disclosure.

As shown in FIG. 7, in step S701, the message routing entity may obtain an authentication credential request message, which may be of a first protocol type (e.g., a diameter based authentication credential request message over an SWx interface) or a second protocol type (e.g., an authentication credential request message over an SBI interface with the entity for authentication) depending on the location of the message routing entity, e.g., arranged before the protocol translation entity or after the protocol translation entity as previously described.

In step S703, the message routing entity may determine whether an identity of a UE in the authentication credential request message is associated with a network using a first protocol type (e.g., EPC) or a network with a second protocol type (e.g., 5GC).

If it is determined that the identity of the UE is associated with the network using the second protocol type, the method 700 proceeds to step S705, in which the message routing entity may transmit the authentication credential request message towards an entity for authentication of the second protocol type, such as UDM (for the first exemplary implementation of the first exemplary embodiment), or AUSF (for the second exemplary implementation of the first exemplary embodiment).

If it is determined that the identity of the UE is associated with the network using the second protocol type, the method 700 proceeds to step S707, in which the message routing entity may transmit the authentication credential request message to an entity for authentication of the first protocol type (e.g., HSS).

In an exemplary embodiment where the authentication credential request message is of the first protocol type (e.g., the diameter based authentication credential request message over an SWx interface), i.e., the message routing entity is arranged before the protocol translation entity (e.g., AAA-IWF), in step S705, the message routing entity may transmit the authentication credential request message of the first protocol type towards the entity for authentication (e.g., UDM or AUSF) via the protocol translation entity in which the authentication credential request message of the first protocol type is translated to a corresponding authentication credential request message of the second protocol type (e.g., an authentication credential request message over an SBI interface with the entity for authentication).

As previously described, the message routing entity may be arranged as a separate entity. In this case, the authentication credential request message of the first protocol type is obtained in step S701 by being received from an entity for AAA, and the authentication credential response message of the second protocol type is obtained by being received from the entity for authentication.

Alternatively, the message routing entity may be arranged at the AAA server, i.e., collocated with the entity for AAA. In this case, the authentication credential request message of the first protocol type is obtained in step S701 by being generated by the entity for AAA in response to an authentication request message of the first protocol type (e.g., a diameter based authentication request message over an SWa/STa interface) received from a Non-3GPP access point.

In another exemplary embodiment where the authentication credential request message is of the second protocol type (e.g., the authentication credential request message over an SBI interface with the entity for authentication), i.e., the message routing entity is arranged after the protocol translation entity (e.g., AAA-IWF), in step S705, the message routing entity may transmit, towards the entity for authentication (e.g., UDM or AUSF), the authentication credential request message of the second protocol type for authentication of the UE.

In this exemplary embodiment, the message routing entity may be arranged as a separate entity. In this case, the authentication credential request message of the second protocol type is obtained in step S701 by being received from a protocol translation entity, which is translated by the protocol translation entity from a corresponding authentication request message of the first protocol type.

Alternatively, the message routing entity may be arranged at the AAA server, i.e., collocated with the entity for AAA.

Hereinafter, a method 800 at an entity for authentication for non-3GPP access authentication according to the first exemplary embodiment of the present disclosure will be described with reference to FIG. 8, wherein the entity for authentication is collocated with a protocol translation entity. It should be understood that the entity for authentication may be a UDM (for the first exemplary implementation of the first exemplary embodiment) or an AUSF (for the second exemplary implementation of the first exemplary embodiment) that is collocated with an AAA-IWF, or any other entity that can be configured to perform the method 800 as described below, including a virtualized entity that may be implemented on cloud. It should be understood that the method 800 may be appropriately applied in a 5GC deployment, a 5GC deployment with support for interworking with EPC, or other appropriate future developments.

It should be understood that the method 800 at the entity for authentication at least partly corresponds to the methods 400 and 500 at the entity for AAA, the method 600 at the protocol translation entity, and the method 700 at the message routing entity. Thus, some description of the method 800 may refer to those of methods 400~700 as previously described, and thus will be omitted here for simplicity.

As shown in FIG. 8, in step S801, the entity for authentication may obtain an authentication credential request message of a first protocol type (e.g., a diameter based authentication request message over the SWx interface with the entity for AAA) for a UE.

In step S803, the entity for authentication may translate the authentication credential request message of the first protocol type to a corresponding authentication credential request message of a second protocol type (e.g., an authentication credential request message over an SBI interface with the entity for authentication (i.e., non-3GPP access authentication) of the UE.

In step S805, the entity for authentication may generate an authentication credential response message of the second protocol type (e.g., an authentication credential response message over the SBI interface with the entity for authentication).

In step S807, the entity for authentication may translate the authentication credential response message of the second protocol type to a corresponding authentication credential response message of the first protocol type (e.g., a diameter based authentication credential response message over the SWx interface).

In step S809, the entity for authentication may transmit, to an entity for AAA (e.g., AAA server), the authentication credential response message of the first protocol type for authentication of the UE with an authentication credential in the authentication credential response message of the first protocol type.

Figure 10:
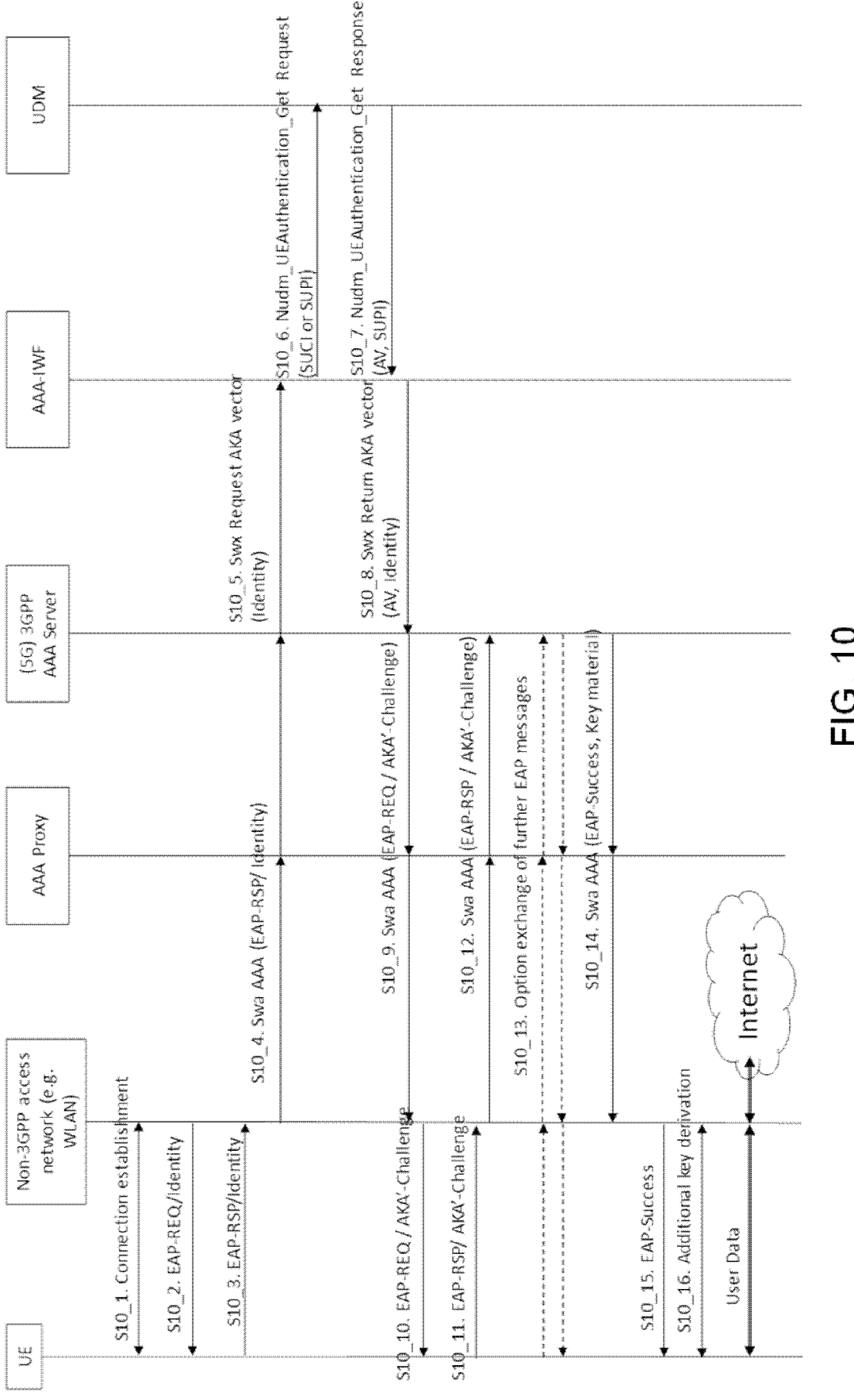
FIG. 10 schematically shows an exemplary signaling sequence diagram for non-3GPP access authentication, in which the methods of FIGS. 4~8 according to the first exemplary embodiment of the present disclosure are applied.

FIGS. 9 and 11 schematically shows exemplary architectures for non-3GPP access authentication in the first exemplary implementation of the first exemplary embodiment, and FIG. 10 schematically shows an exemplary signaling sequence diagram corresponding to the exemplary architecture of FIG. 9. The previously described methods 400~800 in conjunction with FIGS. 4~8 may be applied in FIGS. 9~11.

The first exemplary implementation of the first exemplary embodiment with reference to FIGS. 9~11 may be referred to as "SWa/STa and SWx interworking with the UDM via AAA-IWF". Here, SWa is related to non-3GPP untrusted access network, and STa is related to non-3GPP trusted access network, which means the first exemplary implementation of the first exemplary embodiment is applicable to both the non-3GPP untrusted access authentication and the non-3GPP trusted access authentication. The following takes the non-3GPP untrusted access authentication for an example for illustration only without any limitation.

As shown in FIGS. 9 and 11, the Wi-Fi access network (an example of non-3GPP access network) keeps on using SWa (i.e., SWa interface/reference point, which may be used interchangeable) towards the 3GPP AAA server (an example of the entity for AAA) which interacts directly with the UDM (an example of the entity for authentication) in the 5GC via an AAA-IWF (an example of the protocol translation entity).

The 3GPP AAA server keeps on interacting with the Wi-Fi access network using SWa (e.g., step S10_4 in FIG. 10). Furthermore, the 3GPP AAA server interactions towards the UDM (e.g., steps S10_5 and S10_8 in FIG. 10) may still be based on diameter SWx. It is assumed that possibly only minor impacts on the protocol e.g. due to handling of 5GC UE identifiers, i.e. SUbscription Permanent Identifier (SUR) instead of International Mobile Subscriber Identification (IMSI), may be required.

The AAA-IWF performs translation between diameter based authentication credential messages over SWx from the 3GPP AAA Server and SBI interactions with the UDM (steps S10_6 and S10_7 in FIG. 10). It is assumed that the Nudm_UEAuthentication service may be reused for Wi-Fi access authentication with no or minimal impact.

It should be understood that either the 3GPP AAA Server or the UDM itself may perform the translation between diameter based SWa/SWx request messages from the Wi-Fi access network or 3GPP AAA Server and SBI interactions with the UDM. That is, the AAA-IWF may be collocated with or a part of the AAA server or the UDM to perform the translation.

Additionally, the AAA-IWF may also perform translation between the "Location Management Procedures", "Subscriber Profile Management Procedures" as defined in 3GPP TS 23.402 v16.0.0 and SBI interaction with the UDM, e.g. the corresponding UDM service operations defined in 3GPP TS 23.502 v16.6.0, 3GPP TS 23.632 v16.4.0, via the AAA-IWF.

In the case where the updated EAP-AKA' version is used, the UE provides the SUbscription Concealed Identifier (SUCI) as the Identity. In that case, between steps S10_6 and S10_7, the UDM de-conceals the SUCI and determines the SUR.

The exemplary signaling sequence as shown in FIG. 10 will be described below. It should be noted that the description below mainly focuses on signaling related to the methods 400~800, and some other signaling is not described in detail to avoid obscuring the principle of the present disclosure.

In S10_1, a connection is established between the UE and the trusted non-3GPP access network, using a procedure specific to the Non-3GPP access network.

In S10_2, the Non-3GPP access point in the trusted Non-3GPP access network sends an EAP Request/Identity to the UE.

In S10_3, the UE sends an EAP Response/Identity message to the Non-3GPP access point. The UE shall send its identity complying with Network Access Identifier (NAI) format. NAI contains either a pseudonym allocated to the UE in a previous run of the authentication procedure or, in the case of first authentication, the IMSI. In the case of first authentication, the NAI shall indicate EAP-AKA'.

In S10_4, the Non-3GPP access point receives the EAP Response/Identity message from the UE, and sends an AAA message (with EAP Response/Identity) to a proper 3GPP AAA Server over Swa based on the realm part of the NAI.

In S10_5, the 3GPP AAA Server receives the EAP Response/Identity message that contains the UE identity and the access type over the STa interface, and sends a Swx Request AKA vector (with UE identity) to the AAA-IWF.

In S10_6, the AAA-IWF receives the Swx Request AKA vector (with UE identity) from the 3GPP AAA Server, and sends Nudm_UEAuthentication_Get Request (with SUCI or SUR) to UDM.

In S10_7, the UDM sends Nudm_UEAuthentication_Get Response (with AV, SUR) to the AAA-IWF.

In S10_8, the AAA-IWF receives Nudm_UEAuthentication_Get Response (with AV, SUR) from the UDM, and sends Swx Return AKA vector (with UE identity, AV) to the 3GPP AAA Server.

In S10_9, the 3GPP AAA Server sends an AAA message (with EAP-Request/AKA'-Challenge) to the Non-3GPP access point over Swa.

In S10_10, the Non-3GPP access point sends EAP-Request/Identity to the UE.

In a 5GC deployment with support for interworking with EPC, an SLF/DRA (an example of the message routing entity) will be able to route SWx request messages towards the HSS in the EPC for 4G only UEs and to the AAA-IWF for 5G only UEs as shown in FIG. 11. SWx requests for the UEs which are capable of both 4G and 5G access may be routed to either the HSS or the AAA-IWF based on the identity format of the UE.

As previously described, the implementations of the AAA-IWF and the SLF/DRA are flexible. For example, the AAA-IWF may be separately located, or may be arranged at (i.e., collocated with) the 3GPP AAA server or the UDM; the SLF/DRA may be separately located, or may be arranged at (i.e., collocated with) the 3GPP AAA server; and the SLF/DRA may be arranged before the AAA-IWF, or may be arranged after the AAA-IWF.

Figure 13:
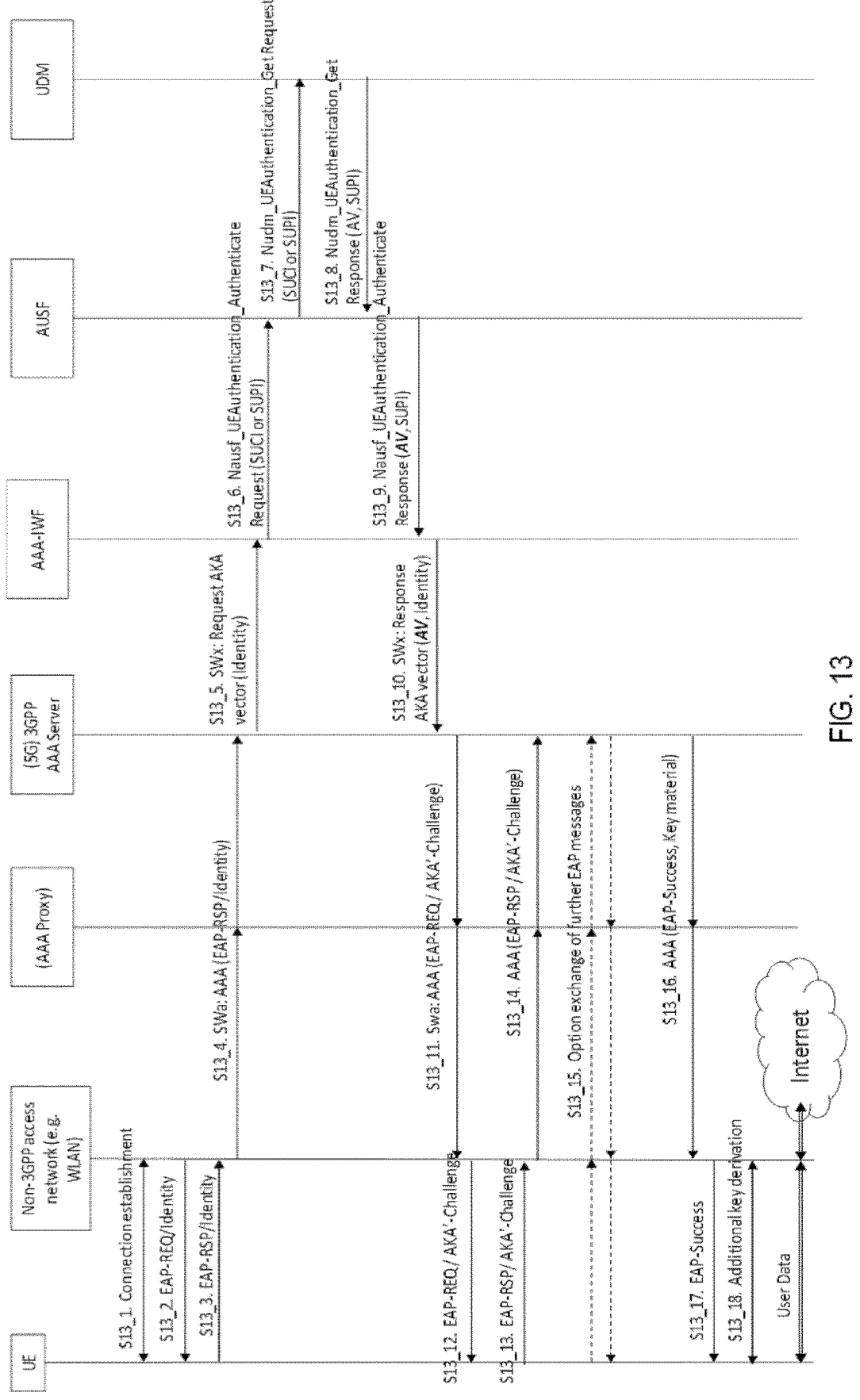
FIG. 13 schematically shows another exemplary signaling sequence diagram for non-3GPP access authentication, in which the methods of FIGS. 4~8 according to the first exemplary embodiment of the present disclosure are applied.

The second exemplary implementation of the first exemplary embodiment with reference to FIGS. 12~14 may be referred to as "SWa/STa and SWx interworking with the UDM via AAA-IWF and AUSF". As previously described, SWa is related to non-3GPP untrusted access network, and STa is related to non-3GPP trusted access network, which means that the second exemplary implementation of the first exemplary embodiment is applicable to both the non-3GPP untrusted access authentication and the non-3GPP trusted access authentication. The following takes the non-3GPP untrusted access authentication for an example for illustration only without any limitation.

As shown in FIGS. 12 and 14, the Wi-Fi access network (an example of non-3GPP access network) interacts with the UDM in the 5GC via the AUSF (another example of the entity for authentication). The Wi-Fi access network keeps on using SWa towards the 3GPP AAA Server (an example of the entity for AAA) which interacts with the AUSF (which in turn interacts with the UDM normally) in the 5GC via an AAA-IWF (an example of the protocol translation entity).

The 3GPP AAA server keeps on interacting with the Wi-Fi access network using SWa (e.g., step S13_4 in FIG. 13). The 3GPP AAA server then sends a SWx authentication credential request message towards the UDM in the 5GC via the AUSF. The AAA-IWF performs translation between diameter based authentication credential messages over SWx from the 3GPP AAA Server and SBI interactions with the AUSF (e.g., steps S13_6 and S13_9 in FIG. 13).

It should be understood that either the 3GPP AAA Server or the AUSF itself may perform the translation between diameter based SWa/SWx request messages from the Wi-Fi Access network or 3GPP AAA Server and SBI interactions with the AUSF. That is, the AAA-IWF may be collocated with or a part of AAA server or AUSF to perform the translation.

It is assumed that the Nausf_UEAuthentication and Nudm_UEAuthentication services can be reused. However, since the AAA Server is supporting the EAP Server functionality, the AUSF will basically act as a proxy between the AAA Server and the UDM, and this may require a new Nausf service to allow the AAA Server to request an authentication credential (e.g., authentication vectors (AVs)) from the AUSF (e.g., AV in step S13_9).

As previously described, the AAA-IWF translates between diameter based authentication request/response messages over the SWx interface and authentication credential request/response message over the SBI interface with the AUSF. In this case, the UDM transmits an original authentication credential e.g. AKA authentication vectors CK' and IK' or Kausf (e.g., AV in step S13_8) to the AUSF, the AUSF converts it into an authentication credential (e.g., Kausf, Kseaf as specified in 3GPP TS 33.501 v16.4.0 (clause 6.2.1)) associated with 5GC, and transmits the authentication credential (e.g., Kausf, Kseaf) in the authentication credential response message over the SBI (e.g., AV in step S13_9) to the AAA-IWF. It should be noted that the AAA-IWF only translate the authentication credential response message over the SBI to an authentication credential response message over the SWx, i.e., performs the message body translation, but does not translate the message content, e.g., the authentication credential (e.g., Kausf, Kseaf). Therefore, when the 3GPP AAA server receives the authentication credential (e.g., Kausf, Kseaf) in the authentication credential response message over the SWx from the AAA-IWF, the 3GPP AAA server needs to convert the authentication credential (e.g., Kausf, Kseaf) associated with 5GC into an authentication credential (e.g., AKA authentication vectors CK and IK, or CK' and IK' as specified in 3GPP TS 33.402 v16.0.0) associated with EPC for authentication of the UE.

Additionally, the 3GPP AAA service may support "Location Management Procedures", "Subscriber Profile Management Procedures" as defined in 3GPP TS 23.402 v16.0.0 and perform SBI interaction with the UDM, e.g. the corresponding UDM service operations defined in 3GPP TS 23.502 v16.6.0, 3GPP TS 23.632 v16.4.0, via AAA-IWF. Thus, the AAA-IWF may also perform translation between the "Location Management Procedures", "Subscriber Profile Management Procedures" and SBI interaction with the UDM.

In a 5GC deployment with support for interworking with EPC, an SLF/DRA (an example of the message routing entity) will be able to route SWx request messages towards the HSS in the EPC for 4G only UEs and to the AAA-IWF for 5G only UEs as shown in FIG. 14. SWx requests for the UEs which are capable of both 4G and 5G access may be routed to either the HSS or the AAA-IWF based on the identity format of the UE.

As previously described, the implementations of the AAA-IWF and the SLF/DRA are flexible. For example, the AAA-IWF may be separately located, or may be arranged at (i.e., collocated with) the 3GPP AAA server or the AUSF; the SLF/DRA may be separately located, or may be arranged at (i.e., collocated with) the 3GPP AAA server; and the SLF/DRA may be arranged before the AAA-IWF, or may be arranged after the AAA-IWF.

Second Exemplary Embodiment

In the second exemplary embodiment, the non-3GPP access network interacts with the entity for authentication (e.g., AUSF) in the network of the second protocol type (e.g., 5GC) by means of a protocol translation entity (e.g., an AAA-IWF). The non-3GPP access network keeps on using SWa/STa towards an AAA Proxy which forwards the SWa/STa request towards the entity for authentication within the network of the second protocol type (e.g., 5GC). The entity for authentication (e.g., AUSF) may act as a 3GPP AAA Server, which may process the authentication request message that is translated from the protocol translation entity for authentication (i.e., non-3GPP access authentication) of the UE.

Different from the first exemplary embodiment as previously described, the protocol translation entity in the second exemplary embodiment translates between the authentication request/response message of the first protocol type (e.g. EPC, i.e., over SWa/STa) and authentication request/response message of the second protocol type (e.g. 5GC, i.e., over SBI).

Hereinafter, a method 1500 at an entity for authentication for non-3GPP access authentication according to the second exemplary embodiment of the present disclosure will be described with reference to FIG. 15. It should be understood that the entity for authentication may be a 3GPP AAA server (or called "AAA" for simplicity) arranged at an entity for authentication serving (e.g., AUSF), or just the entity for authentication serving (e.g., AUSF), or any other entity that can be configured to perform the method 1500 as described below, including a virtualized entity that may be implemented on cloud. It should be understood that the method 1500 may be appropriately applied in a 5GC deployment, a 5GC deployment with support for interworking with EPC, or other appropriate future developments.

As shown in FIG. 15, in step S1501, the entity for authentication may receive, from a protocol translation entity, an authentication request message of a second protocol type (e.g., an authentication request message over an SBI interface with the protocol translation entity) for a UE for traffic offload from a Non-3GPP access network.

The authentication request message of the second protocol type may be translated by the protocol translation entity from an authentication request message of a first protocol type, e.g., a Diameter based authentication request message over an SWa/STa interface.

The authentication request message of the second protocol type may include an identity of the UE. The identity of the UE may be a SUCI of the UE.

Then in step S1503, the entity for authentication may generate an authentication credential request message of the second protocol type based on the received authentication request message of the second protocol type. The authentication credential request message of the second protocol type may be an authentication request message over an SBI interface with the protocol translation entity, and may also include the identity of the UE, e.g., the SUCI of the UE.

In step S1505, the entity for authentication may transmit, to an entity for unified data management (e.g., UDM), the authentication credential request message of the second protocol type.

The authentication credential request message of the second protocol type is transmitted to the entity for unified data management for traffic offload from a Non-3GPP access network.

The entity for authentication may receive, from the entity for unified data management, a corresponding authentication credential response message of the second protocol type, for authentication (i.e., non-3GPP access authentication) of the UE with an authentication credential received in the authentication credential response message of the second protocol type. The authentication credential response message of the second protocol type may be an authentication credential response message over an SBI interface with the entity for unified data management.

Then, the entity for authentication may generate an authentication response message of the second protocol type based on the received authentication credential response message of the second protocol type. The authentication response message of the second protocol type may be an authentication response message over the SBI interface with the protocol translation entity.

Accordingly, the entity for authentication may transmit, to the protocol translation entity, the authentication response message of the second protocol type.

Alternatively in another exemplary embodiment, a protocol translation entity (e.g., AAA-IWF) may be arranged at (i.e., collocated with) the entity for authentication.

Thus, the entity for authentication may receive, from a Non-3GPP access point, an authentication request message of a first protocol type (e.g., a diameter based authentication request message over the SWa/STa interface) for a UE; translate the authentication request message of the first protocol type to a corresponding authentication request message of the second protocol type; generate an authentication credential request message of the second protocol type; transmit, to an entity for unified data management (e.g., UDM), the authentication credential request message of the second protocol type; and receive, from the entity for unified data management, a corresponding authentication credential response message of the second protocol type, for authentication (i.e., non-3GPP access authentication) of the UE with an authentication credential received in the authentication credential response message of the second protocol type.

Additionally or alternatively, the entity for authentication may translate between a location management related message of the first protocol type and a corresponding location management related message of the second protocol type, e.g., translating between the "Location Management Procedures" as defined in 3GPP TS 23.402 v16.0.0 and SBI interaction with the UDM, e.g. the corresponding UDM service operations defined in 3GPP TS 23.502 v16.6.0, 3GPP TS 23.632 v16.4.0.

Additionally or alternatively, the entity for authentication may translate between a subscriber profile management related message of the first protocol type and a corresponding subscriber profile management related message of the second protocol type, e.g., translating between the "Subscriber Profile Management Procedures" as defined in 3GPP TS 23.402 v16.0.0 and SBI interaction with the UDM, e.g. the corresponding UDM service operations defined in 3GPP TS 23.502 v16.6.0, 3GPP TS 23.632 v16.4.0.

In an exemplary embodiment, the entity for authentication may be an AAA, and arranged at an AUSF.

Alternatively, the entity for authentication may be an AUSF.

The first protocol type may refer to an EPC protocol, and the second protocol type may refer to a 5GC protocol.

In an exemplary embodiment, the authentication request message of the second protocol type may be an authentication request message over an SBI interface between the AAA-IWF and the AUSF;

the authentication credential request message of the second protocol type may be an authentication credential request message over an SBI interface between the AUSF and the UDM; and the authentication credential response message of the second protocol type may be an authentication credential response message over the SBI interface between the AUSF and the UDM.

Hereinafter, a method 1600 at a protocol translation entity for non-3GPP access authentication according to the second exemplary embodiment of the present disclosure will be described with reference to FIG. 16. It should be understood that the protocol translation entity may be an AAA-IWF, or any other entity that can be configured to perform the method 1600 as described below, including a virtualized entity that may be implemented on cloud. It should be understood that the method 1600 may be appropriately applied in a 5GC deployment, a 5GC deployment with support for interworking with EPC, or other appropriate future developments.

As shown in FIG. 16, in step S1601, the protocol translation entity may receive, from a Non-3GPP access point, an authentication request message of a first protocol type (e.g., a Diameter based authentication request message over an SWa/STa interface) for a UE. The authentication request message of the first protocol type may include an identity of the UE. The identity of the UE may be a SUCI of the UE.

In step S1603, the protocol translation entity may translate the authentication request message of the first protocol type to a corresponding authentication request message of a second protocol type (e.g., an authentication request message over an SBI interface with the entity for authentication, e.g., AUSF, or AAA server arranged at the AUSF).

Then in step S1605, the translation entity may transmit, to an entity for authentication, the corresponding authentication request message of a second protocol type for authentication for traffic offload from the Non-3GPP access network. The authentication request message of the second protocol type may also include the identity of the UE.

Accordingly, the protocol translation entity may receive, from the entity for authentication, an authentication response message of the second protocol type (e.g., an authentication response message over the SBI interface with the entity for authentication), translate the authentication response message of the second protocol type to a corresponding authentication response message of the first protocol type (e.g., a Diameter based authentication response message over an SWa/STa interface), and transmit, to the Non-3GPP access point, the corresponding authentication response message of the first protocol type (e.g., a Diameter based authentication response message over an SWa/STa interface).

In an exemplary embodiment, the protocol translation entity may be arranged at an AAA proxy.

In an exemplary embodiment, the protocol translation entity may be an AAA-IWF, and the entity for authentication may be an AUSF or an AAA arranged at an AUSF.

In an exemplary embodiment, the first protocol type may refer to an EPC protocol, and the second protocol type refers to a 5GC protocol.

Hereinafter, a method 1700 at a Non-3GPP access point according to the second exemplary embodiment of the present disclosure will be described with reference to FIG. 17. It should be understood that the Non-3GPP access point may be an WLAN AN, or any other entity that can be configured to perform the method 1700 as described below, including a virtualized entity that may be implemented on cloud. It should be understood that the method 1700 may be appropriately applied in a 5GC deployment, a 5GC deployment with support for interworking with EPC, or other appropriate future developments.

As shown in FIG. 17, in step S1701, the Non-3GPP access point may receive, from a UE, a request message for access authentication, e.g., a Diameter based authentication request message over an SWa/STa interface. The request message for access authentication may include a SUCI of the UE.

And in step S1703, the Non-3GPP access point may transmit, to a protocol translation entity, an authentication request message of a first protocol type including the SUCI of the UE. In an exemplary embodiment, the protocol translation entity may be an AAA-IWF.

Then, the Non-3GPP access point may receive, from the protocol translation entity, an authentication response message of the first protocol type, e.g., a Diameter based authentication response message over an SWa/STa interface.

In an exemplary embodiment, the first protocol type may refer to an EPC protocol.

Hereinafter, a method 1800 at a UE according to the second exemplary embodiment of the present disclosure will be described with reference to FIG. 18. It should be understood that the method 1800 may be appropriately applied in a 5GC deployment, a 5GC deployment with support for interworking with EPC, or other appropriate future developments.

As shown in FIG. 18, in step S1801, the UE may perform connection establishment between the UE and a Non-3GPP access network for traffic offload from the Non-3GPP access network.

In step S1803, the UE may transmit, to a Non-3GPP access point in the Non-3GPP access network, a request message for access authentication. The request message for access authentication may include a SUCI of the UE.

Then, the UE may receive, from the Non-3GPP access point, a response message for access authentication.

Hereinafter, a method 1900 at an entity for unified data management according to the second exemplary embodiment of the present disclosure will be described with reference to FIG. 19. It should be understood that the entity for unified data management may be a UDM, or any other entity that can be configured to perform the method 1900 as described below, including a virtualized entity that may be implemented on cloud. It should be understood that the method 1900 may be appropriately applied in a 5GC deployment, a 5GC deployment with support for interworking with EPC, or other appropriate future developments.

As shown in FIG. 19, in step S1901, the entity for unified data management may receive, from an entity for authentication, an authentication credential request message of a second protocol type (e.g., an authentication credential request message over an SBI interface with the entity for authentication) for a UE. The authentication credential request message of the second protocol type is used for traffic offload from a Non-3GPP access network, and may include an identity of the UE.

In an exemplary embodiment, the identity of the UE is a SUCI of the UE.

In step S1903, the entity for unified data management may transmit, to the entity for authentication, a corresponding authentication credential response message of the second protocol type, e.g., an authentication credential response message over an SBI interface with the entity for authentication, for authentication of the UE with an authentication credential received in the authentication credential response message of the second protocol type.

In an exemplary embodiment, the entity for authentication may be an AAA and arranged at an AUSF.

Alternatively, the entity for authentication may be an AUSF.

In an exemplary embodiment, the entity for unified data management may be a UDM, and the protocol translation entity may be an AAA-IWF.

In an exemplary embodiment, the second protocol type may refer to a 5GC protocol.

Figure 21:
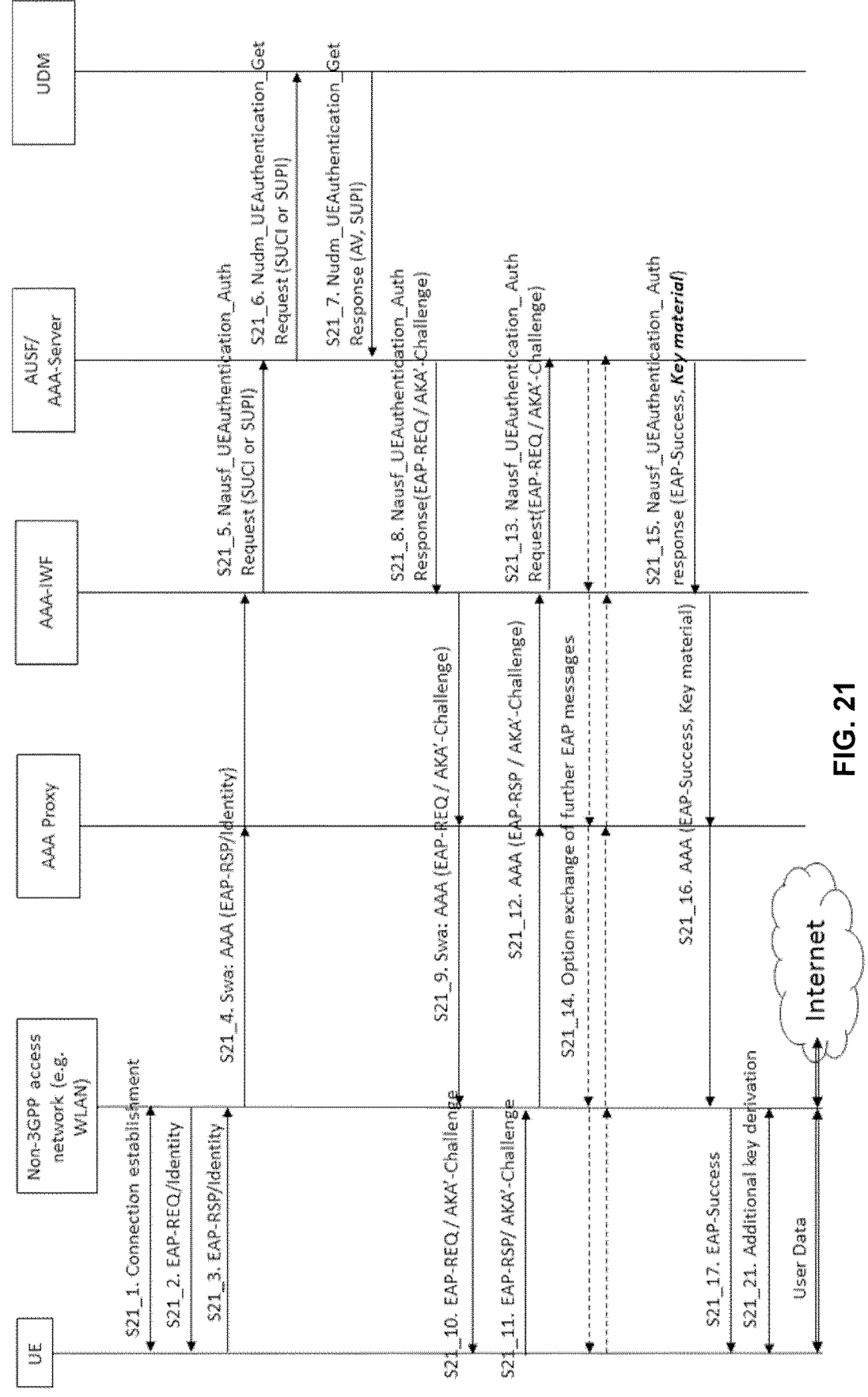
FIG. 21 schematically shows an exemplary signaling sequence diagram for non-3GPP access authentication, in which the methods of FIGS. 15~19 according to the second exemplary embodiment of the present disclosure are applied.
Figure 22:
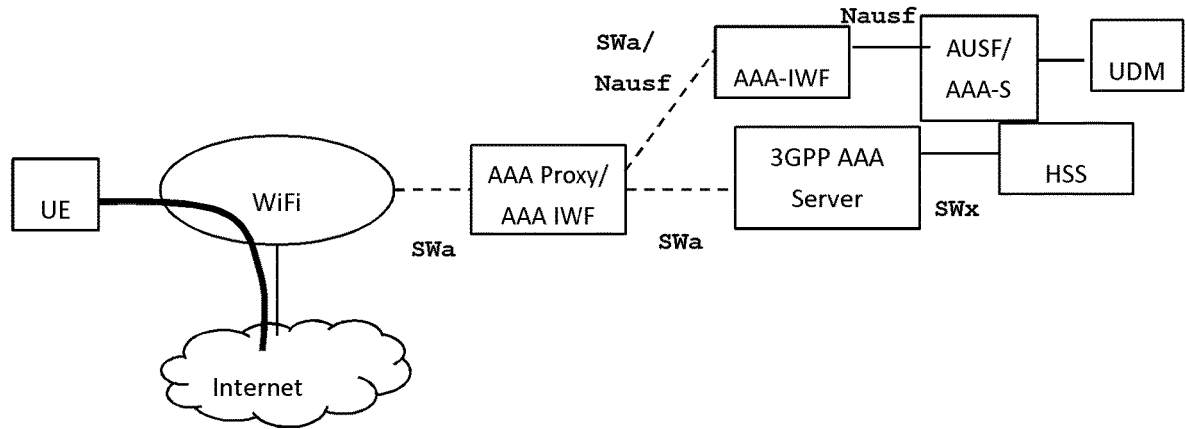
FIG. 22 schematically shows another exemplary architecture for non-3GPP access authentication, in which the methods of FIGS. 15~19 according to the second exemplary embodiment of the present disclosure are applied.

FIGS. 20 and 22 schematically shows exemplary architectures for non-3GPP access authentication in the second exemplary embodiment, and FIG. 21 schematically shows an exemplary signaling sequence diagram corresponding to the exemplary architecture of FIG. 20. The previously described methods 1500~1900 in conjunction with FIGS. 15~19 may be applied in FIGS. 20~22.

The second exemplary embodiment with reference to FIGS. 20~22 may be referred to as "SWa/STa interworking with the AUSF via AAA-IWF". As previously described, SWa is related to non-3GPP untrusted access network, and STa is related to non-3GPP trusted access network, which means that the second exemplary embodiment is applicable to both the non-3GPP untrusted access authentication and the non-3GPP trusted access authentication. The following takes the non-3GPP untrusted access authentication for an example for illustration only without any limitation.

As shown in FIGS. 20 and 22, the Wi-Fi access network (an example of non-3GPP access network) interacts with the AUSF (an example of the entity for authentication) in the 5GC. In this example, the AUSF acts as the 3GPP AAA Server (another example of the entity for authentication), and the Wi-Fi access network keeps on using SWa towards an AAA-IWF (an example of the protocol translation entity) which forwards the authentication request message over SWa to the AUSF within the 5GC.

FIG. 21 shows a procedure for the case where the AAA-IWF performs the translation between the diameter based SWa request messages and the SBI interaction towards AUSF (e.g., step S21_5 in FIG. 21).

It should be understood that either the AAA proxy or the AUSF itself may perform the translation between diameter based SWa request messages from the Wi-Fi Access network and the SBI interactions with the AUSF. That is, the AAA-IWF may be collocated with or a part of AAA proxy or AUSF to perform the translation.

It is assumed that the Nausf_UEAuthentication service can be reused with no or minimal impact. However, since the AUSF will act as the AAA Server for non-3GPP access authentication, this may require a new Nausf service, or require the AUSF to generate a separate key material (instead of Anchor key defined in 3GPP TS 33.501 v16.4.0 FIG. 6.1.3.1-1/step10) to allow the Wi-Fi Access network to act on, e.g. the key material could be the EAP master session key (MSK) that is sent over SWa.

The AUSF interacts with the UDM over Nudm_UEAU-thentication service in order to fetch authentication credentials (e.g. AKAAVs for EAP-AKA' authentication) as currently defined.

Additionally, the AUSF acting as the AAA server may support "Location Management Procedures", "Subscriber Profile Management Procedures" as defined in 3GPP TS 23.402 v16.0.0 and perform SBI interaction with the UDM, e.g. the corresponding UDM service operations defined in 3GPP TS 23.502 v16.6.0, 3GPP TS 23.632 v16.4.0 via AAA-IWF, and sends parameters as authorization AVP back to AAA-proxy over SWa via AAA-IWF.

The exemplary signaling sequence as shown in FIG. 21 may include signaling as follows. It should be noted that the description below mainly focuses on signaling related to the methods 1500~1900, and some other signaling is not described in detail to avoid obscuring the principle of the present disclosure.

In S18_1, a connection is established between the UE and the trusted non-3GPP access network, using a procedure specific to the Non-3GPP access network.

In S18_2, the Non-3GPP access point in the trusted Non-3GPP access network sends an EAP Request/Identity to the UE.

In S18_3, the UE sends an EAP Response/Identity message to the Non-3GPP access point. The EAP Response/Identity message may include an SUCI of the UE.

In S18_4, the Non-3GPP access point receives the EAP Response/Identity message from the UE, and sends an AAA message (with EAP-Response/Identity) to the AAA-IWF over Swa.

In S18_5, the AAA-IWF receives the AAA message (with EAP-Response/Identity) from the Non-3GPP access point over Swa, and sends, to AUSF over an SBI interface, Nausf_UEAuthentication_Auth Request (with SUCI or SUR) for traffic offload from the Non-3GPP access network.

In S18_6, the AUSF receives the Nausf_UEAuthentication_Auth Request (with SUCI or SUR) from the AAA-IWF, and sends, to the UDM, Nudm_UEAuthentication_Get Request (with SUCI or SUR) for traffic offload from the Non-3GPP access network.

In S18_7, the UDM receives Nudm_UEAuthentication_Get Request (with SUCI or SUR) from the AUSF, and sends Nudm_UEAuthentication_Get Response (with AV, SUR) to the AUSF.

In S18_8, the AUSF receives Nudm_UEAuthentication_Get Response (with AV, SUR) from the UDM, and sends Nausf_UEAuthentication_Auth Response (with EAP-Request/AKA'-Challenge) to the AAA-IWF over the SBI interface.

In S18_9, the AAA-IWF sends an AAA message (with EAP-Request/AKA'-Challenge) to the Non-3GPP access point over Swa.

In S18_10, the Non-3GPP access point sends EAP-Request/AKA'-Challenge to the UE.

In a 5GC deployment with support for interworking with EPC, the AAA Proxy needs to be able to route the SWa requests either towards the 3GPP AAA server and the HSS in the EPC for 4G only UEs or to the AUSF/UDM in the 5GC for 5GC only UEs as shown in FIG. 22. This can be done as follows:

If the AAA Proxy is translating the SWa request to SBI Nausf service, the AAA Proxy could check with the Network Repository Function (NRF) if there is any AUSF supporting that UE/SUPI. If so, the AAA Proxy may send an SBI request to the AUSF, and if not, the AAA Proxy may send a diameter SWa request to the 3GPP AAA Server.

If the AAA Proxy is not translating the SWa request to SBI Nausf service, the AAA Proxy may decide to route the request towards the AUSF based on the UE id included in the request (i.e. if the request includes a SUCI/SUPI in NAI format).

Third Exemplary Embodiment

In the third exemplary embodiment, authentication is performed using the regular Registration procedure in 5GC.

As previously described with reference to FIG. 3, the existing solution in 5GS enables devices that do not support 5GC NAS signaling over WLAN access (N5CW devices) to access 5GC via trusted WLAN access networks. A Trusted WLAN Interworking Function (TWIF) is deployed that supports the N1 (NAS) protocol on behalf of the UE. The TWIF will initiate Registration procedure with the 5GC and also PDU Session Establishment. This creates a registration state for the UE in AMF, as well as PDU Session context in SMF/UPF/PCF. In order to support non-seamless WLAN Offload however, the user plane should not traverse the 5GC.

In the third exemplary embodiment, the non-3GPP authentication can be performed but without establishing a PDU Session for the user plane. Instead, the user plane traffic will be broken out (i.e., offload) directly from the non-3GPP access network (e.g., Trusted WLAN access network), or from a non-3GPP access point (e.g., TWIF or TNGF).

Hereinafter, a method 2300 at a first non-3GPP access point for non-3GPP access authentication according to the third exemplary embodiment of the present disclosure will be described with reference to FIG. 23. It should be understood that the first non-3GPP access point may be a TWIF or TNGF, or any other entity that can be configured to perform the method 2300 as described below, including a virtualized entity that may be implemented on cloud. It should be understood that the method 2300 may be appropriately applied in a 5GC deployment, a 5GC deployment with support for interworking with EPC, or other appropriate future developments.

Figure 23:
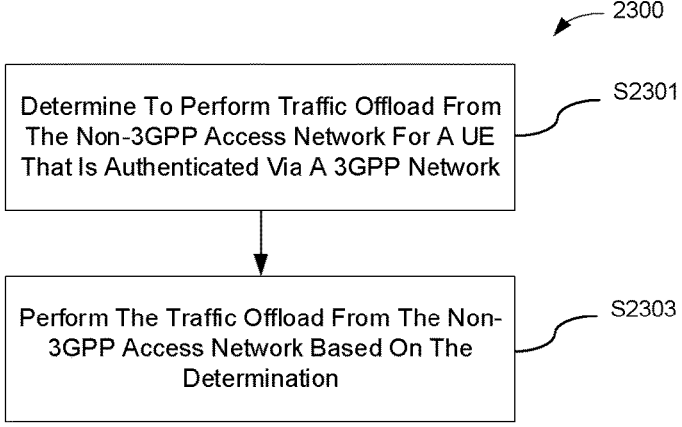
FIG. 23 schematically shows an exemplary method at a first non-3GPP access point for non-3GPP access authentication according to a third exemplary embodiment of the present disclosure.

As shown in FIG. 23, in step S2301, the first non-3GPP access point (e.g., TWIF or TNGF) may determine to perform traffic offload from the Non-3GPP access network for a UE that is authenticated via a 3GPP network. Here, the offload means directly connecting to e.g., the Internet via the non-3GPP access network (i.e., via local IP service facility in the non-3GPP access network) without establishing a data connection over the 3GPP core network (e.g., 5GC).

Then in step S2303, the first non-3GPP access point (e.g., TWIF or TNGF) may perform the traffic offload from the Non-3GPP access network based on the determination.

Alternatively, the first non-3GPP access point (e.g., TWIF or TNGF) may receive, from an entity for mobility management (e.g., AMF), an indication of traffic offload, and determine to perform the traffic offload based on the received indication from the entity for mobility management.

The performing the traffic offload may include: receiving an IP address request from the UE; allocating an IP address to the UE; performing user plane configuration for the UE; and offloading user plane traffic from the first Non-3GPP access point.

Alternatively, the first non-3GPP access point (e.g., TWIF or TNGF) may notify a second Non-3GPP access point (e.g., a Trusted WLAN access point) in the Non-3GPP access network (e.g., a Trusted WLAN access network) of performing the traffic offload from the second Non-3GPP access point.

Hereinafter, a method 2400 at an entity for mobility management, for non-3GPP access authentication according to the third exemplary embodiment of the present disclosure will be described with reference to FIG. 24. It should be understood that the entity for mobility management may be an AMF, or any other entity that can be configured to perform the method 2400 as described below, including a virtualized entity that may be implemented on cloud. It should be understood that the method 2400 may be appropriately applied in a 5GC deployment, a 5GC deployment with support for interworking with EPC, or other appropriate future developments.

It should be understood that the method 2400 at the entity for mobility management at least partly corresponds to the method 2300 at the first non-3GPP access point. Thus, some description of the method 2400 may refer to that of method 2300 as previously described, and thus will be omitted here for simplicity.

Figure 24:
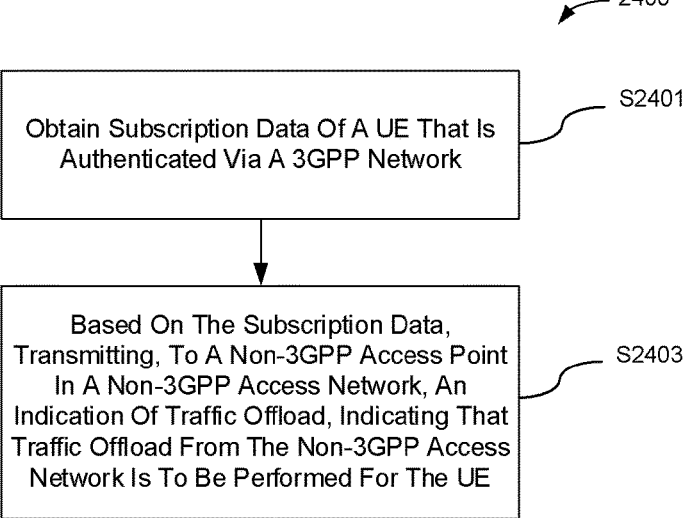
FIG. 24 schematically shows an exemplary method at an entity for mobility management for non-3GPP access authentication according to the third exemplary embodiment of the present disclosure.

As shown in FIG. 24, in step S2401, the entity for mobility management (e.g., AMF) may obtain subscription data of a UE that is authenticated via a 3GPP network.

Then in step S2403, the entity for mobility management (e.g., AMF) may transmit, to a Non-3GPP access point (e.g., TWIF or TNGF) in a Non-3GPP access network (e.g., a Trusted WLAN access network), an indication of traffic offload, indicating that traffic offload from the Non-3GPP access network is to be performed for the UE.

The subscription data of the UE may be fetched by the entity for mobility management from an entity for unified data management (e.g., UDM).

Hereinafter, a method 2500 at a second non-3GPP access point for non-3GPP access authentication according to the third exemplary embodiment of the present disclosure will be described with reference to FIG. 25. It should be understood that the second non-3GPP access point may be a Trusted WLAN access point, or any other entity that can be configured to perform the method 2500 as described below, including a virtualized entity that may be implemented on cloud. It should be understood that the method 2500 may be appropriately applied in a 5GC deployment, a 5GC deployment with support for interworking with EPC, or other appropriate future developments.

It should be understood that the method 2500 at the second non-3GPP access point at least partly corresponds to the method 2300 at the first non-3GPP access point. Thus, some description of the method 2500 may refer to that of method 2300 as previously described, and thus will be omitted here for simplicity.

Figure 25:
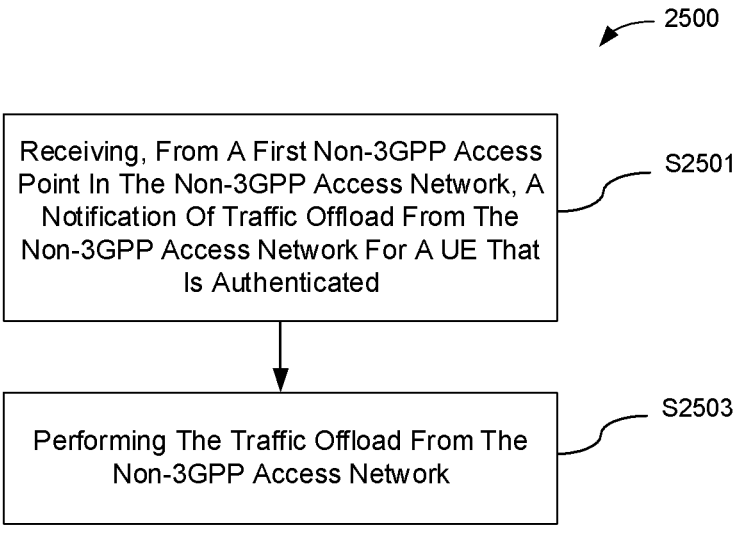
FIG. 25 schematically shows an exemplary method at a second non-3GPP access point for non-3GPP access authentication according to the third exemplary embodiment of the present disclosure.

As shown in FIG. 25, in step S2501, the second non-3GPP access point (e.g., a Trusted WLAN access point) may receive, from a first Non-3GPP access point (e.g., TWIF or TNGF), a notification of traffic offload from the Non-3GPP access network for a UE that is authenticated via a 3GPP network.

Then in step S2503, the second non-3GPP access point may perform traffic offload from the Non-3GPP access network.

The performing the traffic offload may include: receiving an IP address request from the UE; allocating an IP address to the UE; performing user plane configuration for the UE; and offloading user plane traffic from the second Non-3GPP access point.

Figure 26:
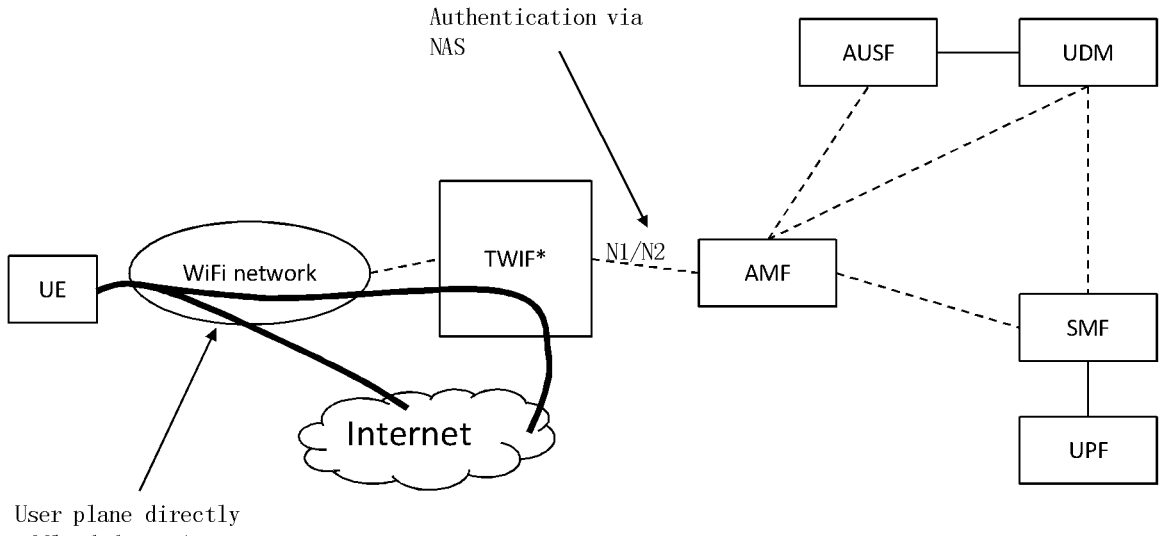
FIG. 26 schematically shows an exemplary architecture for non-3GPP access authentication, in which the methods of FIGS. 23~25 according to the third exemplary embodiment of the present disclosure are applied.
Figure 27:
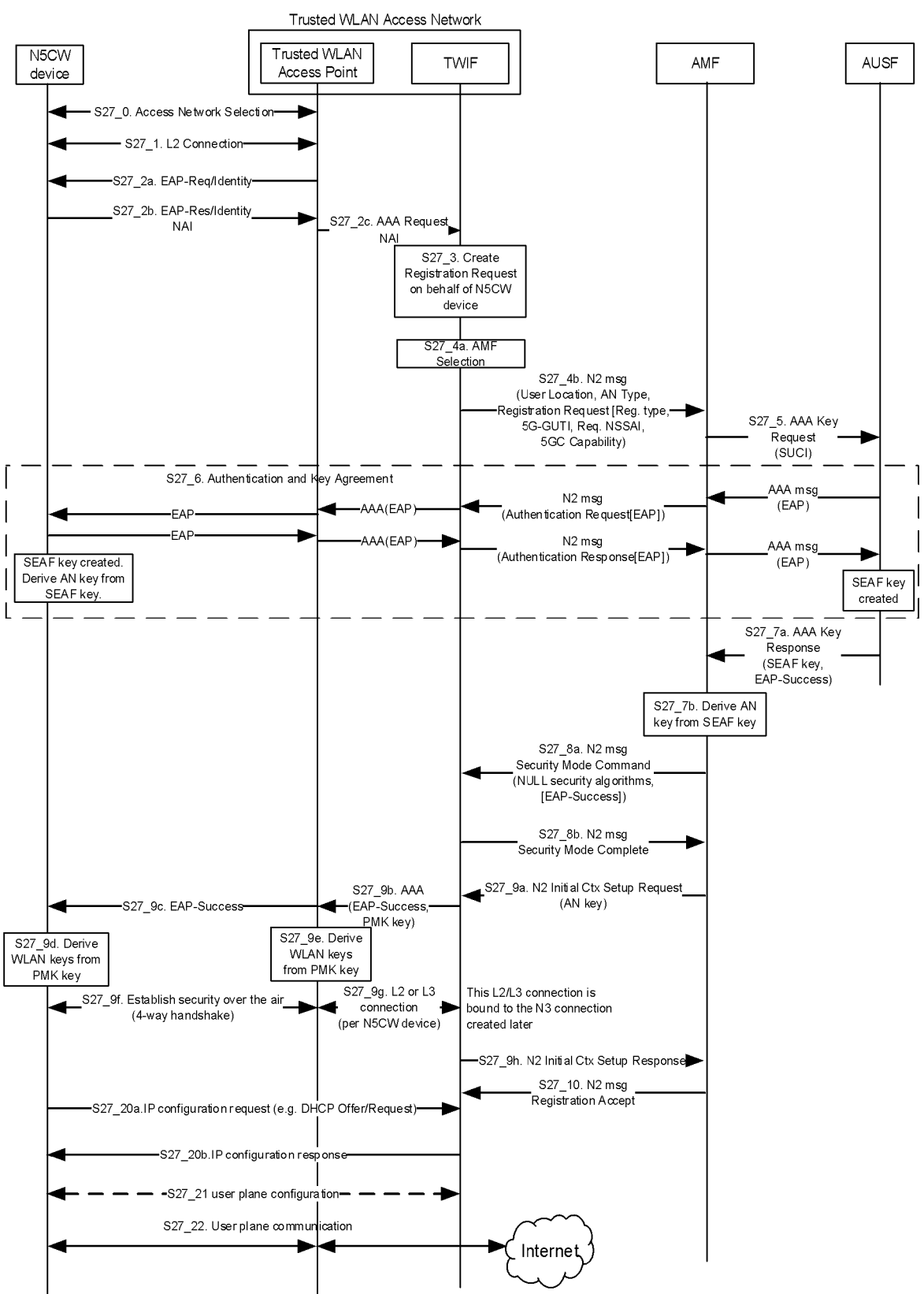
FIG. 27 schematically shows an exemplary signaling sequence diagram for non-3GPP access authentication, in which the methods of FIGS. 23~25 according to the third exemplary embodiment of the present disclosure are applied.

FIG. 26 schematically shows an exemplary architecture for non-3GPP access authentication in the third exemplary embodiment, and FIG. 27 schematically shows an exemplary signaling sequence diagram corresponding to the exemplary architecture of FIG. 26, in which the first non-3GPP access node is TWIF. The previously described methods 2300~2500 in conjunction with FIGS. 23~25 may be applied in FIGS. 26~27.

As shown in FIG. 26, the TWIF is deployed that supports the N1 (NAS) protocol on behalf of the UE. The corresponding exemplary signaling sequence diagram in FIG. 27 is based on that in Clause 4.12b.2 of 3GPP TS 23.502 v16.6.0, and the difference consists in steps S27_20a~S27_22 in FIG. 27.

In step S27_20a, the UE requests an IP address. This may be received by the TWIF or a standalone Dynamic Host Configuration Protocol (DHCP) server.

The TWIF does not request establishment of a PDU Session. When the TWIF receives the IP address request in step S27_20a, the TWIF allocates an IP address and provides it to the UE in step S27_20b. Alternatively, this is done by a standalone DHCP Server.

In step S27_21, the TWIF (optionally) configures the user plane path or does nothing special.

In step S27_22, the user plane traffic will, depending on configuration and deployment, offload from the WLAN access network (e.g., the trusted WLAN access point) directly, or offload via the TWIF, instead of passing via the 5GC. In the case where the user plane traffic is offload from the WLAN access network (e.g., the trusted WLAN access point), the TWIF may further notifies the trusted WLAN access point of performing the traffic offload from the trusted WLAN access point.

Thus, the 5GC may not be impacted; only the TWIF would be impacted due to this solution.

As an optional embodiment, the AMF may notify, based on subscription data, to the TWIF over N1/N2 about what Wi-Fi offload option that is authorized, which may be:

Offload being authorized via TWIF; or

No offload being authorized.

It should be noted that when the UE requests IP configuration in step S27_20a, the TWIF performs an appropriate procedure, i.e., either using offloading according to step S27_22 as proposed in the third embodiment of the present disclosure, or establishing a PDU session via UPF as described in step 25 of Clause 4.12b.2 in 3GPP TS 23.502 v16.6.0.

FIG. 28 schematically shows another exemplary architecture for non-3GPP access authentication in the third exemplary embodiment, in which the first non-3GPP access node is TNGF. The exemplary signaling sequence diagram corresponding to the exemplary architecture of FIG. 28 is the same as that of FIG. 27 except that the TWIF in FIG. 27 is replace with the TNGF. Thus, the exemplary signaling sequence diagram corresponding to the exemplary architecture of FIG. 28 and description thereof is not given for simplicity, but may refer to the related ones of FIG. 27.

It should be noted that the exemplary signaling sequence diagram corresponding to the exemplary architecture in FIG. 28 is based on that in Clause 4.12a.2 of 3GPP TS 23.502 v16.6.0, and the difference similarly consists in steps S24_20a~S24_22 in FIG. 27.

Hereinafter, a structure of an entity for AAA according to the first exemplary embodiment of the present disclosure will be described with reference to FIG. 29. FIG. 29 schematically shows a block diagram of an entity for AAA 2900 according to the first exemplary embodiment of the present disclosure. The entity for AAA 2900 in FIG. 29 may perform the method 400 as described previously with reference to FIG. 4. Accordingly, some detailed description on the entity for AAA 2900 may refer to the corresponding description of the method 400 in FIG. 4 and the signaling sequence diagrams of FIGS. 9-14 as previously discussed, and thus will be omitted here for simplicity.

As shown in FIG. 29, the entity for AAA 2900 includes a receiving unit 2901 and a transmitting unit 2903.

The receiving unit 2901 may be configured to receive, from a Non-3GPP access point, an authentication request message of a first protocol type for a UE.

The transmitting unit 2903 may be configured to transmit an authentication credential request message of the first protocol type to a protocol translation entity for translating the authentication credential request message of the first protocol type to a corresponding authentication credential request message of a second protocol type.

The entity for AAA 2900 may further include a determination unit (not shown), which may be configured to determine whether an identity of the UE received in the authentication request message of the first protocol type is associated with a network using the first protocol type or a network with the second protocol type.

The transmitting unit 2903 may be further configured to transmit the authentication credential request message of the first protocol type to the protocol translation entity, if it is determined that the identity of the UE is associated with the network using the second protocol type.

The receiving unit 2901 may be further configured to receive, from the protocol translation entity, an authentication credential response message of the first protocol type that is translated by the protocol translation entity from a corresponding authentication credential response message of the second protocol type transmitted by an entity for authentication, for authentication of the UE with an authentication credential received in the authentication credential response message of the first protocol type.

The entity for AAA 2900 may further include a conversion unit (not shown), which may be configured to convert the authentication credential to be associated with the network using the first protocol type for authentication of the UE, if the received authentication credential is associated with the network using the second protocol type.

The transmitting unit 2903 may be further configured to transmit, to the protocol translation entity, a location management related message of the first protocol type for translating between the location management related message of the first protocol type and a corresponding location management related message of the second protocol type.

The transmitting unit 2903 may be further configured to transmit, to the protocol translation entity, a subscriber profile management related message of the first protocol type for translating between the subscriber profile management related message of the first protocol type and a corresponding subscriber profile management related message of the second protocol type.

Hereinafter, a structure of an entity for AAA according to the first exemplary embodiment of the present disclosure will be described with reference to FIG. 30. FIG. 30 schematically shows a block diagram of an entity for AAA 3000 according to the first exemplary embodiment of the present disclosure. The entity for AAA 3000 in FIG. 30 may perform the method 400 as described previously with reference to FIG. 4. Accordingly, some detailed description on the entity for AAA 3000 may refer to the corresponding description of the method 400 in FIG. 4 and the signaling sequence diagrams of FIGS. 9-14 as previously discussed, and thus will be omitted here for simplicity.

As shown in FIG. 30, the entity for AAA 3000 includes at least one processor 3001 and at least one memory 3003. The at least one processor 3001 includes e.g., any suitable CPU (Central Processing Unit), microcontroller, DSP (Digital Signal Processor), etc., capable of executing computer program instructions. The at least one memory 3003 may be any combination of a RAM (Random Access Memory) and a ROM (Read Only Memory). The at least one processor memory 3003 may also include persistent storage, which, for example, can be any single one or combination of magnetic memory, optical memory, or solid state memory or even remotely mounted memory.

The at least one memory 3003 stores instructions executable by the at least one processor 3001. The instructions, when loaded from the at least one memory 3003 and executed on the at least one processor 3001, may cause the entity for AAA 3000 to perform the actions, e.g., of the procedures as described earlier respectively in conjunction with FIG. 4 with reference to the signaling sequence diagrams of FIGS. 9~14 as previously discussed, and thus will be omitted here for simplicity.

Figure 31:
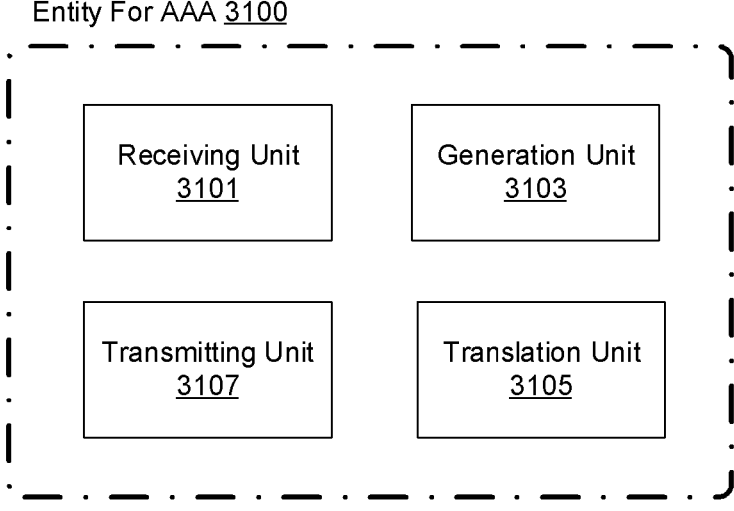
FIG. 31 schematically shows another exemplary structural block diagram of an entity for AAA according to the first exemplary embodiment of the present disclosure.

Hereinafter, a structure of an entity for AAA according to the first exemplary embodiment of the present disclosure will be described with reference to FIG. 31. FIG. 31 schematically shows a block diagram of an entity for AAA 3100 according to the first exemplary embodiment of the present disclosure. The entity for AAA 3100 in FIG. 31 may perform the method 500 as described previously with reference to FIG. 5. Accordingly, some detailed description on the entity for AAA 3100 may refer to the corresponding description of the method 500 in FIG. 5 and the signaling sequence diagrams of FIGS. 9~14 as previously discussed, and thus will be omitted here for simplicity.

As shown in FIG. 31, the entity for AAA 3100 includes a receiving unit 3101, a generation unit 3103, a translation unit 3105 and a transmitting unit 3107.

The receiving unit 3101 may be configured to receive, from a Non-3GPP access point, an authentication request message of a first protocol type for a UE.

The generation unit 3103 may be configured to generate an authentication credential request message of the first protocol type in response to the received authentication request message of the first protocol type.

The translation unit 3105 may be configured to translate the authentication credential request message of the first protocol type to a corresponding authentication credential request message of a second protocol type.

The transmitting unit 3107 may be configured to transmit the corresponding authentication credential request message of the second protocol type for fetching an authentication credential to authenticate the UE.

The entity for AAA 3100 may further include a determination unit (not shown), which may be configured to determine that an identity of the UE received in the authentication request message of the first protocol type is associated with a network using the second protocol type.

Alternatively, the determination unit may be configured to determine that an identity of the UE received in the translated authentication credential request message of the second protocol type is associated with a network using the second protocol type.

The transmitting unit 3107 may be further configured to transmit, to an entity for authentication, the corresponding authentication credential request message of the second protocol type for fetching the authentication credential to authenticate the UE.

The transmitting unit 3107 may be further configured to transmit the corresponding authentication credential request message of the second protocol type to a message routing entity for routing to an entity for authentication.

The receiving unit 3101 may be further configured to receive, from an entity for authentication, an authentication credential response message of the second protocol type.

The translation unit 3105 may be further configured to translate the authentication credential response message of the second protocol type to a corresponding authentication credential response message of the first protocol type for authentication of the UE with the authentication credential received in the authentication credential response message of the first protocol type.

The entity for AAA 3100 may further include a converting unit (not shown), which may be configured to convert the authentication credential to be associated with a network using the first protocol type for authentication of the UE, if the received authentication credential is associated with a network using the second protocol type.

The translation unit 3105 may be further configured to translate a location management related message of the first protocol type to a corresponding location management related message of the second protocol type. And the transmitting unit 3107 may be further configured to transmit the corresponding location management related message of the second protocol type to an entity for authentication.

The translation unit 3105 may be further configured to translate a subscriber profile management related message of the first protocol type to a corresponding subscriber profile management related message of the second protocol type. And the transmitting unit 3107 may be further configured to transmit the corresponding subscriber profile management related message of the second protocol type to the entity for authentication.

Figure 32:
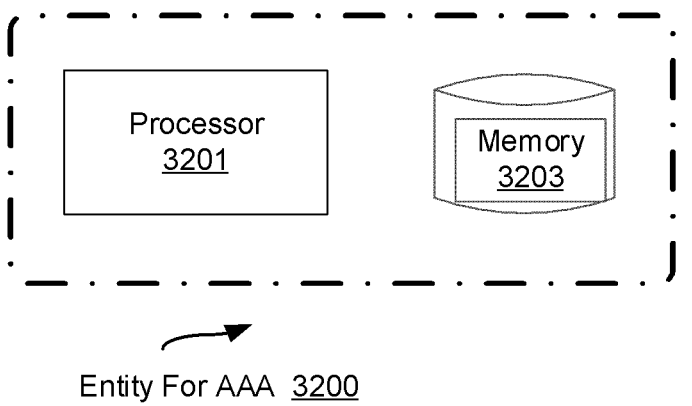
FIG. 32 schematically shows another exemplary structural block diagram of an entity for AAA according to the first exemplary embodiment of the present disclosure.

Hereinafter, a structure of an entity for AAA according to the first exemplary embodiment of the present disclosure will be described with reference to FIG. 32. FIG. 32 schematically shows a block diagram of an entity for AAA 3200 according to the first exemplary embodiment of the present disclosure. The entity for AAA 3200 in FIG. 32 may perform the method 500 as described previously with reference to FIG. 5. Accordingly, some detailed description on the entity for AAA 3200 may refer to the corresponding description of the method 500 in FIG. 5 and the signaling sequence diagrams of FIGS. 9-14 as previously discussed, and thus will be omitted here for simplicity.

As shown in FIG. 32, the entity for AAA 3200 includes at least one processor 3201 and at least one memory 3203. The at least one processor 3201 includes e.g., any suitable CPU (Central Processing Unit), microcontroller, DSP (Digital Signal Processor), etc., capable of executing computer program instructions. The at least one memory 3203 may be any combination of a RAM (Random Access Memory) and a ROM (Read Only Memory). The at least one processor memory 3203 may also include persistent storage, which, for example, can be any single one or combination of magnetic memory, optical memory, or solid state memory or even remotely mounted memory.

The at least one memory 3203 stores instructions executable by the at least one processor 3201. The instructions, when loaded from the at least one memory 3203 and executed on the at least one processor 3201, may cause the entity for AAA 3200 to perform the actions, e.g., of the procedures as described earlier respectively in conjunction with FIG. 5 with reference to the signaling sequence diagrams of FIGS. 9~14 as previously discussed, and thus will be omitted here for simplicity.

Figure 33:
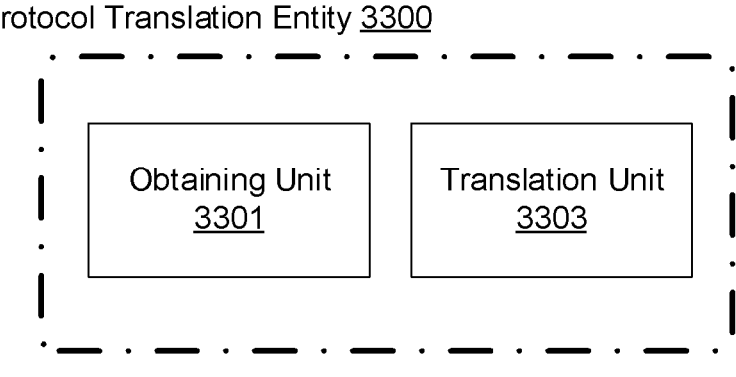
FIG. 33 schematically shows an exemplary structural block diagram of a protocol translation entity according to the first exemplary embodiment of the present disclosure.

Hereinafter, a structure of a protocol translation entity according to the first exemplary embodiment of the present disclosure will be described with reference to FIG. 33. FIG. 33 schematically shows a block diagram of a protocol translation entity 3300 according to the first exemplary embodiment of the present disclosure. The protocol translation entity 3300 in FIG. 33 may perform the method 600 as described previously with reference to FIG. 6. Accordingly, some detailed description on the protocol translation entity 3300 may refer to the corresponding description of the method 600 in FIG. 6 and the signaling sequence diagrams of FIGS. 9~14 as previously discussed, and thus will be omitted here for simplicity.

As shown in FIG. 33, the protocol translation entity 3300 includes an obtaining unit 3301 and a translation unit 3303.

The obtaining unit 3301 may be configured to obtain an authentication credential request message of a first protocol type for a UE.

The translation unit 3303 may be configured to translate the authentication credential request message of the first protocol type to a corresponding authentication credential request message of a second protocol type for authentication of the UE.

The obtaining unit 3301 may be further configured to obtain an authentication credential response message of the second protocol type.

The translation unit 3303 may be configured to translate the authentication credential response message of the second protocol type to a corresponding authentication credential response message of the first protocol type for an entity for AAA to authenticate the UE with an authentication credential in the authentication credential response message of the first protocol type.

The translation unit 3303 may be configured to translate a location management related message of the first protocol type to a corresponding location management related message of the second protocol type.

The translation unit 3303 may be configured to translate a subscriber profile management related message of the first protocol type to a corresponding subscriber profile management related message of the second protocol type.

In an exemplary embodiment, the authentication credential request message of the first protocol type is obtained by being received from the entity for AAA; and the authentication credential response message of the second protocol type is obtained by being received from the entity for authentication. The protocol translation entity 3300 may further include a receiving unit (not shown), which may be configured to receive, from the entity for AAA, the location management related message of the first protocol type. The protocol translation entity 3300 may further include a transmitting unit (not shown), which may be configured to transmit, to the entity for authentication, the corresponding location management related message of the second protocol type. The receiving unit may be further configured to receive, from the entity for AAA, the subscriber profile management related message of the first protocol type. And the transmitting unit may be further configured to transmit, to the entity for authentication, the corresponding subscriber profile management related message of the second protocol type.

In an exemplary embodiment, the protocol translation entity is arranged at the entity for AAA, and wherein the authentication credential request message of the first protocol type is obtained by being generated by the entity for AAA in response to an authentication request message of the first protocol type received from a Non-3GPP access point, and the authentication credential response message of the second protocol type is obtained by being received from the entity for authentication. The obtaining unit 3301 may be further configured to obtain the location management related message of the first protocol type. And the transmitting unit may be further configured to transmit, to the entity for authentication, the corresponding location management related message of the second protocol type. The obtaining unit 3301 may be further configured to obtain the subscriber profile management related message of the first protocol type. And the transmitting unit may be further configured to transmit, to the entity for authentication, the corresponding subscriber profile management related message of the second protocol type.

In an exemplary embodiment, the protocol translation entity is arranged at the entity for authentication, and wherein the authentication credential request message of the first protocol type is obtained by being received from the entity for AAA, and the authentication credential response message of the second protocol type is obtained by being generated by the entity for authentication in response to the authentication credential request message of the second protocol type. The receiving unit may be further configured to receive, from the entity for AAA, the location management related message of the first protocol type. The receiving unit may be further configured to receive, from the entity for AAA, the subscriber profile management related message of the first protocol type.

Hereinafter, a structure of a protocol translation entity according to the first exemplary embodiment of the present disclosure will be described with reference to FIG. 34. FIG. 34 schematically shows a block diagram of a protocol translation entity 3400 according to the first exemplary embodiment of the present disclosure. The protocol translation entity 3400 in FIG. 34 may perform the method 600 as described previously with reference to FIG. 6. Accordingly, some detailed description on the protocol translation entity 3400 may refer to the corresponding description of the method 600 in FIG. 6 and the signaling sequence diagrams of FIGS. 9~14 as previously discussed, and thus will be omitted here for simplicity.

As shown in FIG. 34, the protocol translation entity 3400 includes at least one processor 3401 and at least one memory 3403. The at least one processor 3401 includes e.g., any suitable CPU (Central Processing Unit), microcontroller, DSP (Digital Signal Processor), etc., capable of executing computer program instructions. The at least one memory 3403 may be any combination of a RAM (Random Access Memory) and a ROM (Read Only Memory). The at least one processor memory 3403 may also include persistent storage, which, for example, can be any single one or combination of magnetic memory, optical memory, or solid state memory or even remotely mounted memory.

The at least one memory 3403 stores instructions executable by the at least one processor 3401. The instructions, when loaded from the at least one memory 3403 and executed on the at least one processor 3401, may cause the protocol translation entity 3400 to perform the actions, e.g., of the procedures as described earlier respectively in conjunction with FIG. 6 with reference to the signaling sequence diagrams of FIGS. 9~14 as previously discussed, and thus will be omitted here for simplicity.

Hereinafter, a structure of a message routing entity according to the first exemplary embodiment of the present disclosure will be described with reference to FIG. 35. FIG. 35 schematically shows a block diagram of a message routing entity 3500 according to the first exemplary embodiment of the present disclosure. The message routing entity 3500 in FIG. 35 may perform the method 700 as described previously with reference to FIG. 7. Accordingly, some detailed description on the message routing entity 3500 may refer to the corresponding description of the method 700 in FIG. 7 and the signaling sequence diagrams of FIGS. 9~14 as previously discussed, and thus will be omitted here for simplicity.

As shown in FIG. 35, the message routing entity 3500 includes an obtaining unit 3501, a determination unit 3503 and a transmitting unit 3503.

The obtaining unit 3501 may be configured to obtain an authentication credential request message.

The determination unit 3503 may be configured to determine whether an identity of a UE in the authentication credential request message is associated with a network using a first protocol type or a network with a second protocol type.

The transmitting unit 3503 may be configured to transmit the authentication credential request message towards an entity for authentication of the second protocol type, if it is determined that the identity of the UE is associated with the network using the second protocol type.

In an exemplary embodiment, the authentication credential request message is of the first protocol type. The transmitting unit 3503 may be further configured to transmit the authentication credential request message of the first protocol type to the protocol translation entity for translating the authentication credential request message of the first protocol type to a corresponding authentication credential request message of the second protocol type, if it is determined that the identity of the UE is associated with the network using the second protocol type. The authentication credential request message of the first protocol type is obtained by being received from an entity for AAA. In an exemplary embodiment, the message routing entity is arranged at the entity for AAA, and the authentication credential request message of the first protocol type is obtained by being generated by the entity for AAA in response to an authentication request message of the first protocol type received from a Non-3GPP access point.

In an exemplary embodiment, the authentication credential request message is of the second protocol type The transmitting unit 3503 may be further configured to transmit, to the entity for authentication, the authentication credential request message of the second protocol type for authentication of the UE, if it is determined that the identity of the UE is associated with the network using the second protocol type. The authentication credential request message of the second protocol type is obtained by being received from a protocol translation entity, which is translated by the protocol translation entity from a corresponding authentication request message of the first protocol type.

In an exemplary embodiment, the message routing entity is arranged at the AAA server.

Hereinafter, a structure of a message routing entity according to the first exemplary embodiment of the present disclosure will be described with reference to FIG. 36. FIG. 36 schematically shows a block diagram of a message routing entity 3600 according to the first exemplary embodiment of the present disclosure. The message routing entity 3600 in FIG. 36 may perform the method 700 as described previously with reference to FIG. 7. Accordingly, some detailed description on the message routing entity 3600 may refer to the corresponding description of the method 700 in FIG. 7 and the signaling sequence diagrams of FIGS. 9~14 as previously discussed, and thus will be omitted here for simplicity.

As shown in FIG. 36, the message routing entity 3600 includes at least one processor 3601 and at least one memory 3603. The at least one processor 3601 includes e.g., any suitable CPU (Central Processing Unit), microcontroller, DSP (Digital Signal Processor), etc., capable of executing computer program instructions. The at least one memory 3603 may be any combination of a RAM (Random Access Memory) and a ROM (Read Only Memory). The at least one processor memory 3603 may also include persistent storage, which, for example, can be any single one or combination of magnetic memory, optical memory, or solid state memory or even remotely mounted memory.

The at least one memory 3603 stores instructions executable by the at least one processor 3601. The instructions, when loaded from the at least one memory 3603 and executed on the at least one processor 3601, may cause the message routing entity 3600 to perform the actions, e.g., of the procedures as described earlier respectively in conjunction with FIG. 7 with reference to the signaling sequence diagrams of FIGS. 9~14 as previously discussed, and thus will be omitted here for simplicity.

Figures 37, 38, 39:
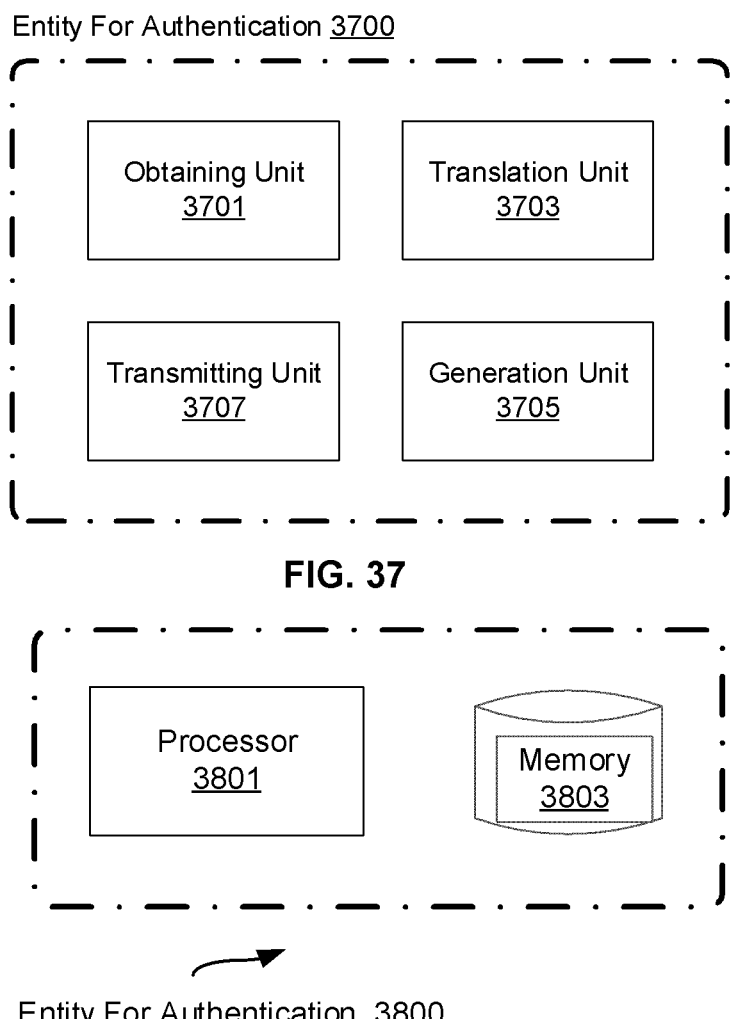
FIG. 37 schematically shows an exemplary structural block diagram of an entity for authentication according to the first exemplary embodiment of the present disclosure.
FIG. 38 schematically shows another exemplary structural block diagram of an entity for authentication according to the first exemplary embodiment of the present disclosure.
FIG. 39 schematically shows an exemplary structural block diagram of an entity for authentication according to the second exemplary embodiment of the present disclosure.

Hereinafter, a structure of an entity for authentication according to the first exemplary embodiment of the present disclosure will be described with reference to FIG. 37. FIG. 37 schematically shows a block diagram of an entity for authentication 3700 according to the first exemplary embodiment of the present disclosure. The entity for authentication 3700 in FIG. 37 may perform the method 800 as described previously with reference to FIG. 8. Accordingly, some detailed description on the entity for authentication 3700 may refer to the corresponding description of the method 800 in FIG. 8 and the signaling sequence diagrams of FIGS. 9~14 as previously discussed, and thus will be omitted here for simplicity.

As shown in FIG. 37, the entity for authentication 3700 includes an obtaining unit 3701, a translation unit 3703, a generation unit 3705 and a transmitting unit 3707.

The obtaining unit 3701 may be configured to obtain an authentication credential request message of a first protocol type for a UE.

The translation unit 3703 may be configured to translate the authentication credential request message of the first protocol type to a corresponding authentication credential request message of a second protocol type for authentication of the UE.

The generation unit 3705 may be configured to generate an authentication credential response message of the second protocol type.

The translation unit 3703 may be further configured to translate the authentication credential response message of the second protocol type to a corresponding authentication credential response message of the first protocol type.

The transmitting unit 3707 may be further configured to transmit, to an entity for AAA, the authentication credential response message of the first protocol type for authentication of the UE with an authentication credential in the authentication credential response message of the first protocol type.

Hereinafter, a structure of an entity for authentication according to the first exemplary embodiment of the present disclosure will be described with reference to FIG. 38. FIG. 38 schematically shows a block diagram of an entity for authentication 3800 according to the first exemplary embodiment of the present disclosure. The entity for authentication 3800 in FIG. 38 may perform the method 800 as described previously with reference to FIG. 8. Accordingly, some detailed description on the entity for authentication 3800 may refer to the corresponding description of the method 800 in FIG. 8 and the signaling sequence diagrams of FIGS. 9~14 as previously discussed, and thus will be omitted here for simplicity.

As shown in FIG. 38, the entity for authentication 3800 includes at least one processor 3801 and at least one memory 3803. The at least one processor 3801 includes e.g., any suitable CPU (Central Processing Unit), microcontroller, DSP (Digital Signal Processor), etc., capable of executing computer program instructions. The at least one memory 3803 may be any combination of a RAM (Random Access Memory) and a ROM (Read Only Memory). The at least one processor memory 3803 may also include persistent storage, which, for example, can be any single one or combination of magnetic memory, optical memory, or solid state memory or even remotely mounted memory.

The at least one memory 3803 stores instructions executable by the at least one processor 3801. The instructions, when loaded from the at least one memory 3803 and executed on the at least one processor 3801, may cause the entity for authentication 3800 to perform the actions, e.g., of the procedures as described earlier respectively in conjunction with FIG. 8 with reference to the signaling sequence diagrams of FIGS. 9~14 as previously discussed, and thus will be omitted here for simplicity.

Hereinafter, a structure of an entity for authentication according to the second exemplary embodiment of the present disclosure will be described with reference to FIG. 39. FIG. 39 schematically shows a block diagram of an entity for authentication 3900 according to the second exemplary embodiment of the present disclosure. The entity for authentication 3900 in FIG. 39 may perform the method 1500 as described previously with reference to FIG. 15. Accordingly, some detailed description on the entity for authentication 3900 may refer to the corresponding description of the method 1500 in FIG. 15 and the signaling sequence diagrams of FIGS. 20~22 as previously discussed, and thus will be omitted here for simplicity.

As shown in FIG. 39, the entity for authentication 3900 includes a receiving unit 3901, a generation unit 3903 and a transmitting unit 3905.

The receiving unit 3901 may be configured to receive, from a protocol translation entity, an authentication request message of a second protocol type for a UE for traffic offload from a Non-3GPP access network, which includes an identity of the UE.

The generation unit 3903 may be configured to generate an authentication credential request message of the second protocol type that includes the identity of the UE, based on the received authentication request message of the second protocol type.

The transmitting unit 3905 may be configured to transmit, to an entity for unified data management, the authentication credential request message of the second protocol type. The authentication credential request message of the second protocol type may be transmitted to the entity for unified data management for traffic offload from the Non-3GPP access network.

In an exemplary embodiment, the identity of the UE is a SUCI of the UE.

The receiving unit 3901 may be further configured to receive, from the entity for unified data management, a corresponding authentication credential response message of the second protocol type for authentication of the UE with an authentication credential received in the authentication credential response message of the second protocol type.

The generation unit 3903 may be further configured to generate an authentication response message of the second protocol type based on the received authentication credential response message of the second protocol type.

The transmitting unit 3905 may be further configured to transmit, to the protocol translation entity, the authentication response message of the second protocol type.

In an exemplary embodiment, the authentication request message of the second protocol type may be an authentication request message over an SBI interface with the protocol translation entity; the authentication credential request message of the second protocol type may be an authentication credential request message over an SBI interface with the entity for unified data management; the authentication credential response message of the second protocol type may be an authentication credential response message over an SBI interface with the entity for unified data management; and the authentication response message of the second protocol type may be an authentication response message over the SBI interface with the protocol translation entity.

In an exemplary embodiment, the entity for authentication 3900 may be an AAA, and arranged at an AUSF.

Alternatively, the entity for authentication 3900 may be an AUSF.

In an exemplary embodiment, the entity for unified data management may be a UDM, and the protocol translation entity may be an AAA-IWF.

In an exemplary embodiment, the second protocol type may refer to a 5GC protocol.

Hereinafter, a structure of an entity for authentication according to the second exemplary embodiment of the present disclosure will be described with reference to FIG. 40. FIG. 40 schematically shows a block diagram of an entity for authentication 4000 according to the second exemplary embodiment of the present disclosure. The entity for authentication 4000 in FIG. 40 may perform the method 1500 as described previously with reference to FIG. 15. Accordingly, some detailed description on the entity for authentication 4000 may refer to the corresponding description of the method 1500 in FIG. 15 and the signaling sequence diagrams of FIGS. 20~22 as previously discussed, and thus will be omitted here for simplicity.

As shown in FIG. 40, the entity for authentication 4000 includes at least one processor 4001 and at least one memory 4003. The at least one processor 4001 includes e.g., any suitable CPU (Central Processing Unit), microcontroller, DSP (Digital Signal Processor), etc., capable of executing computer program instructions. The at least one memory 4003 may be any combination of a RAM (Random Access Memory) and a ROM (Read Only Memory). The at least one processor memory 4003 may also include persistent storage, which, for example, can be any single one or combination of magnetic memory, optical memory, or solid state memory or even remotely mounted memory.

The at least one memory 4003 stores instructions executable by the at least one processor 4001. The instructions, when loaded from the at least one memory 4003 and executed on the at least one processor 4001, may cause the entity for authentication 4000 to perform the actions, e.g., of the procedures as described earlier respectively in conjunction with FIG. 15 with reference to the signaling sequence diagrams of FIGS. 20~22 as previously discussed, and thus will be omitted here for simplicity.

Hereinafter, a structure of a protocol translation entity according to the second exemplary embodiment of the present disclosure will be described with reference to FIG. 41. FIG. 41 schematically shows a block diagram of a protocol translation entity 4100 according to the second exemplary embodiment of the present disclosure. The protocol translation entity 4100 in FIG. 41 may perform the method 1600 as described previously with reference to FIG. 16. Accordingly, some detailed description on the protocol translation entity 4100 may refer to the corresponding description of the method 1600 in FIG. 16 and the signaling sequence diagrams of FIGS. 20~22 as previously discussed, and thus will be omitted here for simplicity.

As shown in FIG. 41, the protocol translation entity 4100 includes a receiving unit 4101, a translation unit 4103, and a transmitting unit 4105.

The receiving unit 4101 may be configured to receive, from a Non-3GPP access point, an authentication request message of a first protocol type for a UE that includes an identity of the UE. In an exemplary embodiment, the identity of the UE may be a SUCI of the UE.

The translation unit 4103 may be configured to translate the authentication request message of the first protocol type to a corresponding authentication request message of a second protocol type.

The transmitting unit 4105 may be configured to transmit, to an entity for authentication, the corresponding authentication request message of a second protocol type that includes the identity of the UE. The authentication request message of the second protocol type is transmitted to the entity for authentication for traffic offload from a Non-3GPP access network.

The receiving unit 4101 may be further configured to receive, from the entity for authentication, an authentication response message of the second protocol type.

The translation unit 4103 may be further configured to translate the authentication response message of the second protocol type to a corresponding authentication response message of the first protocol type.

The transmitting unit 4105 may be configured to transmit, to the Non-3GPP access point, the corresponding authentication response message of the first protocol type.

The protocol translation entity 4100 may be arranged at an AAA proxy.

In an exemplary embodiment, the first protocol type refers to an EPC protocol, and the second protocol type refers to a 5GC protocol.

In an exemplary embodiment, the authentication request message of the first protocol type may be a Diameter based authentication request message over an SWa/STa interface; the authentication request message of the second protocol type may be an authentication request message over an SBI interface with the entity for authentication; the authentication response message of the first protocol type may be a Diameter based authentication response message over an SWa/STa interface; and the authentication response message of the second protocol type may be an authentication response message over the SBI interface with the entity for authentication.

In an exemplary embodiment, the protocol translation entity may be an AAA-IWF, and the entity for authentication includes an AUSF or an AAA arranged at an AUSF.

Hereinafter, a structure of a protocol translation entity according to the second exemplary embodiment of the present disclosure will be described with reference to FIG. 42. FIG. 42 schematically shows a block diagram of an protocol translation entity 4200 according to the second exemplary embodiment of the present disclosure. The protocol translation entity 4200 in FIG. 42 may perform the method 1600 as described previously with reference to FIG. 16. Accordingly, some detailed description on the protocol translation entity 4200 may refer to the corresponding description of the method 1600 in FIG. 16 and the signaling sequence diagrams of FIGS. 20~22 as previously discussed, and thus will be omitted here for simplicity.

As shown in FIG. 42, the protocol translation entity 4200 includes at least one processor 4201 and at least one memory 4203. The at least one processor 4201 includes e.g., any suitable CPU (Central Processing Unit), microcontroller, DSP (Digital Signal Processor), etc., capable of executing computer program instructions. The at least one memory 4203 may be any combination of a RAM (Random Access Memory) and a ROM (Read Only Memory). The at least one processor memory 4203 may also include persistent storage, which, for example, can be any single one or combination of magnetic memory, optical memory, or solid state memory or even remotely mounted memory.

Figure 43:
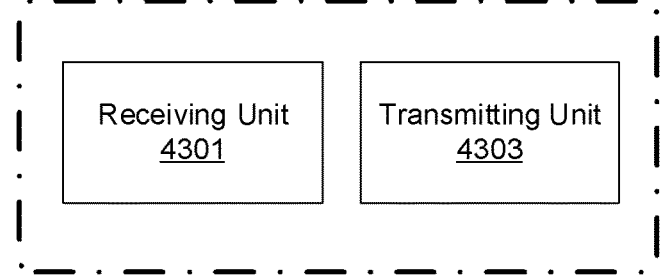
FIG. 43 schematically shows an exemplary structural block diagram of a Non-3GPP access point according to the second exemplary embodiment of the present disclosure.

The at least one memory 4203 stores instructions executable by the at least one processor 4201. The instructions, when loaded from the at least one memory 4203 and executed on the at least one processor 4201, may cause the protocol translation entity 4200 to perform the actions, e.g., of the procedures as described earlier respectively in conjunction with FIG. 16 with reference to the signaling sequence diagrams of FIGS. 20~22 as previously discussed, and thus will be omitted here for simplicity. Hereinafter, a structure of a Non-3GPP access point according to the second exemplary embodiment of the present disclosure will be described with reference to FIG. 43. FIG. 43 schematically shows a block diagram of a Non-3GPP access point 4300 according to the second exemplary embodiment of the present disclosure. The Non-3GPP access point 4300 in FIG. 43 may perform the method 1700 as described previously with reference to FIG. 17. Accordingly, some detailed description on the Non-3GPP access point 4300 may refer to the corresponding description of the method 1700 in FIG. 17 and the signaling sequence diagrams of FIGS. 20~22 as previously discussed, and thus will be omitted here for simplicity.

As shown in FIG. 43, the Non-3GPP access point 4300 includes a receiving unit 4301 and a transmitting unit 4303.

The receiving unit 4301 may be configured to receive, from a UE, a request message for access authentication including a SUCI of the UE.

The transmitting unit 4303 may be configured to transmit, to a protocol translation entity, an authentication request message of a first protocol type including the SUCI of the UE The receiving unit 4301 may be further configured to receive, from the protocol translation entity, an authentication response message of the first protocol type.

In an exemplary embodiment, the first protocol type may refer to an EPC protocol.

In an exemplary embodiment, the authentication request message of the first protocol type includes a Diameter based authentication request message over an SWa/STa interface; and the authentication response message of the first protocol type includes a Diameter based authentication response message over an SWa/STa interface.

In an exemplary embodiment, the protocol translation entity may be an AAA-IWF.

Figure 44:
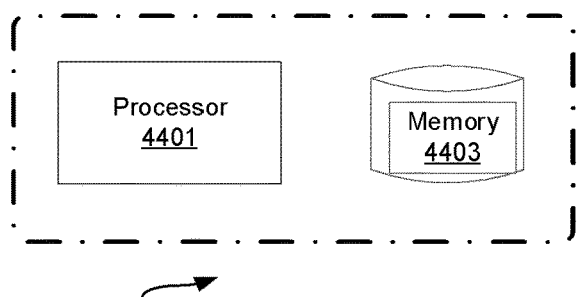
FIG. 44 schematically shows another exemplary structural block diagram of a Non-3GPP access point according to the second exemplary embodiment of the present disclosure.

Hereinafter, a structure of a Non-3GPP access point according to the second exemplary embodiment of the present disclosure will be described with reference to FIG. 44. FIG. 44 schematically shows a block diagram of a Non-3GPP access point 4400 according to the second exemplary embodiment of the present disclosure. The Non-3GPP access point 4400 in FIG. 44 may perform the method 1700 as described previously with reference to FIG. 17. Accordingly, some detailed description on the Non-3GPP access point 4400 may refer to the corresponding description of the method 1700 in FIG. 17 and the signaling sequence diagrams of FIGS. 20-22 as previously discussed, and thus will be omitted here for simplicity.

Figure 47:
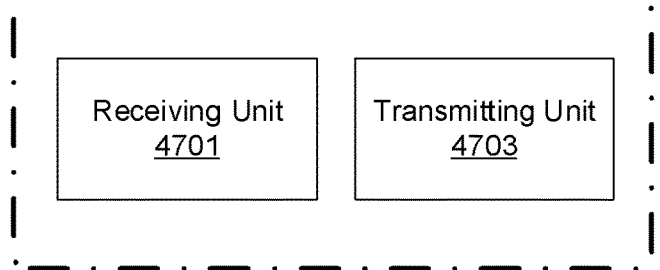
FIG. 47 schematically shows an exemplary structural block diagram of an entity for unified data management according to the second exemplary embodiment of the present disclosure.

As shown in FIG. 47, the Non-3GPP access point 4400 includes at least one processor 4401 and at least one memory 4403. The at least one processor 4401 includes e.g., any suitable CPU (Central Processing Unit), microcontroller, DSP (Digital Signal Processor), etc., capable of executing computer program instructions. The at least one memory 4403 may be any combination of a RAM (Random Access Memory) and a ROM (Read Only Memory). The at least one processor memory 4403 may also include persistent storage, which, for example, can be any single one or combination of magnetic memory, optical memory, or solid state memory or even remotely mounted memory.

The at least one memory 4403 stores instructions executable by the at least one processor 4401. The instructions, when loaded from the at least one memory 4403 and executed on the at least one processor 4401, may cause the entity for authentication 4400 to perform the actions, e.g., of the procedures as described earlier respectively in conjunction with FIG. 17 with reference to the signaling sequence diagrams of FIGS. 20-22 as previously discussed, and thus will be omitted here for simplicity.

Figure 45:
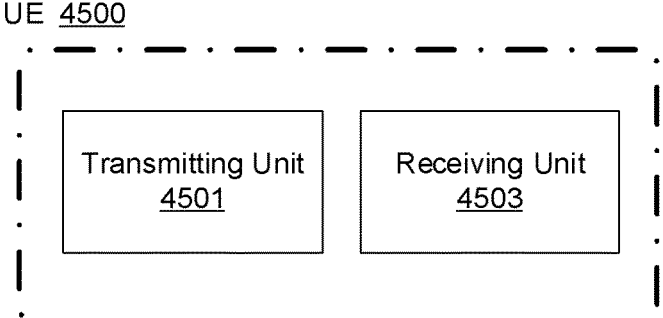
FIG. 45 schematically shows an exemplary structural block diagram of a UE according to the second exemplary embodiment of the present disclosure.

Hereinafter, a structure of a UE according to the second exemplary embodiment of the present disclosure will be described with reference to FIG. 45. FIG. 45 schematically shows a block diagram of a UE 4500 according to the second exemplary embodiment of the present disclosure. The UE 4500 in FIG. 45 may perform the method 1800 as described previously with reference to FIG. 18. Accordingly, some detailed description on the UE 4500 may refer to the corresponding description of the method 1800 in FIG. 18 and the signaling sequence diagrams of FIGS. 20~22 as previously discussed, and thus will be omitted here for simplicity.

As shown in FIG. 45, the UE 4500 includes a connection unit 4501 and a transmitting unit 4503.

The connection unit 4501 may be configured to perform connection establishment between the UE and a Non-3GPP access network for traffic offload from the Non-3GPP access network.

The transmitting unit 4503 may be configured to transmit, to a Non-3GPP access point in the Non-3GPP access network, a request message for access authentication that includes a SUCI of the UE.

The UE 4500 may further include a receiving unit (not shown), which may be configured to receive, from the Non-3GPP access point, a response message for access authentication.

Figure 46:
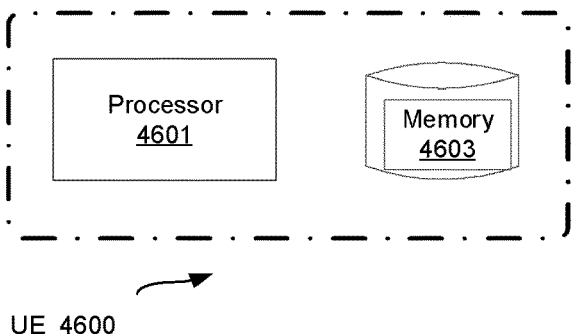
FIG. 46 schematically shows another exemplary structural block diagram of a UE according to the second exemplary embodiment of the present disclosure.

Hereinafter, a structure of a UE according to the second exemplary embodiment of the present disclosure will be described with reference to FIG. 46. FIG. 46 schematically shows a block diagram of a UE 4600 according to the second exemplary embodiment of the present disclosure. The UE 4600 in FIG. 46 may perform the method 1800 as described previously with reference to FIG. 18. Accordingly, some detailed description on the UE 4600 may refer to the corresponding description of the method 1800 in FIG. 18 and the signaling sequence diagrams of FIGS. 20~22 as previously discussed, and thus will be omitted here for simplicity.

As shown in FIG. 46, the UE 4600 includes at least one processor 4601 and at least one memory 4603. The at least one processor 4601 includes e.g., any suitable CPU (Central Processing Unit), microcontroller, DSP (Digital Signal Processor), etc., capable of executing computer program instructions. The at least one memory 4603 may be any combination of a RAM (Random Access Memory) and a ROM (Read Only Memory). The at least one processor memory 4603 may also include persistent storage, which, for example, can be any single one or combination of magnetic memory, optical memory, or solid state memory or even remotely mounted memory.

The at least one memory 4603 stores instructions executable by the at least one processor 4601. The instructions, when loaded from the at least one memory 4603 and executed on the at least one processor 4601, may cause the UE 4600 to perform the actions, e.g., of the procedures as described earlier respectively in conjunction with FIG. 18 with reference to the signaling sequence diagrams of FIGS. 20~22 as previously discussed, and thus will be omitted here for simplicity.

Hereinafter, a structure of an entity for unified data management according to the second exemplary embodiment of the present disclosure will be described with reference to FIG. 47. FIG. 47 schematically shows a block diagram of an entity for unified data management 4700 according to the second exemplary embodiment of the present disclosure. The entity for unified data management 4700 in FIG. 47 may perform the method 1900 as described previously with reference to FIG. 19. Accordingly, some detailed description on the entity for unified data management 4700 may refer to the corresponding description of the method 1900 in FIG. 19 and the signaling sequence diagrams of FIGS. 20~22 as previously discussed, and thus will be omitted here for simplicity.

As shown in FIG. 47, the entity for unified data management 4700 includes a receiving unit 4701 and a transmitting unit 4703.

The receiving unit 4701 may be configured to receive, from an entity for authentication, an authentication credential request message of a second protocol type for a UE for traffic offload from a Non-3GPP access network, which includes an identity of the UE.

In an exemplary embodiment, the identity of the UE may be a SUCI of the UE.

The transmitting unit 4703 may be configured to transmit, to the entity for authentication, a corresponding authentication credential response message of the second protocol type, for authentication of the UE with an authentication credential received in the authentication credential response message of the second protocol type.

In an exemplary embodiment, the authentication credential request message of the second protocol type may be an authentication credential request message over an SBI interface with the entity for authentication; and the authentication credential response message of the second protocol type may be an authentication credential response message over an SBI interface with the entity for authentication.

In an exemplary embodiment, the entity for authentication may be an AAA, and arranged at an Authentication Server Function 'AUSF'.

Alternatively, the entity for authentication may be an AUSF.

In an exemplary embodiment, the entity for unified data management may be a UDM, and the protocol translation entity may be an AAA-IWF.

In an exemplary embodiment, the second protocol type may refer to a 5GC protocol.

Figure 48:
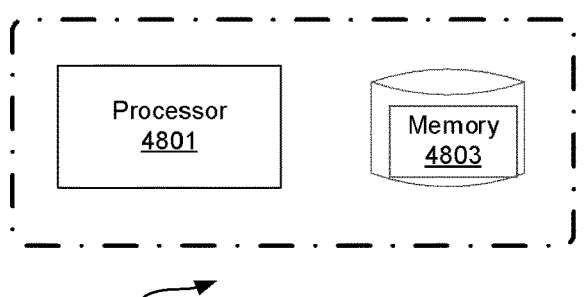
FIG. 48 schematically shows another exemplary structural block diagram of an entity for unified data management according to the second exemplary embodiment of the present disclosure.

Hereinafter, a structure of an entity for unified data management according to the second exemplary embodiment of the present disclosure will be described with reference to FIG. 48. FIG. 48 schematically shows a block diagram of an entity for unified data management 4800 according to the second exemplary embodiment of the present disclosure. The entity for unified data management 4800 in FIG. 48 may perform the method 1900 as described previously with reference to FIG. 19. Accordingly, some detailed description on the entity for unified data management 4800 may refer to the corresponding description of the method 1900 in FIG. 19 and the signaling sequence diagrams of FIGS. 20~22 as previously discussed, and thus will be omitted here for simplicity.

As shown in FIG. 48, the entity for unified data management 4800 includes at least one processor 4801 and at least one memory 4803. The at least one processor 4801 includes e.g., any suitable CPU (Central Processing Unit), microcontroller, DSP (Digital Signal Processor), etc., capable of executing computer program instructions. The at least one memory 4803 may be any combination of a RAM (Random Access Memory) and a ROM (Read Only Memory). The at least one processor memory 4803 may also include persistent storage, which, for example, can be any single one or combination of magnetic memory, optical memory, or solid state memory or even remotely mounted memory.

The at least one memory 4803 stores instructions executable by the at least one processor 4801. The instructions, when loaded from the at least one memory 4803 and executed on the at least one processor 4801, may cause the entity for unified data management 4800 to perform the actions, e.g., of the procedures as described earlier respectively in conjunction with FIG. 19 with reference to the signaling sequence diagrams of FIGS. 20~22 as previously discussed, and thus will be omitted here for simplicity.

Figure 49:
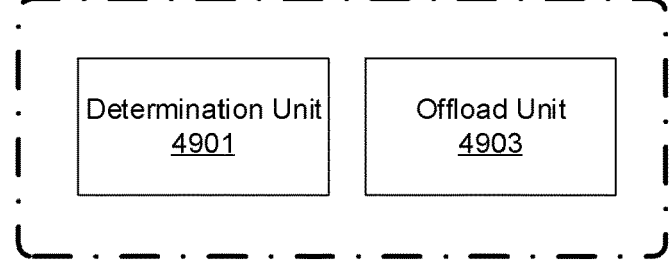
FIG. 49 schematically shows an exemplary structural block diagram of a first Non-3GPP access point according to the third exemplary embodiment of the present disclosure.

Hereinafter, a structure of a first Non-3GPP access point according to the third exemplary embodiment of the present disclosure will be described with reference to FIG. 49. FIG. 49 schematically shows a block diagram of a first Non-3GPP access point 4900 according to the second exemplary embodiment of the present disclosure. The first Non-3GPP access point 4900 in FIG. 49 may perform the method 2300 as described previously with reference to FIG. 23. Accordingly, some detailed description on the first Non-3GPP access point 4900 may refer to the corresponding description of the method 2300 in FIG. 23 and the signaling sequence diagrams of FIGS. 26~28 as previously discussed, and thus will be omitted here for simplicity.

As shown in FIG. 49, the first Non-3GPP access point 4900 includes a determination unit 4901 and an offload unit 4903.

The determination unit 4901 may be configured to determine to perform traffic offload from the Non-3GPP access network for a UE that is authenticated via a 3GPP network.

The offload unit 4903 may be configured to perform the traffic offload from the Non-3GPP access network based on the determination.

The first Non-3GPP access point 4900 may further include a receiving unit (not shown), which may be configured to receive, from an entity for mobility management, an indication of traffic offload. And the traffic offload is determined to be performed based on the received indication.

The offload unit 4903 may be further configured to receive an IP address request from the UE; allocating an IP address to the UE; performing user plane configuration for the UE; and offloading user plane traffic from the first Non-3GPP access point.

The offload unit 4903 may be further configured to notify a second Non-3GPP access point in the Non-3GPP access network of performing the traffic offload from the second Non-3GPP access point.

Figure 50:
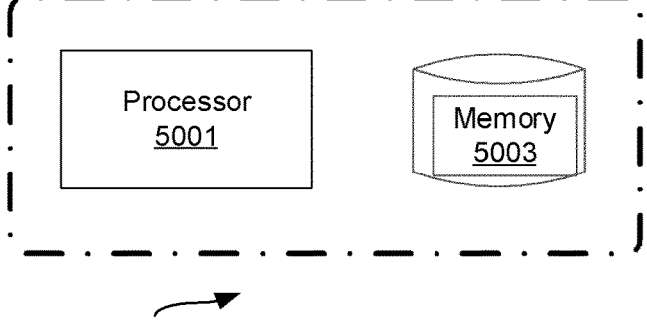
FIG. 50 schematically shows another exemplary structural block diagram of an entity for mobility management according to the third exemplary embodiment of the present disclosure.

Hereinafter, a structure of a first Non-3GPP access point according to the third exemplary embodiment of the present disclosure will be described with reference to FIG. 50. FIG. 50 schematically shows a block diagram of a first Non-3GPP access point 5000 according to the second exemplary embodiment of the present disclosure. The first Non-3GPP access point 5000 in FIG. 50 may perform the method 2000 as described previously with reference to FIG. 23. Accordingly, some detailed description on the first Non-3GPP access point 5000 may refer to the corresponding description of the method 2300 in FIG. 23 and the signaling sequence diagrams of FIGS. 26~28 as previously discussed, and thus will be omitted here for simplicity.

As shown in FIG. 50, the first Non-3GPP access point 5000 includes at least one processor 5001 and at least one memory 5003. The at least one processor 5001 includes e.g., any suitable CPU (Central Processing Unit), microcontroller, DSP (Digital Signal Processor), etc., capable of executing computer program instructions. The at least one memory 5003 may be any combination of a RAM (Random Access Memory) and a ROM (Read Only Memory). The at least one processor memory 5003 may also include persistent storage, which, for example, can be any single one or combination of magnetic memory, optical memory, or solid state memory or even remotely mounted memory.

The at least one memory 5003 stores instructions executable by the at least one processor 5001. The instructions, when loaded from the at least one memory 5003 and executed on the at least one processor 5001, may cause the first Non-3GPP access point 5000 to perform the actions, e.g., of the procedures as described earlier respectively in conjunction with FIG. 23 with reference to the signaling sequence diagrams of FIGS. 26~28 as previously discussed, and thus will be omitted here for simplicity.

Hereinafter, a structure of an entity for mobility management according to the third exemplary embodiment of the present disclosure will be described with reference to FIG. 51. FIG. 51 schematically shows a block diagram of an entity for mobility management 5100 according to the second exemplary embodiment of the present disclosure. The entity for mobility management 5100 in FIG. 51 may perform the method 2400 as described previously with reference to FIG. 24. Accordingly, some detailed description on the entity for mobility management 5100 may refer to the corresponding description of the method 2400 in FIG. 24 and the signaling sequence diagrams of FIGS. 26~28 as previously discussed, and thus will be omitted here for simplicity.

As shown in FIG. 51, the entity for mobility management 5100 includes an obtaining unit 5101 and a transmitting unit 5103.

The obtaining unit 5101 may be configured to obtain subscription data of a UE that is authenticated via a 3GPP network.

The transmitting unit 5103 may be configured to, based on the subscription data, transmit, to a Non-3GPP access point in a Non-3GPP access network, an indication of traffic offload, indicating that traffic offload from the Non-3GPP access network is to be performed for the UE.

The subscription data of the UE is fetched from an entity for unified data management.

Hereinafter, a structure of an entity for mobility management according to the third exemplary embodiment of the present disclosure will be described with reference to FIG. 52. FIG. 52 schematically shows a block diagram of an entity for mobility management 5200 according to the second exemplary embodiment of the present disclosure. The entity for mobility management 5200 in FIG. 52 may perform the method 2400 as described previously with reference to FIG. 24. Accordingly, some detailed description on the entity for mobility management 5200 may refer to the corresponding description of the method 2400 in FIG. 24 and the signaling sequence diagrams of FIGS. 26~28 as previously discussed, and thus will be omitted here for simplicity.

As shown in FIG. 52, the entity for mobility management 5200 includes at least one processor 5201 and at least one memory 5203. The at least one processor 5201 includes e.g., any suitable CPU (Central Processing Unit), microcontroller, DSP (Digital Signal Processor), etc., capable of executing computer program instructions. The at least one memory 5203 may be any combination of a RAM (Random Access Memory) and a ROM (Read Only Memory). The at least one processor memory 5203 may also include persistent storage, which, for example, can be any single one or combination of magnetic memory, optical memory, or solid state memory or even remotely mounted memory.

The at least one memory 5203 stores instructions executable by the at least one processor 5201. The instructions, when loaded from the at least one memory 5203 and executed on the at least one processor 5201, may cause the entity for mobility management 5200 to perform the actions, e.g., of the procedures as described earlier respectively in conjunction with FIG. 24 with reference to the signaling sequence diagrams of FIGS. 26~28 as previously discussed, and thus will be omitted here for simplicity.

Hereinafter, a structure of a second Non-3GPP access point according to the third exemplary embodiment of the present disclosure will be described with reference to FIG.

53. FIG. 53 schematically shows a block diagram of a second Non-3GPP access point 5300 according to the second exemplary embodiment of the present disclosure. The second Non-3GPP access point 5300 in FIG. 53 may perform the method 2500 as described previously with reference to FIG. 53. Accordingly, some detailed description on the second Non-3GPP access point 5300 may refer to the corresponding description of the method 2500 in FIG. 25 and the signaling sequence diagrams of FIGS. 26~28 as previously discussed, and thus will be omitted here for simplicity.

As shown in FIG. 53, the second Non-3GPP access point 5300 includes a receiving unit 5301 and an offload unit 5303.

The receiving unit 5301 may be configured to receive, from a first Non-3GPP access point in the Non-3GPP access network, a notification of traffic offload from the Non-3GPP access network for a UE that is authenticated via a 3GPP network.

The offload unit 5303 may be configured to perform traffic offload from the Non-3GPP access network.

The offload unit 5303 may be further configured to receive an IP address request from the UE; allocating an IP address to the UE; performing user plane configuration for the UE; and offloading user plane traffic from the first Non-3GPP access point.

Hereinafter, a structure of a second Non-3GPP access point according to the third exemplary embodiment of the present disclosure will be described with reference to FIG. 54. FIG. 54 schematically shows a block diagram of a second Non-3GPP access point 5400 according to the second exemplary embodiment of the present disclosure. The second Non-3GPP access point 5400 in FIG. 54 may perform the method 2500 as described previously with reference to FIG. 25. Accordingly, some detailed description on the second Non-3GPP access point 5400 may refer to the corresponding description of the method 2500 in FIG. 25 and the signaling sequence diagrams of FIGS. 26~28 as previously discussed, and thus will be omitted here for simplicity.

As shown in FIG. 54, the second Non-3GPP access point 5400 includes at least one processor 5401 and at least one memory 5403. The at least one processor 5401 includes e.g., any suitable CPU (Central Processing Unit), microcontroller, DSP (Digital Signal Processor), etc., capable of executing computer program instructions. The at least one memory 5403 may be any combination of a RAM (Random Access Memory) and a ROM (Read Only Memory). The at least one processor memory 5403 may also include persistent storage, which, for example, can be any single one or combination of magnetic memory, optical memory, or solid state memory or even remotely mounted memory.

The at least one memory 5403 stores instructions executable by the at least one processor 5401. The instructions, when loaded from the at least one memory 5403 and executed on the at least one processor 5401, may cause the second Non-3GPP access point 5400 to perform the actions, e.g., of the procedures as described earlier respectively in conjunction with FIG. 22 with reference to the signaling sequence diagrams of FIGS. 23-25 as previously discussed, and thus will be omitted here for simplicity.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program.

The computer program includes: code/computer readable instructions, which when executed by the at least one processor 3001 causes the entity for AAA 3000 to perform the actions, e.g., of the procedure described earlier in conjunction with FIG. 4; or code/computer readable instructions, which when executed by the at least one processor 3201 causes the entity for AAA 3200 to perform the actions, e.g., of the procedures described earlier respectively in conjunction with FIG. 5; or code/computer readable instructions, which when executed by the at least one processor 3401 causes the protocol translation entity 3400 to perform the actions, e.g., of the procedures described earlier respectively in conjunction with FIG. 6; or code/computer readable instructions, which when executed by the at least one processor 3601 causes the message routing entity 3600 to perform the actions, e.g., of the procedures described earlier respectively in conjunction with FIG. 7; or code/computer readable instructions, which when executed by the at least one processor 4101 causes the entity for authentication 4100 to perform the actions, e.g., of the procedures described earlier respectively in conjunction with FIG. 8; or code/computer readable instructions, which when executed by the at least one processor 4001 causes the entity for authentication 4000 to perform the actions, e.g., of the procedures described earlier respectively in conjunction with FIG. 15; or code/computer readable instructions, which when executed by the at least one processor 4201 causes the protocol translation entity 4200 to perform the actions, e.g., of the procedures described earlier respectively in conjunction with FIG. 16; or code/computer readable instructions, which when executed by the at least one processor 4401 causes the Non-3GPP access point 4400 to perform the actions, e.g., of the procedures described earlier respectively in conjunction with FIG. 17; or code/computer readable instructions, which when executed by the at least one processor 4601 causes the UE 4600 to perform the actions, e.g., of the procedures described earlier respectively in conjunction with FIG. 18; or code/computer readable instructions, which when executed by the at least one processor 4801 causes the entity for unified data management 4800 to perform the actions, e.g., of the procedures described earlier respectively in conjunction with FIG. 19; or code/computer readable instructions, which when executed by the at least one processor 5001 causes the first Non-3GPP access point 5000 to perform the actions, e.g., of the procedures described earlier respectively in conjunction with FIG. 23; or code/computer readable instructions, which when executed by the at least one processor 5201 causes the entity for mobility management 5200 to perform the actions, e.g., of the procedures described earlier respectively in conjunction with FIG. 24; or code/computer readable instructions, which when executed by the at least one processor 5401 causes the second Non-3GPP access point 5400 to perform the actions, e.g., of the procedures described earlier respectively in conjunction with FIG. 25.

The computer program product may be configured as a computer program code structured in computer program modules. The computer program modules could essentially perform the actions of the flow illustrated in any of FIGS. 9 to 14, 20 to 23 and 26 to 28.

The processor may be a single CPU (Central processing unit), but could also include two or more processing units. For example, the processor may include general purpose microprocessors; instruction set processors and/or related chips sets and/or special purpose microprocessors such as Application Specific Integrated Circuit (ASICs). The processor may also include board memory for caching purposes. The computer program may be carried by a computer program product connected to the processor. The computer program product may include a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The present disclosure has been described above with reference to embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached.

Example embodiments of the techniques and apparatus described herein include, but are not limited to, the following enumerated examples:

1. A method (400) at an entity for Authentication, Authorization and Accounting 'AAA', comprising:

receiving (S401), from a Non-3rd Generation Partnership Project 'Non-3GPP' access point, an authentication request message of a first protocol type for a User Equipment 'UE'; and transmitting (S403) an authentication credential request message of the first protocol type to a protocol translation entity for translating the authentication credential request message of the first protocol type to a corresponding authentication credential request message of a second protocol type.

2. The method (400) of embodiment 1, further comprising:

determining whether an identity of the UE received in the authentication request message of the first protocol type is associated with a network using the first protocol type or a network with the second protocol type.

3. The method (400) of embodiment 2, wherein said transmitting step further comprises:

transmitting the authentication credential request message of the first protocol type to the protocol translation entity, if it is determined that the identity of the UE is associated with the network using the second protocol type.

4. The method (400) of any of embodiments 1 to 3, further comprising:

receiving, from the protocol translation entity, an authentication credential response message of the first protocol type that is translated by the protocol translation entity from a corresponding authentication credential response message of the second protocol type transmitted by an entity for authentication, for authentication of the UE with an authentication credential received in the authentication credential response message of the first protocol type.

5. The method (400) of embodiment 4, further comprising:

converting the authentication credential to be associated with the network using the first protocol type for authentication of the UE, if the received authentication credential is associated with the network using the second protocol type.

6. The method (400) of any of embodiments 1 to 5, further comprising:

transmitting, to the protocol translation entity, a location management related message of the first protocol type for translating between the location management related message of the first protocol type and a corresponding location management related message of the second protocol type.

7. The method (400) of any of embodiments 1 to 6, further comprising:

transmitting, to the protocol translation entity, a subscriber profile management related message of the first protocol type for translating between the subscriber profile management related message of the first protocol type and a corresponding subscriber profile management related message of the second protocol type.

8. The method (400) of any of embodiments 1 to 7, wherein the first protocol type refers to an Evolved Packet Core 'EPC' protocol, and the second protocol type refers to a 5G Core '5GC' protocol.

9. The method (400) of any of embodiments 4 to 8, wherein the authentication request message of the first protocol type comprises a Diameter based authentication request message over an SWa/STa interface;

the authentication credential request message of the first protocol type comprises a Diameter based authentication credential request message over an SWx interface;

the authentication credential request message of the second protocol type comprises an authentication credential request message over an SBI interface with the entity for authentication;

the authentication credential response message of the first protocol type comprises a Diameter based authentication credential response message over the SWx interface; and the authentication credential response message of the second protocol type comprises an authentication credential response message over the SBI interface with the entity for authentication.

10. The method (400) of any of embodiments 4 to 9, wherein the entity for AAA comprises an AAA server;

the protocol translation entity comprises an AAA-Inter-working Function 'IWF', and the entity for authentication comprises a Unified Data Management 'UDM' entity or an Authentication Server Function 'AUSF'.

11. A method (500) at an entity for Authentication, Authorization and Accounting 'AAA', comprising:

receiving (S501), from a Non-3rd Generation Partnership Project 'Non-3GPP' access point, an authentication request message of a first protocol type for a User Equipment 'UE';

generating (S503) an authentication credential request message of the first protocol type in response to the received authentication request message of the first protocol type;

translating (S505) the authentication credential request message of the first protocol type to a corresponding authentication credential request message of a second protocol type; and transmitting (S507) the corresponding authentication credential request message of the second protocol type for fetching an authentication credential to authenticate the UE.

12. The method (500) of embodiment 11, further comprising:

determining that an identity of the UE received in the authentication request message of the first protocol type is associated with a network using the second protocol type.

13. The method (500) of embodiment 11, further comprising:

determining that an identity of the UE received in the translated authentication credential request message of the second protocol type is associated with a network using the second protocol type.

14. The method (500) of embodiment 12 or 13, wherein said transmitting step further comprises:

transmitting, to an entity for authentication, the corresponding authentication credential request message of the second protocol type for fetching the authentication credential to authenticate the UE.

15. The method (500) of embodiment 11, wherein said transmitting step further comprises:

transmitting the corresponding authentication credential request message of the second protocol type to a message routing entity for routing to an entity for authentication.

16. The method (500) of any of embodiments 11 to 15, further comprising:

receiving, from an entity for authentication, an authentication credential response message of the second protocol type; and translating the authentication credential response message of the second protocol type to a corresponding authentication credential response message of the first protocol type for authentication of the UE with the authentication credential received in the authentication credential response message of the first protocol type.

17. The method (500) of embodiment 16, further comprising:

converting the authentication credential to be associated with a network using the first protocol type for authentication of the UE, if the received authentication credential is associated with a network using the second protocol type.

18. The method (500) of any of embodiments 11 to 17, further comprising:

translating a location management related message of the first protocol type to a corresponding location management related message of the second protocol type; and transmitting the corresponding location management related message of the second protocol type to an entity for authentication.

19. The method (500) of any of embodiments 11 to 18, further comprising:

translating a subscriber profile management related message of the first protocol type to a corresponding subscriber profile management related message of the second protocol type; and transmitting the corresponding subscriber profile management related message of the second protocol type to the entity for authentication.

20. The method (500) of any of embodiments 11 to 19, wherein the first protocol type refers to an Evolved Packet Core 'EPC' protocol, and the second protocol type refers to a 5G Core '5GC' protocol.

21. The method (500) of any of embodiments 16 to 20, wherein the authentication request message of the first protocol type comprises a Diameter based authentication request message over an SWa/STa interface;

the authentication credential request message of the first protocol type comprises a Diameter based authentication credential request message over an SWx interface;

the authentication credential request message of the second protocol type comprises an authentication credential request message over an SBI interface with the entity for authentication;

the authentication credential response message of the first protocol type comprises a Diameter based authentication credential response message over the SWx interface; and the authentication credential response message of the second protocol type comprises an authentication credential response message over the SBI interface with the entity for authentication.

22. The method (500) of any of embodiments 15 to 21, wherein the entity for AAA comprises an AAA server;

the protocol translation entity comprises an AAA-Interworking Function 'IWF', the entity for authentication comprises a Unified Data Management 'UDM' entity or an Authentication Server Function 'AUSF', and the message routing entity comprises a Subscription Locator Function 'SLF' or a Diameter Routing Agent 'DRA'.

23. A method (600) at a protocol translation entity, comprising:

obtaining (S601) an authentication credential request message of a first protocol type for a User Equipment 'UE'; and translating (S603) the authentication credential request message of the first protocol type to a corresponding authentication credential request message of a second protocol type for authentication of the UE.

24. The method (600) of embodiment 23, further comprising:

obtaining an authentication credential response message of the second protocol type; and translating the authentication credential response message of the second protocol type to a corresponding authentication credential response message of the first protocol type for an entity for Authentication, Authorization and Accounting 'AAA' to authenticate the UE with an authentication credential in the authentication credential response message of the first protocol type.

25. The method (600) of embodiment 23 or 24, further comprising:

translating a location management related message of the first protocol type to a corresponding location management related message of the second protocol type.

26. The method (600) of any of embodiments 23 to 25, further comprising:

translating a subscriber profile management related message of the first protocol type to a corresponding subscriber profile management related message of the second protocol type.

27. The method (600) of any of embodiments 24 to 26, wherein the authentication credential request message of the first protocol type is obtained by being received from the entity for AAA; and the authentication credential response message of the second protocol type is obtained by being received from the entity for authentication.

28. The method (600) of embodiment 27, further comprising:

receiving, from the entity for AAA, the location management related message of the first protocol type; and transmitting, to the entity for authentication, the corresponding location management related message of the second protocol type.

29. The method (600) of embodiment 27 or 28, further comprising:

receiving, from the entity for AAA, the subscriber profile management related message of the first protocol type; and transmitting, to the entity for authentication, the corresponding subscriber profile management related message of the second protocol type.

30. The method (600) of any of embodiments 24 to 26, wherein the protocol translation entity is arranged at the entity for AAA, and wherein the authentication credential request message of the first protocol type is obtained by being generated by the entity for AAA in response to an authentication request message of the first protocol type received from a Non-3rd Generation Partnership Project 'Non-3GPP' access point, and the authentication credential response message of the second protocol type is obtained by being received from the entity for authentication.

31. The method (600) of embodiment 30, further comprising:

obtaining the location management related message of the first protocol type; and transmitting, to the entity for authentication, the corresponding location management related message of the second protocol type.

32. The method (600) of embodiment 30 or 31, further comprising:

obtaining the subscriber profile management related message of the first protocol type; and transmitting, to the entity for authentication, the corresponding subscriber profile management related message of the second protocol type.

33. The method (600) of any of embodiments 24 to 26, wherein the protocol translation entity is arranged at the entity for authentication, and wherein the authentication credential request message of the first protocol type is obtained by being received from the entity for AAA, and the authentication credential response message of the second protocol type is obtained by being generated by the entity for authentication in response to the authentication credential request message of the second protocol type.

34. The method (600) of embodiment 33, further comprising:

receiving, from the entity for AAA, the location management related message of the first protocol type.

35. The method (600) of embodiment 33 or 34, further comprising:

receiving, from the entity for AAA, the subscriber profile management related message of the first protocol type.

36. The method (600) of any of embodiments 23 to 35, wherein the first protocol type refers to an Evolved Packet Core 'EPC' protocol, and the second protocol type refers to a 5G Core '5GC' protocol.

37. The method (600) of any of embodiments 30 to 36, wherein the authentication request message of the first protocol type comprises a Diameter based authentication request message over an SWa/STa interface;

the authentication credential request message of the first protocol type comprises a Diameter based authentication credential request message over an SWx interface;

the authentication credential request message of the second protocol type comprises an authentication credential request message over an SBI interface with the entity for authentication;

the authentication credential response message of the first protocol type comprises a Diameter based authentication credential response message over the SWx interface; and the authentication credential response message of the second protocol type comprises an authentication credential response message over the SBI interface with the entity for authentication.

38. The method (600) of any of embodiments 23 to 37, wherein the protocol translation entity comprises an AAA-Interworking Function 'IWF', the entity for AAA comprises an AAA server, and the entity for authentication comprises a Unified Data Management 'UDM' entity or an Authentication Server Function 'AUSF'.

39. A method (700) at a message routing entity, comprising:

obtaining (S701) an authentication credential request message;

determining (S703) whether an identity of a User Equipment 'UE' in the authentication credential request message is associated with a network using a first protocol type or a network with a second protocol type; and transmitting (S705) the authentication credential request message towards an entity for authentication of the second protocol type, if it is determined that the identity of the UE is associated with the network using the second protocol type.

40. The method (700) of embodiment 39, wherein the authentication credential request message is of the first protocol type, and wherein said transmitting step further comprises: transmitting the authentication credential request message of the first protocol type to the protocol translation entity for translating the authentication credential request message of the first protocol type to a corresponding authentication credential request message of the second protocol type, if it is determined that the identity of the UE is associated with the network using the second protocol type.

41. The method (700) of embodiment 40, wherein the authentication credential request message of the first protocol type is obtained by being received from an entity for Authentication, Authorization and Accounting 'AAA'.

42. The method (700) of embodiment 41, wherein the message routing entity is arranged at the entity for AAA, and the authentication credential request message of the first protocol type is obtained by being generated by the entity for AAA in response to an authentication request message of the first protocol type received from a Non-3rd Generation Partnership Project 'Non-3GPP' access point.

43. The method (700) of embodiment 39, wherein the authentication credential request message is of the second protocol type, and wherein said transmitting step further comprises: transmitting, to the entity for authentication, the authentication creden- tial request message of the second protocol type for authentication of the UE, if it is determined that the identity of the UE is associated with the network using the second protocol type.

44. The method (700) of embodiment 43, wherein the authentication credential request message of the second protocol type is obtained by being received from a protocol translation entity, which is translated by the protocol translation entity from a corresponding authentication request message of the first protocol type.

45. The method (700) of embodiment 43 or 44, wherein the message routing entity is arranged at the AAA server.

46. The method (700) of any of embodiments 39 to 45, wherein the first protocol type refers to an Evolved Packet Core 'EPC' protocol, and the second protocol type refers to a 5G Core '5GC' protocol.

47. The method (700) of any of embodiments 42 to 46, wherein the authentication request message of the first protocol type comprises a Diameter based authentication request message over an SWa/STa interface;

the authentication credential request message of the first protocol type comprises a Diameter based authentica- tion credential request message over an SWx interface;

the authentication credential request message of the sec- ond protocol type comprises an authentication creden- tial request message over an SBI interface with the entity for authentication.

48. The method (700) of any of embodiments 42 to 46, wherein the message routing entity comprises a Subscription Locator Function 'SLF' or a Diameter Routing Agent 'DRA', the protocol translation entity comprises an AAA-Inter- working Function 'IWF', the entity for AAA comprises an AAA server, and the entity for authentication comprises a Unified Data Management 'UDM' entity or an Authentication Server Function 'AUSF'.

49. A method (800) at an entity for authentication, com- prising:

obtaining (S801) an authentication credential request message of a first protocol type for a User Equipment 'UE';

translating (S803) the authentication credential request message of the first protocol type to a corresponding authentication credential request message of a second protocol type for authentication of the UE;

generating (S805) an authentication credential response message of the second protocol type; and translating (S807) the authentication credential response message of the second protocol type to a corresponding authentication credential response message of the first protocol type; and transmitting (S809), to an entity for Authentication, Authorization and Accounting 'AAA', the authentica- tion credential response message of the first protocol type for authentication of the UE with an authentication credential in the authentication credential response message of the first protocol type.

50. The method (800) of embodiment 49, wherein the first protocol type refers to an Evolved Packet Core 'EPC' protocol, and the second protocol type refers to a 5G Core '5GC' protocol.

51. The method (800) of embodiment 49 or 50, wherein the authentication credential request message of the first protocol type comprises a Diameter based authentica- tion credential request message over an SWx interface;

the authentication credential request message of the sec- ond protocol type comprises an authentication creden- tial request message over an SBI interface with the entity for authentication;

the authentication credential response message of the first protocol type comprises a Diameter based authentica- tion credential response message over the SWx inter- face; and the authentication credential response message of the second protocol type comprises an authentication cre- dential response message over the SBI interface with the entity for authentication.

52. The method (800) of any of embodiments 49 to 51, wherein the entity for AAA comprises an AAA server, and the entity for authentication comprises a Unified Data Management 'UDM' entity or an Authentication Server Function 'AUSF'.

53. A method at an entity for authentication, comprising:

receiving, from a Non-3rd Generation Partnership Project 'Non-3GPP' access point, an authentication request message of a first protocol type for a User Equipment 'UE';

translating the authentication request message of the first protocol type to a corresponding authentication request message of the second protocol type;

generating an authentication credential request message of the second protocol type;

transmitting, to an entity for unified data management, the authentication credential request message of the second protocol type; and receiving, from the entity for unified data management, a corresponding authentication credential response mes- sage of the second protocol type for authentication of the UE with an authentication credential received in the authentication credential response message of the sec- ond protocol type.

54. The method of embodiment 53, further comprising:

translating between a location management related mes- sage of the first protocol type and a corresponding location management related message of the second protocol type.

55. The method of embodiment 53 or 54, further com- prising:

translating between a subscriber profile management related message of the first protocol type and a corre- sponding subscriber profile management related mes- sage of the second protocol type.

56. The method of any of embodiments 53 to 55, wherein the entity for authentication comprises an Authentica- tion, Authorization and Accounting 'AAA', and is arranged at an Authentication Server Function 'AUSF'.

57. The method of any of embodiments 53 to 55, wherein the entity for authentication comprises an Authentica- tion Server Function 'AUSF'.

58. The method of any of embodiments 56 to 67, wherein
the entity for unified data management comprises a Unified Data Management 'UDM' entity, and
the protocol translation entity comprises an AAA-Inter-working Function 'IWF'.

59. The method of any of embodiments 53 to 58, wherein
the first protocol type refers to an Evolved Packet Core 'EPC' protocol, and
the second protocol type refers to a 5G Core '5GC' protocol.

60. The method of any of embodiments 58 to 59, wherein
the authentication request message of the first protocol type comprises a Diameter based authentication request message over an SWa/STa interface;
the authentication request message of the second protocol type comprises an authentication request message over an SBI interface with the AUSF;
the authentication credential request message of the second protocol type comprises an authentication credential request message over an SBI interface with the UDM; and
the authentication credential response message of the second protocol type comprises an authentication credential response message over the SBI interface with the UDM.

61. A method (1600) at a protocol translation entity, comprising:
receiving (S1601), from a Non-3rd Generation Partnership Project 'Non-3GPP' access point, an authentication request message of a first protocol type for a User Equipment 'UE'; and
translating (S1603) the authentication request message of the first protocol type to a corresponding authentication request message of a second protocol type.

62. The method (1600) of embodiment 61, further comprising:
obtaining an authentication response message of the second protocol type; and
translating the authentication response message of the second protocol type to a corresponding authentication response message of the first protocol type.

63. The method (1600) of embodiment 61 or 62, wherein the protocol translation entity is arranged at an entity for authentication.

64. The method (1600) of embodiment 61 or 62, wherein the protocol translation entity is arranged at an Authentication, Authorization and Accounting 'AAA' proxy.

65. The method (1600) of any of embodiments 61 to 64, wherein
the first protocol type refers to an Evolved Packet Core 'EPC' protocol, and
the second protocol type refers to a 5G Core '5GC' protocol.

66. The method (1600) of any of embodiments 62 to 65, wherein
the authentication request message of the first protocol type comprises a Diameter based authentication request message over an SWa/STa interface;
the authentication request message of the second protocol type comprises an authentication request message over an SBI interface with the entity for authentication;
the authentication response message of the first protocol type comprises a Diameter based authentication response message over an SWa/STa interface; and the authentication response message of the second protocol type comprises an authentication response message over the SBI interface with the entity for authentication.

67. The method (1600) of any of embodiments 63 to 66, wherein
the protocol translation entity comprises an AAA-Inter-working Function 'IWF', and
the entity for authentication comprises an Authentication Server Function 'AUSF' or an Authentication, Authorization and Accounting 'AAA' arranged at an AUSF.

68. A method (2300) at a first Non-3rd Generation Partnership Project 'Non-3GPP' access point in a Non-3GPP access network, comprising:
determining (S2301) to perform traffic offload from the Non-3GPP access network for a User Equipment 'CUE' that is authenticated via a 3GPP network; and
performing (S2303) the traffic offload from the Non-3GPP access network based on the determination.

69. The method (2300) of embodiment 68, further comprising:
receiving, from an entity for mobility management, an indication of traffic offload.

70. The method (2300) of embodiment 69, wherein the traffic offload is
determined to be performed based on the received indication.

71. The method (2300) of any of embodiments 68 to 70, wherein said
performing the traffic offload comprises:
receiving an IP address request from the UE;
allocating an IP address to the UE;
performing user plane configuration for the UE; and
offloading user plane traffic from the first Non-3GPP access point.

72. The method (2300) of any of embodiments 68 to 71, wherein said
performing the traffic offload further comprises:
notifying a second Non-3GPP access point in the Non-3GPP access network of performing the traffic offload from the second Non-3GPP access point.

73. The method (2300) of any of embodiments 68 to 72, wherein
the first Non-3GPP access point comprises a Trusted Wireless Local Area Interworking Function 'TWIF' or a Trusted Non-3GPP Gateway Function 'TNGF'; and
the Non-3GPP access network comprises a Trusted Wireless Local Area 'WLAN' access network.

74. The method (2300) of any of embodiments 69 to 73, wherein the entity for mobility management comprises an Access and Mobility Management Function 'AMF'.

75. The method (2300) of any of embodiments 72 to 74, wherein the second Non-3GPP access point comprises a Trusted Wireless Local Area 'WLAN' Access Point.

76. A method (2400) at an entity for mobility management, comprising:
obtaining (S2401) subscription data of a User Equipment 'UE' that is authenticated via a 3rd Generation Partnership Project '3GPP' network; and
based on the subscription data, transmitting (S2403), to a Non-3GPP access point in a Non-3GPP access network, an indication of traffic offload, indicating that traffic offload from the Non-3GPP access network is to be performed for the UE.

77. The method (2400) of embodiment 76, wherein the subscription data of the UE is fetched from an entity for unified data management.

78. The method (2400) of embodiment 76 or 77, wherein the Non-3GPP access point comprises a Trusted Wireless Local Area Interworking Function TWIF' or a Trusted Non-3GPP Gateway Function 'TNGF', and the entity for mobility management comprises an Access and Mobility Management Function 'AMF'.

79. The method (2400) of embodiment 77 or 78, wherein the entity for unified data management comprises a Unified Data Management 'UDM'.

80. A method (2500) at a second Non-3rd Generation Partnership Project 'Non-3GPP' access point in a Non-3GPP access network, comprising:
receiving (S2501), from a first Non-3GPP access point in the Non-3GPP access network, a notification of traffic offload from the Non-3GPP access network for a User Equipment 'CUE' that is authenticated via a 3GPP network; and
performing (S2503) traffic offload from the Non-3GPP access network.

81. The method (2500) of embodiment 80, wherein said performing the traffic offload comprises:
receiving an IP address request from the UE;
allocating an IP address to the UE;
performing user plane configuration for the UE; and
offloading user plane traffic from the second Non-3GPP access point.

82. The method (2500) of embodiment 80 or 81, wherein the first Non-3GPP access point comprises a Trusted Wireless Local Area Interworking Function 'TWIF' or a Trusted Non-3GPP Gateway Function 'TNGF';
the second Non-3GPP access point comprises a Trusted Wireless Local Area 'WLAN' Access Point; and
the Non-3GPP access network comprises a Trusted WLAN access network.

83. An entity for Authentication, Authorization and Accounting 'AAA' (3000), comprising:
at least one processor (3001), and
at least one memory (3003), storing instructions which, when executed on the at least one processor (3001), cause the entity for AAA (3000) to:
receive, from a Non-3rd Generation Partnership Project 'Non-3GPP' access point, an authentication request message of a first protocol type for a User Equipment 'UE'; and
transmit an authentication credential request message of the first protocol type to a protocol translation entity for translating the authentication credential request message of the first protocol type to a corresponding authentication credential request message of a second protocol type.

84. The entity for AAA (3000) of embodiment 83, wherein the instructions, when executed on the at least one processor (3001), further cause the entity for AAA (3000) to perform the method according to any of embodiments 2 to 10.

85. An entity for Authentication, Authorization and Accounting 'AAA' (3200), comprising:
at least one processor (3201), and
at least one memory (3203), storing instructions which, when executed on the at least one processor (3201), cause the entity for AAA (3100) to:
receive, from a Non-3rd Generation Partnership Project 'Non-3GPP' access point, an authentication request message of a first protocol type for a User Equipment 'UE';
generate an authentication credential request message of the first protocol type in response to the received authentication request message of the first protocol type;
translate the authentication credential request message of the first protocol type to a corresponding authentication credential request message of a second protocol type; and
transmit the corresponding authentication credential request message of the second protocol type for fetching an authentication credential to authenticate the UE.

86. The entity for AAA (3200) of embodiment 85, wherein the instructions, when executed on the at least one processor (3201), further cause the entity for AAA (3100) to perform the method according to any of embodiments 12 to 22.

87. A protocol translation entity (3400), comprising:
at least one processor (3401), and
at least one memory (3403), storing instructions which, when executed on the at least one processor (3401), cause the protocol translation entity (3400) to:
obtain an authentication credential request message of a first protocol type for a User Equipment 'UE';
translate the authentication credential request message of the first protocol type to a corresponding authentication credential request message of a second protocol type for authentication of the UE.

88. The protocol translation entity (3400) of embodiment 87, wherein the instructions, when executed on the at least one processor (3401), further cause the protocol translation entity (3400) to perform the method according to any of embodiments 24 to 38.

89. A message routing entity (3600), comprising:
at least one processor (3601), and
at least one memory (3603), storing instructions which, when executed on the at least one processor (3601), cause the message routing entity (3600) to:
obtain an authentication credential request message;
determine whether an identity of a User Equipment 'CUE' in the authentication credential request message is associated with a network using a first protocol type or a network using a second protocol type; and
transmit the authentication credential request message towards an entity for authentication of the second protocol type, if it is determined that the identity of the UE is associated with the network using the second protocol type.

90. The message routing entity (3600) of embodiment 89, wherein the instructions, when executed on the at least one processor (3601), further cause the message routing entity (3600) to perform the method according to any of embodiments 40 to 48.

91. An entity for authentication (3800), comprising:
at least one processor (3801), and
at least one memory (3803), storing instructions which, when executed on the at least one processor (3801), cause the entity for authentication (3800) to:
obtain an authentication credential request message of a first protocol type for a User Equipment 'UE';
translate the authentication credential request message of the first protocol type to a corresponding authentication credential request message of a second protocol type for authentication of the UE;
generate an authentication credential response message of the second protocol type; and translate the authentication credential response message of the second protocol type to a corresponding authentication credential response message of the first protocol type; and transmit, to an entity for Authentication, Authorization and Accounting 'AAA', the authentication credential response message of the first protocol type for authentication of the UE with an authentication credential in the authentication credential response message of the first protocol type 92. The entity for authentication (3800) of embodiment 91, wherein the instructions, when executed on the at least one processor (3801), further cause the entity for authentication (3800) to perform the method according to any of embodiments 50 to 52.

93. An entity for authentication (4000), comprising:

at least one processor (4001), and at least one memory (4003), storing instructions which, when executed on the at least one processor (4001), cause the entity for authentication (4000) to:

receive, from a Non-3rd Generation Partnership Project 'Non-3GPP' access point, an authentication request message of a first protocol type for a User Equipment 'UE';

translate the authentication request message of the first protocol type to the authentication request message of the second protocol type;

generate an authentication credential request message of the second protocol type;

transmit, to an entity for unified data management, the authentication credential request message of the second protocol type; and receive, from the entity for unified data management, a corresponding authentication credential response message of the second protocol type for authentication of the UE with an authentication credential received in the authentication credential response message of the second protocol type.

94. The entity for authentication (4000) of embodiment 93, wherein the instructions, when executed on the at least one processor (4001), further cause the entity for authentication (4000) to perform the method according to any of embodiments 54 to 60.

95. A protocol translation entity (4200), comprising:

at least one processor (4201), and at least one memory (4203), storing instructions which, when executed on the at least one processor (4201), cause the protocol translation entity (4200) to:

receive, from a Non-3rd Generation Partnership Project 'Non-3GPP' access point, an authentication request message of a first protocol type for a User Equipment 'UE'; and translate the authentication request message of the first protocol type to a corresponding authentication request message of a second protocol type.

96. The protocol translation entity (4200) of embodiment 95, wherein the instructions, when executed on the at least one processor (4201), further cause the protocol translation entity (4200) to perform the method according to any of embodiments 62 to 67.

97. A first Non-3rd Generation Partnership Project 'Non-3GPP' access point (5000) in a Non-3GPP access network, comprising:

at least one processor (5001), and at least one memory (5003), storing instructions which, when executed on the at least one processor (5001), cause the first Non-3GPP access point (5000) to:

determine to perform traffic offload from the Non-3GPP access network for a User Equipment 'CUE' that is authenticated via a 3GPP network; and perform the traffic offload from the Non-3GPP access network based on the determination.

98. The first Non-3GPP access point (5000) of embodiment 97, wherein the instructions, when executed on the at least one processor (5001), further cause the first Non-3GPP access point (5000) to perform the method according to any of embodiments 69 to 75.

99. An entity for mobility management (5200), comprising:

at least one processor (5201), and at least one memory (5203), storing instructions which, when executed on the at least one processor (5201), cause the entity for mobility management (5200) to:

obtain subscription data of a User Equipment 'CUE' that is authenticated via a 3rd Generation Partnership Project '3GPP' network; and based on the subscription data, transmit, to a Non-3GPP access point in a Non-3GPP access network, an indication of traffic offload, indicating that traffic offload from the Non-3GPP access network is to be performed for the UE.

100. The entity for mobility management (5200) of embodiment 99, wherein the instructions, when executed on the at least one processor (5201), further cause the entity for mobility management (5200) to perform the method according to any of embodiments 77 to 79.

101. A second Non-3rd Generation Partnership Project 'Non-3GPP' access point (5400) in a Non-3GPP access network, comprising:

at least one processor (5401), and at least one memory (5403), storing instructions which, when executed on the at least one processor (5401), cause the second Non-3GPP access point (5400) to:

receive, from a first Non-3GPP access point in the Non-3GPP access network, a notification of traffic offload from the Non-3GPP access network for a User Equipment 'CUE' that is authenticated; and perform the traffic offload from the Non-3GPP access network.

102. The second Non-3GPP access point (5400) of embodiment 101, wherein the instructions, when executed on the at least one processor (5401), further cause the second Non-3GPP access point (5400) to perform the method according to any of embodiments 81 to 82.

103. A computer readable storage medium having computer program instructions stored thereon, the computer program instructions, when executed by at least one processor, causing the at least one processor to perform the method according to any of embodiments 1 to 22 and 53 to 60.

104. A computer readable storage medium having computer program instructions stored thereon, the computer program instructions, when executed by at least one processor, causing the at least one processor to perform the method according to any of embodiments 23 to 38 and 61 to 67.

105. A computer readable storage medium having computer program instructions stored thereon, the computer program instructions, when executed by at least one processor, causing the at least one processor to perform the method according to any of embodiments 39 to 48.

106. A computer readable storage medium having computer program instructions stored thereon, the computer program instructions, when executed by at least one processor, causing the at least one processor to perform the method according to any of embodiments 49 to 52.

107. A computer readable storage medium having computer program instructions stored thereon, the computer program instructions, when executed by at least one processor, causing the at least one processor to perform the method according to any of embodiments 68 to 75.

108. A computer readable storage medium having computer program instructions stored thereon, the computer program instructions, when executed by at least one processor, causing the at least one processor to perform the method according to any of embodiments 76 to 79.

109. A computer readable storage medium having computer program instructions stored thereon, the computer program instructions, when executed by at least one processor, causing the at least one processor to perform the method according to any of embodiments 80 to 82.

The invention claimed is:

1. A method performed by an authentication server function (AUSF), the method comprising:

receiving, from AAA-Interworking Function (IWF), an authentication request message of a second protocol type for a User Equipment 'UE' for traffic offload from a Non-3rd Generation Partnership Project 'Non-3GPP' access network, which comprises a SUbscription Concealed Identifier, SUCI, of the UE;

generating an authentication credential request message of the second protocol type that comprises the SUCI of the UE, based on the received authentication request message of the second protocol type; and transmitting, to a unified data management (UDM) function, the authentication credential request message of the second protocol type.

2. The method of claim 1, wherein the authentication credential request message of the second protocol type is transmitted to the UDM function for traffic offload from the Non-3GPP access network.

3. The method of claim 1, further comprising:

receiving, from the UDM function, a corresponding authentication credential response message of the second protocol type that comprises a SUbscription Permanent Identifier, SUPI, of the UE, for authentication of the UE with an authentication credential received in the authentication credential response message of the second protocol type;

generating an authentication response message of the second protocol type based on the received authentication credential response message of the second protocol type; and transmitting, to the AAA-IWF, the authentication response message of the second protocol type.

4. The method of claim 3, wherein the authentication request message of the second protocol type comprises an authentication request message over a Service Based Interface (SBI) interface with the AAA-IWF;

the authentication credential request message of the second protocol type comprises an authentication credential request message over an SBI interface with the UDM function;

the authentication credential response message of the second protocol type comprises an authentication credential response message over an SBI interface with the UDM function; and the authentication response message of the second protocol type comprises an authentication response message over the SBI interface with the AAA-IWF.

5. The method of claim 1, wherein the second protocol type refers to a 5G Core '5GC' protocol.

6. A method performed by a unified data management (UDM) function, the method comprising:

receiving, from an authentication server function (AUSF), an authentication credential request message of a second protocol type for a User Equipment 'UE' for traffic offload from a Non-3rd Generation Partnership Project 'Non-3GPP' access network, which comprises a SUbscription Concealed Identifier, SUCI, of the UE; and transmitting, to the AUSF, a corresponding authentication credential response message of the second protocol type that comprises a SUbscription Permanent Identifier, SUPI, of the UE, for authentication of the UE with an authentication credential received in the authentication credential response message of the second protocol type.

7. The method of claim 6, wherein the authentication credential request message of the second protocol type comprises an authentication credential request message over a Service Based Interface (SBI) interface with the entity for authentication; and the authentication credential response message of the second protocol type comprises an authentication credential response message over an SBI interface with the AUSF.

* * * * *